United States Patent
Kamath

(10) Patent No.: US 11,373,546 B2
(45) Date of Patent: Jun. 28, 2022

(54) DATA PROCESSING SYSTEMS FOR PROCESSING AND ANALYZING DATA REGARDING SELF-AWARENESS AND EXECUTIVE FUNCTION

(71) Applicant: ExQ, LLC, Atlanta, GA (US)

(72) Inventor: Sucheta A. Kamath, Atlanta, GA (US)

(73) Assignee: ExQ, LLC, Atlanta, GA (US)

(*) Notice: Subject to any disclaimer, the term of this patent is extended or adjusted under 35 U.S.C. 154(b) by 1 day.

(21) Appl. No.: 17/130,217

(22) Filed: Dec. 22, 2020

(65) Prior Publication Data

US 2021/0110737 A1    Apr. 15, 2021

Related U.S. Application Data

(63) Continuation-in-part of application No. 16/862,885, filed on Apr. 30, 2020, now Pat. No. 10,872,538, (Continued)

(51) Int. Cl.
    *G09B 19/22*    (2006.01)
    *G09B 7/04*    (2006.01)
    (Continued)

(52) U.S. Cl.
    CPC ............ *G09B 19/22* (2013.01); *A63F 9/0096* (2013.01); *A63F 9/24* (2013.01); *G09B 7/04* (2013.01);
    (Continued)

(58) Field of Classification Search
    CPC ................... G06Q 10/06393; A63F 13/798
    See application file for complete search history.

(56) References Cited

U.S. PATENT DOCUMENTS 5,678,001 A    10/1997   Nagel et al.
6,299,452 B1   10/2001   Wasowicz et al.
(Continued)

FOREIGN PATENT DOCUMENTS

EP    1387644    2/2004
EP    1798701   12/2008
(Continued)

OTHER PUBLICATIONS

Blackwood, Tony (2010) Metaknowledge in higher education : self-assessment accuracy and its association with academic achievement. Doctoral thesis, Northumbria University; http://nrl.northumbria.ac.uk/2233/1/blackwood.tony_dba.pdf.
(Continued)

*Primary Examiner* — Seng H Lim
(74) *Attorney, Agent, or Firm* — Brient IP Law, LLC

(57) ABSTRACT

Data processing systems according to various embodiments are adapted to process data regarding the self-awareness of a user for use in the development of the user's executive function. In various embodiments, the data processing system: (1) executes computer-readable instructions that, when executed by the at least one computer processor, facilitate the playing of a game by the user; (2) gathers performance data indicating the user's performance while the user plays the game; and (3) automatically evaluates the performance data to assess, for the user, the ability to remember to perform various tasks, to stay on task, and to coach others by taking perspective, giving feedback, and mentoring them to do well. The data processing system may gather and process related data on various levels and then use this information to assist the user in improving the user's executive function skills.

20 Claims, 29 Drawing Sheets

Related U.S. Application Data which is a continuation-in-part of application No. 16/822,264, filed on Mar. 18, 2020, now Pat. No. 10,870,058, which is a continuation-in-part of application No. 16/259,907, filed on Jan. 28, 2019, now Pat. No. 10,600,018, which is a continuation-in-part of application No. 15/644,697, filed on Jul. 7, 2017, now Pat. No. 10,191,830.

(51) Int. Cl.
    *A63F 9/00*      (2006.01)
    *A63F 9/24*      (2006.01)
(52) U.S. Cl.
    CPC ............ *A63F 2009/2457* (2013.01); *A63F 2009/2486* (2013.01)

(56) References Cited

U.S. PATENT DOCUMENTS

| | | |
|---|---|---|
| 6,422,869 B1 | 7/2002 | Nagarajan et al. |
| 6,626,679 B2 | 9/2003 | Skeans et al. |
| 6,749,436 B1 | 6/2004 | Dannenberg |
| 6,767,213 B2 | 7/2004 | Fleishman |
| 7,052,277 B2 | 5/2006 | Kellman |
| 7,136,617 B2 | 11/2006 | Libby |
| 7,186,116 B2 | 3/2007 | Klingberg |
| 7,540,615 B2 | 6/2009 | Merzenich et al. |
| 7,773,097 B2 | 8/2010 | Merzenich et al. |
| 7,887,329 B2 | 2/2011 | Greenshpan et al. |
| 8,197,258 B2 | 6/2012 | Delahunt et al. |
| 8,206,156 B2 | 6/2012 | Merzenich et al. |
| 8,210,851 B2 | 7/2012 | Wade et al. |
| 8,215,961 B2 | 7/2012 | Merzenich et al. |
| 8,348,671 B2 | 1/2013 | Delahunt et al. |
| 8,408,915 B2 | 4/2013 | Hardy et al. |
| 8,463,245 B2 | 6/2013 | Bilange |
| 8,628,331 B1 | 1/2014 | Wright |
| 8,979,538 B2 | 3/2015 | Michelstein et al. |
| 9,047,611 B2 | 6/2015 | Krishnamoorthy et al. |
| 9,302,179 B1 | 4/2016 | Merzenich et al. |
| 9,308,445 B1 | 4/2016 | Merzenich et al. |
| 9,349,300 B2 | 5/2016 | Harkness |
| 9,358,450 B2 | 6/2016 | Nova |
| 9,520,069 B2 | 12/2016 | Wood et al. |
| 9,530,329 B2 | 12/2016 | Rudolph |
| 9,649,552 B2 | 5/2017 | Blank et al. |
| 10,042,538 B2 | 8/2018 | Baughman et al. |
| 2005/0153263 A1 | 7/2005 | De Ley et al. |
| 2005/0153267 A1 | 7/2005 | Goldman et al. |
| 2005/0164152 A1 | 7/2005 | Lawson |
| 2005/0277099 A1 | 12/2005 | Van Schaack et al. |
| 2006/0029920 A1 | 2/2006 | Bruno et al. |
| 2006/0121427 A1 | 6/2006 | Skoglund et al. |
| 2007/0065789 A1 | 3/2007 | Goldman et al. |
| 2007/0134635 A1 | 6/2007 | Hardy et al. |
| 2007/0134636 A1 | 6/2007 | Chan et al. |
| 2007/0141541 A1 | 6/2007 | Chan et al. |
| 2007/0166675 A1 | 7/2007 | Atkins et al. |
| 2007/0218439 A1 | 9/2007 | Delahunt et al. |
| 2007/0218440 A1 | 9/2007 | Delahunt et al. |
| 2007/0219958 A1 | 9/2007 | Park et al. |
| 2008/0003558 A1 | 1/2008 | Chan et al. |
| 2009/0088236 A1 | 4/2009 | Laude et al. |
| 2009/0253108 A1 | 10/2009 | Daly |
| 2009/0270155 A1 | 10/2009 | Glass et al. |
| 2010/0092933 A1 | 4/2010 | Kuchera et al. |
| 2010/0113152 A1 | 5/2010 | Shmuel |
| 2012/0028230 A1* | 2/2012 | Devereux ............. G09B 19/00 434/236 |
| 2012/0046569 A1 | 2/2012 | Johnstone et al. |
| 2012/0208169 A1 | 8/2012 | Nutley et al. |
| 2012/0237915 A1 | 9/2012 | Krohner et al. |
| 2012/0238831 A1 | 9/2012 | Benford |
| 2012/0288845 A1 | 11/2012 | Kumar Gl |
| 2013/0177882 A1 | 7/2013 | Tharanathan et al. |
| 2013/0203027 A1 | 8/2013 | De Villers-Sidani et al. |
| 2013/0302762 A1 | 11/2013 | Zhou et al. |
| 2014/0227670 A1 | 8/2014 | Sternberg et al. |
| 2014/0272910 A1 | 9/2014 | Del Ninno et al. |
| 2014/0335487 A1 | 11/2014 | Hinman et al. |
| 2014/0349261 A1 | 11/2014 | Dennis et al. |
| 2014/0370479 A1 | 12/2014 | Gazzaley |
| 2015/0004577 A1 | 1/2015 | Wu et al. |
| 2015/0187221 A1 | 7/2015 | Hinman et al. |
| 2015/0278740 A1 | 10/2015 | Kennerly et al. |
| 2015/0279226 A1 | 10/2015 | Harrison et al. |
| 2015/0287342 A1 | 10/2015 | Dimitriadis et al. |
| 2015/0325133 A1 | 11/2015 | Gaglani et al. |
| 2016/0005320 A1 | 1/2016 | Decharms et al. |
| 2016/0262680 A1 | 9/2016 | Martucci et al. |
| 2016/0263483 A1 | 9/2016 | Le |
| 2016/0293033 A1 | 10/2016 | Anderson-Hanley |
| 2016/0293049 A1 | 10/2016 | Monahan et al. |
| 2016/0302710 A1 | 10/2016 | Alberts et al. |
| 2016/0328992 A1 | 11/2016 | Sasidhar et al. |
| 2017/0046971 A1 | 2/2017 | Moreno |
| 2017/0053540 A1 | 2/2017 | Meagher |
| 2017/0076318 A1 | 3/2017 | Goswami et al. |
| 2017/0098385 A1 | 4/2017 | Martucci et al. |
| 2017/0173471 A1 | 6/2017 | Knutsson et al. |
| 2019/0139447 A1* | 5/2019 | Crawford ............... G10L 25/48 |
| 2019/0228365 A1* | 7/2019 | Kamath ........... G06Q 10/06393 |

FOREIGN PATENT DOCUMENTS

| | | |
|---|---|---|
| EP | 2031572 | 12/2009 |
| WO | 2011030337 | 3/2011 |

OTHER PUBLICATIONS

Final Office Action, dated May 2, 2018, from corresponding U.S. Appl. No. 15/644,695.
Final Office Action, dated May 25, 2018, from corresponding U.S. Appl. No. 15/644,697.
Final Office Action, dated Sep. 30, 2019, from corresponding U.S. Appl. No. 16/259,907.
Hardest Free Brain Game; 2014; https://play.google.com/store/apps/details?id=com.theinvader360.braintraining.fourgamesonescreen.free&hl=en.
International Preliminary Report on Patentability, dated Jan. 16, 2020, from corresponding International Application No. PCT/US2018/041325.
International Search Report, dated Nov. 23, 2018, from corresponding International Application No. PCT/US2018/041325.
Invitation to Pay Additional Search Fees, dated Sep. 24, 2018, from corresponding International Application No. PCT/US2018/041325.
Multitask; Mar. 2016; https://web.archive.org/web/20160325225709/http://www.onemorelevel.com/game/multitask.
Notice of Allowance, dated Aug. 18, 2020, from corresponding U.S. Appl. No. 16/822,264.
Notice of Allowance, dated Aug. 18, 2020, from corresponding U.S. Appl. No. 16/862,885.
Notice of Allowance, dated Dec. 12, 2019, from corresponding U.S. Appl. No. 16/259,907.
Notice of Allowance, dated Jul. 18, 2018, from corresponding U.S. Appl. No. 15/644,695.
Notice of Allowance, dated Nov. 7, 2018, from corresponding U.S. Appl. No. 15/644,697.
Office Action, dated Dec. 8, 2017, from corresponding U.S. Appl. No. 15/644,697.
Office Action, dated Feb. 2, 2018, from corresponding U.S. Appl. No. 15/644,703.
Office Action, dated Jan. 24, 2018, from corresponding U.S. Appl. No. 15/644,700.
Office Action, dated Jul. 14, 2020, from corresponding U.S. Appl. No. 16/862,885.
Office Action, dated May 13, 2020, from corresponding U.S. Appl. No. 16/822,264.

(56) References Cited

OTHER PUBLICATIONS

Office Action, dated May 17, 2019, from corresponding U.S. Appl. No. 16/259,907.
Office Action, dated Nov. 21, 2017, from corresponding U.S. Appl. No. 15/644,695.
Written Opinion of the International Searching Authority, dated Nov. 23, 2018, from corresponding International Application No. PCT/US2018/041325.

* cited by examiner

ExQ SURVEY QUESTIONS

| TOPIC | TOPIC ID | QID | Qtype | Qno | DESCRIPTION |
|---|---|---|---|---|---|
| COMPLEX ATTENTION | CA | 1 | N | 1 | IN EVERYDAY LIFE, I FIND IT HARD TO FOCUS |
| | CA | 2 | N | 2 | I GET DISTRACTED BY CLUTTER OR THINGS IN MY SURROUNDINGS |
| | CA | 3 | N | 3 | I GET DISTRACTED BY SOUNDS INCLUDING PEOPLE TALKING AROUND ME |
| | CA | 4 | N | 4 | I AM FIGETY OR I MOVE A LOT |
| | CA | 5 | N | 5 | I GET BORED EASILY AS I AM QUICK TO LOSE INTEREST IN THINGS IN HAND |
| | CA | 6 | N | 6 | I GET FATIGUED BY HAVING TO FOCUS FOR LONG PERIODS OF TIME |
| | CA | 7 | N | 7 | WHEN I'M BY MYSELF, I FIND MYSELF DAY DREAMING INSTEAD OF GETTING THINGS DONE |
| | CA | 8 | N | 8 | WHEN I AM WITH OTHERS, PEOPLE DESCRIBE ME AS GETTING "ZONED OUT" AS THEY FIND ME STARRING INTO "NOWHERE" OR LOOKING "LOST" |
| | CA | 9 | N | 9 | I HAVE DIFFICULTY SUSTAINING FOCUS ON ONE TASK OR ACTIVITY WITHOUT TAKING A BREAK |
| | CA | 10 | N | 10 | I FIND MYSELF RUMINATING ON THINGS BY THINKING ABOUT THEM AGAIN AND AGAIN |
| | CA | 11 | N | 11 | I LOSE MY TRAIN OF THOUGHT WHILE SPEAKING WHEN SOMETHING INTERRUPTS THE FLOW |
| | CA | 12 | N | 12 | I FIND MYSELF NEEDING A BREAK AFTER HAVING DONE INTENSE FOCUSING |
| | CA | 13 | N | 13 | I LIKE TO TAKE FREQUENT BREAKS WHEN I AM DOING THINGS OR WORKING ON TEDIOUS THINGS |
| | CA | 14 | N | 14 | I GET DISTRACTED BY SMALLEST INTERRUPTIONS IN THE MIDDLE OF THE TASKS |
| | CA | 15 | N | 15 | I HAVE VERY LITTLE MENTAL STAMINA |
| WORKING MEMORY | WM | 16 | N | 1 | I FIND IT HARD TO DO MATH IN MY HEAD |
| | WM | 17 | N | 2 | I NOTICE THAT I DON'T FOLLOW ALL THE INSTRUCTIONS AS I FORGET SOME PARTS OF IT |
| | WM | 18 | N | 3 | I FIND MYSELF FORGETTING WHAT I CAME INTO THE ROOM FOR |
| | WM | 19 | N | 4 | I FIND IT HARD TO KEEP A MENTAL LIST OF THINGS TO DO IN MY HEAD |
| | WM | 20 | N | 5 | I REQUEST THAT PEOPLE REPEAT MULTISTEP DIRECTIONS AS I LOSE PARTS OF IT |
| | WM | 21 | N | 6 | I FIND THAT LISTENING TO DIRECTIONS WHILE READING SOMETHING ELSE IS HARD FOR ME |
| | WM | 22 | N | 7 | WHEN LISTENING, I FIND THAT I AM NOT ABLE TO ANSWER A QUESTION OR GIVE INFORMATION AS I FAIL TO GIVE CLOSE ATTENTION TO DETAILS |
| | WM | 23 | N | 8 | WHEN READING MATERIAL THAT TELLS YOU "HOW TO" DO SOMETHING I GET LOST IN THE STEPS |
| | WM | 24 | N | 9 | I FIND MYSELF RE-READING TEXT AS I FIND IT HARD TO KEEP TRACK OF DETAILS |

| WEIGHTAGE | | | | | | | SCORE DISTRIBUTION | | | | |
|---|---|---|---|---|---|---|---|---|---|---|---|
| NOT AT ALL/NEVER | SOMETIMES | FREQUENTLY | OFTEN | ALWAYS | ANSWER SELECTED | SCORE | HAS NO PROBLEM | HAS SOME PROBLEM | NEEDS SOME HELP | NEEDS DEFINITE HELP | NEEDS SIGNIFICANT & URGENT HELP |
| AT1 | AT2 | AT3 | AT4 | AT5 | | | | | | | |
| 1 | 2 | 3 | 4 | 5 | AT5 | 5 | 0 | 0 | 0 | 0 | 5 |
| 1 | 2 | 3 | 4 | 5 | AT2 | 2 | 0 | 2 | 0 | 0 | 0 |
| 1 | 2 | 3 | 4 | 5 | AT2 | 2 | 0 | 2 | 0 | 0 | 0 |
| 1 | 2 | 3 | 4 | 5 | AT2 | 2 | 0 | 2 | 0 | 0 | 0 |
| 1 | 2 | 3 | 4 | 5 | AT1 | 1 | 1 | 0 | 0 | 0 | 0 |
| 1 | 2 | 3 | 4 | 5 | AT1 | 1 | 1 | 0 | 0 | 0 | 0 |
| 1 | 2 | 3 | 4 | 5 | AT1 | 1 | 1 | 0 | 0 | 0 | 0 |
| 1 | 2 | 3 | 4 | 5 | AT1 | 1 | 1 | 0 | 0 | 0 | 0 |
| 1 | 2 | 3 | 4 | 5 | AT2 | 2 | 0 | 2 | 0 | 0 | 0 |
| 1 | 2 | 3 | 4 | 5 | AT2 | 2 | 0 | 2 | 0 | 0 | 0 |
| 1 | 2 | 3 | 4 | 5 | AT2 | 2 | 0 | 2 | 0 | 0 | 0 |
| 1 | 2 | 3 | 4 | 5 | AT1 | 1 | 1 | 0 | 0 | 0 | 0 |
| 1 | 2 | 3 | 4 | 5 | AT1 | 1 | 1 | 0 | 0 | 0 | 0 |
| 1 | 2 | 3 | 4 | 5 | AT1 | 1 | 1 | 0 | 0 | 0 | 0 |
| 1 | 2 | 3 | 4 | 5 | AT1 | 1 | 1 | 0 | 0 | 0 | 0 |
| 1 | 2 | 3 | 4 | 5 | AT2 | 2 | 0 | 2 | 0 | 0 | 0 |
| 1 | 2 | 3 | 4 | 5 | AT1 | 1 | 1 | 0 | 0 | 0 | 0 |
| 1 | 2 | 3 | 4 | 5 | AT2 | 2 | 0 | 2 | 0 | 0 | 0 |
| 1 | 2 | 3 | 4 | 5 | AT1 | 1 | 1 | 0 | 0 | 0 | 0 |
| 1 | 2 | 3 | 4 | 5 | AT2 | 2 | 0 | 2 | 0 | 0 | 0 |
| 1 | 2 | 3 | 4 | 5 | AT2 | 2 | 0 | 2 | 0 | 0 | 0 |
| 1 | 2 | 3 | 4 | 5 | AT2 | 2 | 0 | 2 | 0 | 0 | 0 |

FROM FIG. 2A

FIG. 20B

DATA PROCESSING SYSTEMS FOR PROCESSING AND ANALYZING DATA REGARDING SELF-AWARENESS AND EXECUTIVE FUNCTION

CROSS-REFERENCE TO RELATED APPLICATIONS

This application is a continuation-in-part of U.S. Patent Application Ser. No. 16/862,885, filed Apr. 30, 2020, entitled "Data Processing Systems for Processing and Analyzing Data Regarding Self-Awareness and Executive Function", which is a continuation-in-part of U.S. patent application Ser. No. 16/822,264, filed Mar. 18, 2020, entitled "Data Processing Systems for Processing and Analyzing Data Regarding Self-Awareness and Executive Function", which is a continuation-in-part of U.S. patent application Ser. No. 16/259,907, filed Jan. 28, 2019, now U.S. Pat. No. 10,600,018, entitled "Data Processing Systems for Processing and Analyzing Data Regarding Self-Awareness and Executive Function", which is a continuation-in-part of U.S. patent application Ser. No. 15/644,697, filed Jul. 7, 2017, now U.S. Pat. No. 10,191,830, entitled "Data Processing Systems for Processing and Analyzing Data Regarding Self-Awareness and Executive Function," the disclosures of which are hereby incorporated by reference in their entireties.

BACKGROUND

An individual's executive function may relate to, for example, their ability to complete tasks through skills such as planning, organization, memory, time management, and flexible thinking. An individual's executive function may include mental skills that help the individual's brain organize and act on information. These mental skills may enable the individual to plan, organize, remember things, prioritize, pay attention, and get started on particular tasks. These skills may also help an individual use information from past experiences to solve current problems.

Some individuals, particularly children, may struggle with activities related to executive functioning such as, for example: (1) keeping track of time; (2) making plans; (3) making sure work is finished on time; (4) multi-tasking; (5) applying previously learned information to solve a problem; (6) analyzing ideas; (7) looking for help or more information if they need it; and/or (8) a plurality of other activities that require the mental skills discussed above. Children who struggle with these activities may further have trouble with various executive skills such as, for example: (1) impulse control; (2) emotional control; (3) flexibility; (4) working memory; (5) self-monitoring; (6) task initiation; (7) organization; and/or (8) etc. Accordingly, there is a need for improved systems and methods to help individuals recognize their executive function limitations and improve upon them.

SUMMARY

A data processing system for processing data regarding the self-awareness of a user for use in the development of the user's executive functions, in various embodiments, comprises: (1) at least one computer processor; and (2) memory operatively coupled to the at least one computer processor. In particular embodiments, the at least one computer processor is configured for: (1) executing computer-readable instructions that, when executed by the at least one computer processor, facilitate the playing a game by the user; (2) gathering performance data indicating the user's performance while the user plays the game; and (3) automatically evaluating the performance data to assess, for the user, awareness of the user's abilities in performing a future task.

In various embodiments, a data processing system is configured for processing data regarding the self-awareness of a user for use in the development of the user's executive functions. In particular embodiments, the data processing system comprises: (1) at least one computer processor; and (2) memory operatively coupled to the at least one computer processor. In any embodiment described herein, the at least one computer processor may be adapted for: (1) executing computer-readable instructions that, when executed by the at least one computer processor, facilitate the playing a game by the user; (2) gathering performance data indicating the user's performance while the user plays the game; and (3) automatically evaluating the performance data to assess, for the user, awareness of the quality of their performance in a previously-performed task.

A data processing system for processing data regarding the self-awareness of a user for use in the development of the user's executive functions, according to particular embodiments, comprises: the data processing system comprising: (1) at least one computer processor; and (2) memory operatively coupled to the at least one computer processor. In any embodiment described herein, the at least one computer processor may be adapted for: (1) executing computer-readable instructions that, when executed by the at least one computer processor, facilitate the playing of a game by the user; (2) gathering performance data indicating the user's performance while the user plays the game; (3) prompting a user to input an indication of the level of difficulty of the game; (4) receiving, by one or more processors, from the user, an indication of the level of difficulty of the game; (5) performing a comparison of the input indication of the level of difficulty of the game with an actual level of difficulty of the game (e.g., as determined by the user's performance on the game and/or through an existing difficulty rating of the game); (6) using the results of the comparison to determine whether the user accurately assessed the game's level of difficulty; and (7) in response to determining that the user accurately assessed the game's level of difficulty increasing a self-awareness score for the user, and saving the increased self-awareness score to memory.

A computer-implemented data processing method for electronically receiving self-awareness assessment data related to a user and electronically calculating an awareness score of the user, in various embodiments, comprises: (1) providing a graphical user interface for completing a self-awareness assessment, the graphical user interface comprising: (A) at least one main task input associated with a main task; (B) at least one targeted item input associated with a first target item task; (C) at least one conditional input associated with an occurrence of a first condition task; and (D) at least one time condition occurrence input associated with a time condition task; (2) receiving a command to initiate a self-awareness assessment associated with the user; (3) creating an electronic record for the self-awareness assessment and digitally storing the record; (4) initiating the self-awareness assessment; (5) electronically receiving input data, during the self-awareness assessment.

In particular embodiments, the input data comprises: (1) a first input at a first time via the at least one main task input; (2) a second input at a second time via the at least one targeted item input; (3) a third input at a third time via the at least one conditional input; and (4) a fourth input at a fourth time via the at least one time condition occurrence input. In some embodiments, the method further comprises: (1) processing the input data by electronically associating the input data with the electronic record for the self-awareness assessment; and (2) using one or more computer processors, calculating an awareness score for the user based on the input data. In some embodiments, calculating the awareness score for the user comprises: (1) electronically adjusting the awareness score based at least in part on the first input, the first time, and/or one or more instructions associated with the main task; (2) electronically adjusting the awareness score based at least in part on the second input, the second time, and/or one or more instructions associated with the first target item task; (3) electronically adjusting the awareness score based at least in part on the third input, the third time, and/or one or more instructions associated with the first condition task; and/or (4) electronically adjusting the awareness score based at least in part on the fourth input, the fourth time, and/or one or more instructions associated with the time condition task. In particular embodiments, the method further comprises digitally storing the awareness score with the record for the self-awareness assessment.

In various embodiments, a data processing system is configured for processing data regarding the self-awareness of a user for use in the development of the user's executive functions. In some embodiments, the data processing system comprises: (1) at least one computer processor; and (2) memory operatively coupled to the at least one computer processor. In various embodiments, the at least one computer processor is adapted for: (1) executing computer-readable instructions that, when executed by the at least one computer processor, facilitate the completion of a self-awareness assessment by the user; and (2) displaying, a set of instructions associated with the self-awareness assessment. In particular embodiments, the set of instructions comprises: (1) one or more instructions associated with a main task of the self-awareness assessment; (2) one or more instructions associated with an embedded task of the self-awareness assessment, the embedded task occurring during the main task; and (3) one or more instructions associated with a conditional task of the self-awareness assessment.

In various embodiments, the at least one computer processor is further adapted for: (1) electronically receiving, via the graphical user interface, during the self-awareness assessment, input data comprising: (A) one or more inputs associated with the main task at one or more first times; (B) one or more inputs associated with the embedded task at one or more second times; and (C) one or more inputs associated with the conditional task at one or more third times; and (2) processing the input data by calculating an awareness score for the user based on the input data. In some embodiments, calculating the awareness score comprises: (1) electronically adjusting the awareness score based at least in part on the one or more instructions associated with the main task, the one or more inputs associated with the main task, and/or the one or more first times; (2) electronically adjusting the awareness score based at least in part on the one or more instructions associated with the embedded task, the one or more inputs associated with the embedded task, and/or the one or more second times; and (3) electronically adjusting the awareness score based at least in part on the one or more instructions associated with the conditional task, the one or more inputs associated with the conditional task, and/or the one or more third times. In still other embodiments, the at least one computer processor is further adapted for: (1) digitally storing, in the memory, the awareness score; and (2) associating, in the memory, the awareness score with the user.

In various embodiments, a data processing system for processing data regarding error evaluation for use in the development of a first user's executive functions, comprises: (1) at least one computer processor; and (2) memory operatively coupled to the at least one computer processor. In particular embodiments, the at least one computer processor is adapted for: (1) executing computer-readable instructions that, when executed by the at least one computer processor, facilitate evaluating, by the first user, an electronic activity completed by a second user; (2) displaying, via a graphical user interface, a visual representation of the second user completing the electronic activity; (3) while displaying the visual representation of the second user completing the electronic activity, gathering feedback data from the first user indicating the second user's performance on the electronic activity; (4) automatically evaluating the feedback data to determine a learning score for the first user (which may, for example, reflect the user's ability to evaluate other users' performance of one or more particular activities), wherein evaluating the feedback data comprises modifying the learning score based at least in part on the feedback data; and (5) digitally storing the learning score in an electronic record associated with the first user.

A data processing system for processing data regarding the self-awareness of a user for use in the development of the user's executive functions, according to some embodiments, comprises: (1) at least one computer processor; and (2) memory operatively coupled to the at least one computer processor. In some embodiments, the at least one computer processor is adapted for: (1) creating an electronic record for a self-awareness training plan associated with the user and digitally storing the record; (2) executing computer-readable instructions that, when executed by the at least one computer processor, facilitate the completion of one or more electronic activities by the user; (3) gathering performance data indicating the user's performance while the user completes the one or more electronic activities; (4) automatically evaluating the performance data to assess, for the user, a self-awareness level of the user; (5) digitally storing the awareness score with the record for the self-awareness training plan; (6) identifying one or more goals for the user based at least in part on the performance data and the self-awareness level; (7) gathering strategy data for the user related to the identified one or more goals; (8) automatically evaluating the strategy data to assess, for the user, a progression score (also referred to herein as an "executive function progression score"); and (9) digitally storing the progression score with the record for the self-awareness training plan.

A computer-implemented data processing method for electronically receiving self-awareness assessment data related to a user and electronically calculating an awareness score of the user, according to various embodiments, may include: providing, by one or more processors on a video display unit, a graphical user interface for completing a self-awareness assessment, the graphical user interface comprising: at least one main task input associated with a main task, wherein the main task includes one or more instructions associated with the main task; at least one targeted item input associated with a first target item task; at least one conditional input associated with an occurrence of a first condition task; and at least one time condition occurrence input associated with a time condition task. The data processing method may also include receiving a command to initiate a self-awareness assessment associated with the user;

creating, by one or more processors, an electronic record for the self-awareness assessment and digitally storing the electronic record; initiating, by one or more processors, the self-awareness assessment; electronically receiving, by one or more processors via an input device during the self-awareness assessment, input data comprising: a first input at a first time via the at least one main task input; a second input at a second time via the at least one targeted item input; a third input at a third time via the at least one conditional input; and a fourth input at a fourth time via the at least one time condition occurrence input.

According to various embodiments, the data processing method may also include processing, by one or more processors, the input data by electronically associating the input data with the electronic record for the self-awareness assessment; calculating, by one or more processors, a performance score for the user based at least in part on (i) the one or more instructions associated with the main task and (ii) the first input at the first time via the at least one main task input, wherein the performance score is associated with the user's performance in completing the main task; calculating, by one or more processors, an awareness score for the user based on the input data, wherein calculating the awareness score for the user comprises: electronically adjusting, by one or more processors, the awareness score based at least in part on the first input, the first time, and the one or more instructions associated with the main task; electronically adjusting, by one or more processors, the awareness score based at least in part on the second input, the second time, and one or more instructions associated with the first target item task; electronically adjusting, by one or more processors, the awareness score based at least in part on the third input, the third time, and one or more instructions associated with the first condition task; and electronically adjusting, by one or more processors, the awareness score based at least in part on the fourth input, the fourth time, and one or more instructions associated with the time condition task; and digitally storing, by one or more processors, the awareness score and the performance score with the electronic record for the self-awareness assessment.

A computer-implemented data processing method for electronically receiving strategy assessment data related to an executive functions development training activity and electronically calculating a strategy score, according to various embodiments, may include: providing, by one or more processors on a video display unit, a first graphical user interface for performing an executive functions development training activity; presenting, by one or more processors on the first graphical user interface, a first option to access first strategy assistance before execution of the executive functions development training activity; electronically receiving, by one or more processors via an input device before the execution of the executive functions development training activity, first input data associated with the first option to access first strategy assistance; electronically calculating, by one or more processors, a strategy score for the user based on the first input data; initiating, by one or more processors, the execution of the executive functions development training activity; presenting, by one or more processors on the first graphical user interface, a second option to access second strategy assistance during the execution of the executive functions development training activity; electronically receiving, by one or more processors via the input device during the execution of the executive functions development training activity, second input data associated with the second option to access second strategy assistance; electronically adjusting, by one or more processors, the strategy score for the user based on the second input data; creating, by one or more processors, an electronic record for strategy assessment and digitally storing the electronic record for strategy assessment; and digitally storing, by one or more processors, the strategy score for the user with the electronic record for strategy assessment.

In particular embodiments, the first strategy assistance comprises a first strategy for performing the executive functions development training activity; and the second strategy assistance comprises a second strategy for performing the executive functions development training activity. In particular embodiments, the first input data comprises a request to present the first strategy for performing the executive functions development training activity on a second graphical user interface; and electronically calculating the strategy score for the user based on the first input data comprises adjusting the strategy score for the user by adding a maximum value to the strategy score. In particular embodiments, the second input data comprises a request to present the second strategy for performing the executive functions development training activity on a second graphical user interface; and electronically adjusting the strategy score for the user based on the second input data comprises adjusting the strategy score for the user by adding an incremental value to the strategy score, wherein the incremental value is less than the maximum value. In particular embodiments, the method may further include detecting a user error during a user performance of a task within the executive functions development training activity; wherein the second strategy assistance comprises an option to repeat the task within the executive functions development training activity; wherein the second input data comprises a selection of the option to repeat the task within the executive functions development training activity; and wherein electronically adjusting the strategy score for the user based on the second input data comprises adjusting the strategy score for the user by adding a maximum value to the strategy score. In particular embodiments, the first strategy assistance comprises an option to execute a trial executive functions development training activity. In particular embodiments, the first input data comprises a selection of the option to execute the trial executive functions development training activity; wherein the method further comprises: initiating the execution of the trial executive functions development training activity; detecting completion of the trial executive functions development training activity; and determining a user score for the trial executive functions development training activity; and wherein electronically calculating the strategy score for the user based on the first input data comprises: if the user score for the trial executive functions development training activity meets an accuracy threshold, adjusting the strategy score for the user by increasing the strategy score; and if the user score for the trial executive functions development training activity does not meet the accuracy threshold, adjusting the strategy score for the user by decreasing the strategy score. In particular embodiments the first input data comprises an indication that the option to execute the trial executive functions development training activity was not selected; and electronically calculating the strategy score for the user based on the first input data comprises, at least in part in response to the indication that the option to execute the trial executive functions development training activity was not selected, adjusting the strategy score for the user by decreasing the strategy score.

A data processing system for processing data regarding strategy assessment and calculating a strategy score for use in the development of a user's executive functions, according to various embodiments, may include: at least one computer processor; and memory operatively coupled to the at least one computer processors, wherein the at least one computer processor is adapted for: executing computer-readable instructions that, when executed by the at least one computer processor, facilitate the completion of an executive functions development training activity by the user, wherein the computer-readable instructions comprise instructions for: presenting, on a video display unit, a first graphical user interface for performing an executive functions development training activity; initiating the execution of the executive functions development training activity; presenting, on the first graphical user interface, a first option to access first strategy assistance during the execution of the executive functions development training activity; receiving, via an input device during the execution of the executive functions development training activity, first input data associated with the first option to access first strategy assistance; detecting completion of the executive functions development training activity; prompting the user for feedback data associated with the first input data; receiving, via the input device, the feedback data associated with the first input data; adjusting, by one or more processors, the strategy score for the user based on the feedback data associated with the first input data; creating, by one or more processors, an electronic record for strategy assessment and digitally storing the electronic record for strategy assessment; and storing, by one or more processors, the strategy score for the user with the electronic record for strategy assessment.

In particular embodiments, the computer-readable instructions further include instructions for: presenting, to the user, a request to select one or more executive functions associated with the executive functions development training activity; receiving, via the input device, an indication of the one or more executive functions associated with the executive functions development training activity selected by the user; determining that the selected one or more executive functions associated with the executive functions development training activity correspond to one or more correct executive functions; and at least partially in response to determining that the selected one or more executive functions associated with the executive functions development training activity correspond to the one or more correct executive functions; adjusting the strategy score for the user by increasing the strategy score for the user. In particular embodiments, the computer-readable instructions further include instructions for: presenting, to the user, a request to order a plurality of executive functions associated with the executive functions development training activity based on the relative significance of each respective executive function to the executive functions development training activity; receiving, via the input device, an indication of an order of the plurality of executive functions associated with the executive functions development training activity; determining that the indicated order of the plurality of executive functions associated with the executive functions development training activity corresponds to a correct order of executive functions; and at least partially in response to determining that the indicated order of the plurality of executive functions associated with the executive functions development training activity corresponds to the correct order of executive functions; adjusting the strategy score for the user by increasing the strategy score for the user. In particular embodiments, the feedback data associated with the first input data comprises a user selection of a rationale associated with the first input data; wherein the computer-readable instructions further comprise instructions for: prompting the user for a selection of a recommended strategy for other users to use during performance of the executive functions development training activity; determining a rationale associated with the recommended strategy; determining whether the rationale associated with the recommend strategy corresponds to the rationale associated with the first input data; at least partially in response to determining that the rationale associated with the recommend strategy corresponds to the rationale associated with the first input data, adjusting the strategy score for the user by increasing the strategy score for the user by a maximum value; and at least partially in response to determining that the rationale associated with the recommend strategy does not corresponds to the rationale associated with the first input data: determining that the recommend strategy corresponds to a significant strategy; and at least partially in response to determining that the recommend strategy corresponds to the significant strategy, adjusting the strategy score for the user by increasing the strategy score for the user by an incremental value, wherein the incremental value is less than the maximum value.

A computer-implemented data processing method for electronically processing strategy error analysis data related to an executive functions development training activity and electronically calculating a strategy score, according to various embodiments, may include: providing, by one or more processors on a video display unit, a first graphical user interface for performing an executive functions development training activity; initiating, by one or more processors, the execution of the executive functions development training activity; detecting, by one or more processors during the execution of the executive functions development training activity, a user error during a user's performance of a task within the executive functions development training activity; presenting, by one or more processors on the first graphical user interface during the execution of the executive functions development training activity, a request for feedback data associated with the task; electronically receiving, by one or more processors via the input device during the execution of the executive functions development training activity, the feedback data associated with the task; electronically adjusting, by one or more processors, the strategy score for the user based on the feedback data associated with the task; creating, by one or more processors, an electronic record for strategy assessment and digitally storing the electronic record for strategy assessment; and digitally storing, by one or more processors, the strategy score for the user with the electronic record for strategy assessment.

In particular embodiments, the request for feedback data associated with the task comprises a request for a user selection of a strategy that the user believes would be helpful to another user performing the task; wherein the feedback data associated with the task comprises the user selection of the strategy that the user believes would be helpful to another user performing the task; and wherein electronically adjusting the strategy score for the user based on the feedback data associated with the task comprises: determining whether the strategy that the user believes would be helpful to another user performing the task corresponds to a predefined strategy; and at least partially in response to determining that the strategy that the user believes would be helpful to another user performing the task corresponds to the predefined strategy, adjusting the strategy score for the user by increasing the strategy score for the user by a maximum value. In particular embodiments, the request for feedback data associated with the task comprises a request for a user selection of a reason that another user may have made an error in performing the task; wherein the feedback data associated with the task comprises the user selection of the reason that another user may have made a mistake in performing the task; and wherein electronically adjusting the strategy score for the user based on the feedback data associated with the task comprises: determining whether the reason that another user may have made an error in performing the task corresponds to a predefined reason; and at least partially in response to determining that the reason that another user may have made an error in performing the task corresponds to the predefined reason, adjusting the strategy score for the user by increasing the strategy score for the user by a maximum value. In particular embodiments, the request for feedback data associated with the task comprises a request for a user selection of an executive functions skill associated with the task; wherein the feedback data associated with the task comprises the user selection of the executive functions skill associated with the task; and wherein electronically adjusting the strategy score for the user based on the feedback data associated with the task comprises: determining whether the selected executive functions skill associated with the task corresponds to a predefined executive functions skill; and at least partially in response to determining that the selected executive functions skill associated with the task corresponds to a predefined executive functions skill, adjusting the strategy score for the user by increasing the strategy score for the user by a maximum value. In particular embodiments, the request for feedback data associated with the task comprises a request for a user rating of assistance associated with the task; wherein the feedback data associated with the task comprises the user rating of the assistance associated with the task; and wherein electronically adjusting the strategy score for the user based on the feedback data associated with the task comprises: determining a category from among a plurality of categories that corresponds to the user rating of the assistance associated with the task; at least partially in response to determining that the category that corresponds to the user rating of the assistance associated with the task is a first category, adjusting the strategy score for the user by increasing the strategy score for the user by a maximum value; at least partially in response to determining that the category that corresponds to the user rating of the assistance associated with the task is a second category, adjusting the strategy score for the user by increasing the strategy score for the user by an incremental value, wherein the incremental value is less than the maximum value; and at least partially in response to determining that the category that corresponds to the user rating of the assistance associated with the task is a third category, adjusting the strategy score for the user by decreasing the strategy score for the user by a maximum value. In particular embodiments, presenting the request for the feedback data associated with the task comprises determining a real-life scenario based on the user error and presenting the real-life scenario to the user; wherein the request for feedback data associated with the task comprises a request for feedback on the real-life scenario; and wherein electronically adjusting the strategy score for the user based on the feedback data associated with the task comprises adjusting the strategy score for the user based on the feedback on the real-life scenario.

A data processing system for processing data regarding strategy assessment and electronically calculating a strategy score for use in the development of a user's executive functions, according to various embodiments, may include: at least one computer processor; and memory operatively coupled to the at least one computer processors, wherein the at least one computer processor is adapted for: executing computer-readable instructions that, when executed by the at least one computer processor, facilitate the completion of an executive functions development training activity by the user, wherein the computer-readable instructions comprise instructions for: presenting, on a video display unit, a first graphical user interface for performing an executive functions development training activity; initiating the execution of the executive functions development training activity; detecting completion of the executive functions development training activity; prompting the user for feedback data associated with the executive functions development training activity; receiving, via the input device, the feedback data associated with the executive functions development training activity; adjusting, by one or more processors, the strategy score for the user based on the feedback data associated with the executive functions development training activity; creating, by one or more processors, an electronic record for strategy assessment and digitally storing the electronic record for strategy assessment; and storing, by one or more processors, the strategy score for the user with the electronic record for strategy assessment.

In particular embodiments, prompting the user for the feedback data associated with the executive functions development training activity comprises: presenting a plurality of strategies to the user, wherein each strategy of the plurality of strategies is associated with a respective executive function category; and prompting the user for feedback for each strategy of the plurality of strategies; receiving the feedback data associated with the executive functions development training activity comprises receiving the feedback for each strategy of the plurality of strategies; and adjusting the strategy score for the user based on the feedback data associated with the executive functions development training activity comprises adjusting the strategy score for the user based on the feedback for each strategy of the plurality of strategies and the strategy score. In particular embodiments, prompting the user for the feedback data associated with the executive functions development training activity comprises: presenting a user-created video to the user, wherein the user created the user-created video prior to the execution of the executive functions development training activity; and prompting the user for feedback on the user-created video; receiving the feedback data associated with the executive functions development training activity comprises receiving the feedback on the user-created video; and adjusting the strategy score for the user based on the feedback data associated with the executive functions development training activity comprises adjusting the strategy score for the user based on the feedback on the user-created video. In particular embodiments, prompting the user for the feedback data associated with the executive functions development training activity comprises: presenting a profile and goals to the user, wherein the profile and goals are associated with the user; and prompting the user for feedback on the profile and goals; receiving the feedback data associated with the executive functions development training activity comprises receiving the feedback on the profile and goals; and adjusting the strategy score for the user based on the feedback data associated with the executive functions development training activity comprises adjusting the strategy score for the user based on the feedback on the profile and goals. In particular embodiments, prompting the user for the feedback data associated with the executive functions development training activity comprises: presenting a real-life scenario to the user, wherein the real-life scenario is associated with the executive functions development training activity; and prompting the user for user feedback on the real-life scenario; receiving the feedback data associated with the executive functions development training activity comprises: receiving the user feedback on the real-life scenario; and obtaining discussion partner feedback on the real-life scenario; and adjusting the strategy score for the user based on the feedback data associated with the executive functions development training activity comprises: determining whether the user feedback on the real-life scenario corresponds to the discussion partner feedback on the real-life scenario; at least partially in response to determining that the user feedback on the real-life scenario corresponds to the discussion partner feedback on the real-life scenario, adjusting the strategy score for the user by increasing the strategy score for the user by a maximum value; and at least partially in response to determining that the user feedback on the real-life scenario does not correspond to the discussion partner feedback on the real-life scenario, adjusting the strategy score for the user by increasing the strategy score for the user by an incremental value, wherein the incremental value is less than the maximum value.

A computer-implemented data processing method for electronically providing training partner coaching assessment related to an executive functions development training activity, according to various embodiments, may include: providing, by one or more computer processors on a video display unit, a first graphical user interface for performing a partner coaching training activity; presenting, by one or more computer processors on the first graphical user interface, preliminary training content to a user before execution of the partner coaching training activity; selecting, by one or more computer processors, a first virtual training partner from a plurality of virtual training partners, wherein each virtual training partner of the plurality of virtual training partners is associated with one or more respective behaviors; determining, by one or more computer processors, the one or more respective behaviors associated with the first virtual training partner; generating, by one or more computer processors, scenario content based at least in part on the first virtual training partner and the one or more respective behaviors associated with the first virtual training partner; and executing the partner coaching training activity by: presenting, by one or more computer processors on the first graphical user interface, the scenario content to the user; prompting, by one or more computer processors, the user to provide training partner coaching feedback; receiving, by one or more computer processors via the first graphical user interface, the training partner responses, actions, and/or coaching feedback from the user; assessing, by one or more computer processors, the training partner responses, actions, and/or coaching feedback; generating, by one or more computer processors, assessment information based at least in part on the assessment of the training partner responses, actions, and/or coaching feedback; and presenting, by one or more computer processors on the first graphical user interface, the assessment information to the user.

In particular embodiments, the method may further include: generating, by one or more computer processors, follow-up content based at least in part on the training partner responses, actions, and/or coaching feedback; and presenting, by one or more computer processors on the first graphical user interface, the follow-up content to the user. In particular embodiments, the follow-up content is generated further based at least in part on the first virtual training partner. In particular embodiments, the preliminary training content comprises video content. In particular embodiments, the scenario content comprises video content. In particular embodiments, the follow-up content comprises interactive content. In particular embodiments, the method may also include: generating, by one or more computer processors, each of the plurality of virtual training partners based at least in part on a respective behavioral profile associated with each respective virtual training partner of the plurality of virtual training partners. In particular embodiments, the method may also include: at least partially in response to detecting completion of the partner coaching training activity, selecting, by one or more computer processors, a second virtual training partner from the plurality of virtual training partners, wherein the second virtual training partner is different than the first virtual training partner. In particular embodiments, the method may also include: executing, by one or more computer processors, a subsequent partner coaching training activity using the second virtual training partner. In particular embodiments, selecting the second virtual training partner from the plurality of virtual training partners comprises randomly selecting, by one or more processors, the second virtual training partner from the plurality of virtual training partners.

A data processing system for processing data regarding training partner coaching assessment for use in the development of a user's executive functions, according to various embodiments, may include: at least one computer processor; and memory operatively coupled to the at least one computer processors, wherein the at least one computer processor is adapted for: providing, on a video display unit, a first graphical user interface for performing a partner coaching training activity; presenting, on the first graphical user interface, preliminary training content to a user before execution of the partner coaching training activity; selecting a first virtual training partner from a plurality of virtual training partners, wherein each virtual training partner of the plurality of virtual training partners is associated with one or more respective behaviors; determining the one or more respective behaviors associated with the first virtual training partner; generating scenario content based at least in part on the first virtual training partner and the one or more respective behaviors associated with the first virtual training partner; and executing the partner coaching training activity by: presenting, on the first graphical user interface, the scenario content to the user; following the presentation of the scenario content to the user, generating, on the first graphical user interface, a user input soliciting training partner responses, actions, and/or coaching feedback from the user; receiving, via the user input on the first graphical user interface, the training partner responses, actions, and/or coaching feedback from the user; assessing the training partner coaching feedback; generating assessment information based at least in part on the assessment of the training partner responses, actions, and/or coaching feedback; and presenting, on the first graphical user interface, the assessment information to the user.

In particular embodiments, the at least one computer processor is further adapted for: generating follow-up content based at least in part on the first virtual training partner; and presenting, by one or more computer processors on the first graphical user interface, the follow-up content to the user. In particular embodiments, the follow-up content comprises one or more executive functions development training activities. In particular embodiments, generating the assessment information comprises calculating a numerical assessment score based at least in part on the assessment of the training partner responses, actions, and/or coaching feedback. In particular embodiments, the scenario content comprises content associated with a classroom environment. In particular embodiments, the first virtual training partner represents a student. In particular embodiments, the preliminary content comprises one or more executive functions development training activities. In particular embodiments, the at least one computer processor is further adapted for: at least partially in response to detecting completion of the partner coaching training activity, selecting a second virtual training partner from the plurality of virtual training partners. In particular embodiments, the at least one computer processor is further adapted for: executing a subsequent partner coaching training activity using the second virtual training partner. In particular embodiments, selecting the second virtual training partner from the plurality of virtual training partners comprises sequentially selecting the second virtual training partner from the plurality of virtual training partners.

BRIEF DESCRIPTION OF THE DRAWINGS

Various embodiments of a self-awareness assessment system are described below. In the course of this description, reference will be made to the accompanying drawings, which are not necessarily drawn to scale, and wherein:

FIGS. 19-24B depict exemplary screen displays and graphical user interface (GUI) according to various embodiments of the system, which may display information associated with the system or enable access to or interaction with the system by one or more users, completion of one or more evaluation sessions by one or more users, etc.

DETAILED DESCRIPTION

Figure 1:
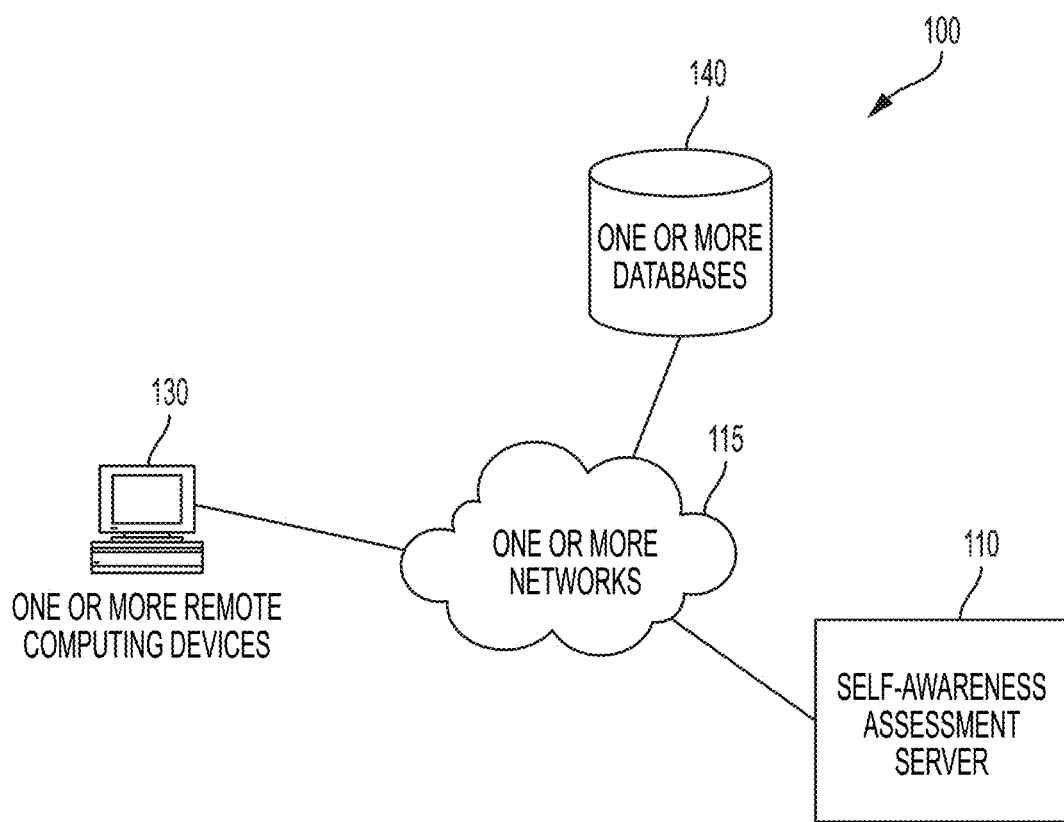
FIG. 1 depicts a self-awareness assessment system according to particular embodiments.

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

A self-awareness system, according to various embodiments, is configured to: (1) assess the self-awareness of a user in performing one or more iterations of a particular activity (e.g., an electronic game or other activity). In particular embodiments, the system may do this by: (1) generating multiple iterations of a particular electronic activity; (2) having the user complete the multiple iterations of the particular electronic activity; (3) in the context of the user executing the multiple iterations of the particular electronic activity, prompting the user for feedback regarding the user's past or future performance in performing one or more of the particular iterations of the particular electronic activity; (4) as the user executes each iteration of the particular electronic activity, collecting data regarding the user's actual performance while executing the particular electronic activity; (5) comparing the user's assessment of their performance with the data regarding the user's actual performance; (6) based on the comparison, determining whether the user was accurate in assessing their performance in executing the one or more iterations of the particular electronic activity; (7) adjusting a self-awareness score for the user based at least partially on the user's determined accuracy level in assessing their performance in executing the one or more iterations of the particular electronic activity; and (8) saving the user's adjusted self-awareness score to computer memory.

In particular embodiments, the system may present the user with the option to use one or more performance aids before, during, or after their execution of one or more iterations of the particular electronic activity. The one or more performance aids may include, for example: (1) a demonstration of how the particular electronic activity should be performed (e.g., a demonstration of the successful play of a particular electronic game); (2) one or more hints as to how to improve their performance at the particular electronic activity; (3) an opportunity to redo their performance of a particular iteration of the particular electronic activity; and/or (4) an opportunity to practice the particular electronic activity before being scored on their performance of the electronic activity—e.g., by executing a "dry run" of the particular electronic activity, which may, for example, be a particular game. In various embodiments, the system may automatically modify the user's self-awareness score and/or the user's performance score for the particular iteration of the particular electronic activity in response to the user choosing to use one or more of the performance aids in completing the one or more iterations of the electronic activity. For example, in a particular embodiment, if the user elects to use one or more of the performance aids in conjunction with completing a particular iteration of a particular electronic activity, the system may increase the user's self-awareness score and decrease a performance score that reflects the user's performance in executing the particular iteration of the particular activity.

In particular embodiments, the system may require a user to use one or more particular performance aids before executing a particular electronic activity. For example, the system may require a user to execute a dry run of a particular game before playing the game for points or other credit. In particular embodiments, if the system requires a dry run for a particular game, the system may increase the user's awareness score if the user's performance during the scored version of the game is accurate (e.g., the user's performance in playing the game is above a pre-defined threshold) and decrease the user's awareness score if the user's performance during the scored version of the game is inaccurate (e.g., the user's performance in playing the game is below a pre-defined threshold).

The system may also, or alternatively, adjust the user's self-awareness score based on the user's awareness of why their performance was the way that it was. For example, if the user performed well on a particular iteration of the electronic activity in which the user elected to use one or more optional performance aids, and the user indicated that they did well in that particular iteration because they used the performance aid, the system may increase the user's self-awareness score. However, if the user indicated that they performed well on a particular iteration of a particular electronic activity because they used a performance aid, when in fact they didn't use a performance aid, the system may decrease the user's self-awareness score to reflect that they user didn't accurately remember what happened when executing the iteration of the electronic activity (which may be indicative of the user not being aware of what they are doing).

The system may also, or alternatively, adjust the user's self-awareness score based on the user's awareness of the level of difficulty of a particular iteration of a particular game. For example, if the system arranges to have the user play the same electronic game five times, the system may prompt the user, after each iteration of the game, how difficult that iteration of the particular game was. The system may then compare the user's answers with an actual relative difficulty level of the game to determine how accurately the user assessed the difficulty of each iteration of the game. The system may then adjust the user's self-awareness score based on the assessed accuracy (e.g., the system may increase the user's self-awareness score if the user accurately assessed the difficulty of each iteration, or decrease the user's self-awareness score if the user was not accurate in assessing the difficult of one or more of the iterations.)

In various embodiments, the system may further measure a user's self-awareness (e.g., adjust the self-awareness score) based at least in part on the user's actions during the playing of a particular game or completion of an electronic activity. For example, a particular game may include one or more instructions, challenges, or other tasks that the user is instructed to perform while the user is playing the game that are designed to test the user's awareness. A particular game may, for example, include a main task that the user is performing as part of the game in addition to one or more sub-tasks, conditional tasks, time-based tasks, etc. In various embodiments, each particular sub-task, conditional task, etc. may include a trigger as well as an action that the user is supposed to perform in response to that trigger. These tasks that are in addition to the main task may be designed to test whether the user can maintain awareness of these other tasks that are secondary to the main task (e.g., which may test multi-tasking and other skills related to executive function).

For example, a particular game may include a targeted task that includes an instruction for the user to press a particular button if the user sees a particular image on the screen while the user is playing the game. The system may, for example, adjust the user's awareness score based on whether the user notices the image pop up and presses the button. If, for example, the user does not press the button, the system may decrease the user's awareness score. If the user notices the image and presses the button immediately, the system may increase the user's awareness score. If the user notices the image and presses the button after a delay, the system may increase the user's awareness score by an amount less than if the user had pressed the button immediately after the image appeared.

In another example, a particular game may include a conditional task that includes a triggering event and an action that the user should take if the triggering event occurs. In various embodiment's, the triggering event for the conditional task includes a particular event occurring while the user is playing the game (e.g., the user performs a particular action as part of the main task, the user provides a particular input value to the system while performing the main task, etc.). The system may instruct the user to press a particular button or perform any other suitable action if the user recognizes that the triggering event occurred while the user is playing the game. In this example, the system may modify the user's awareness score based on whether the user recognizes the triggering event and how quickly the user performs the action (e.g., pressing the button) after recognizing it. In particular embodiments, the system is configured to measure the user's awareness based on whether the user is able to remember to remember additional instructions while performing a primary or main task of a particular game (e.g., using one or more prospective memory skills).

In particular embodiments the system is further configured to provide an interface with which the user can review and evaluate the user's own or another user's performance on a particular game. The system may, for example, display a replay of another user's performance of a particular game (e.g., a visual representation of the user's actions). While the user is reviewing the other user's play in a particular game, the system may be configured to prompt the user to evaluate one or more errors made by the other user. In particular embodiments, the system is configured to modify the user's awareness score in response to the user correctly identifying a type of a particular error. In still other embodiments, the system is configured to modify the user's score if the user is able to evaluate a correct reason for the error. In particular embodiments, the system is configured to enable the user to evaluate their own performance (e.g., without informing the user that it is their own performance that they are evaluating). Some individuals may, for example, be unable to recognize their own shortcomings, but are better able to point out mistakes and reasons for mistakes in others. By presenting the user with their own performance for their review, the system may be configured to enable the user to evaluate their own performance more accurately or openly.

In particular embodiments, the system is configured to provide feedback to the user during a particular evaluation session. For example, by having the user identify one or more errors in replays of games previously played by themselves or others, the system may teach the user to identify errors in execution when playing a game and reasons for those errors. In particular embodiments, this teaching may enable the user to identify potential errors in the future when the user is playing other iterations of various games. In particular embodiments, the system is further configured to modify a user's awareness score based at least in part on the user's recognition of the benefit of the evaluation sessions. For example, the system may be configured to increase the user's awareness score in response to the user providing feedback that the evaluations and feedback that the user received was helpful and that the user will incorporate that feedback into their life.

In particular embodiments, the system is configured to create an electronic record for each individual user, which may, for example, include a user profile. In various embodiments, the system may populate the user profile with information regarding the user's strengths and weaknesses relating to the user's executive function. The system may identify these strengths and weaknesses based at least in part on data related to the user's performance and self-awareness determined during the user's completion of the various iterations of games and other electronic activities discussed above. In particular embodiments, the system is configured to calculate a self-awareness score, performance score, etc. for a user based on the user's performance on one or more particular activities such as one or more self-awareness assessments, one or more games, etc. The system may then generate and/or store goals for the user and associate those goals with the user profile.

In particular embodiments, the system is adapted to implement a training process for improving the user's executive function (e.g., such as the executive function skills discussed above). For example, the system may provide a plurality of training games that are tailored to the user and based at least in part on the user's goals. The system may, for example, as part of the training process, track the user's progress by analyzing one or more connections between the user's strategy in playing particular games, the user's goals, and real-life skills that the user is attempting to develop.

As part of the training process, the system may measure the user's ability to connect strategies for performing in particular games to real life skills and the user's goals. The system may, for example, calculate a score for the user that relates to the user's ability to evaluate the usefulness of particular strategies that reflect a connection between new things the user has learned while evaluating errors and real-life skills that are reflected in the user's goals. For example, the system, in various embodiments, may be configured to modify such a score based on a user's ability to: (1) identify one or more effective habits to take away from evaluating another user's performance in particular games; (2) pick a strategy aid that actually helps the user's performance in a particular game (e.g., results in improved performance); (3) match one or more strategies or habits to particular life goals; (4) rate the usefulness of provided strategies; and/or (5) etc.

In various embodiments, for example as part of an executive functions training process, the system may generate a strategy score for a user. The system may measure a user's ability to: (1) connect training goals to an electronic activity (e.g., game) experience; (2) connect an electronic activity experience to one or more strategies (e.g., recommended strategies); and/or (3) connect one or more strategies to one or more real-life skills (e.g., skills that may aid in the development of executive functions). The system may utilize one or more methods to perform or obtain such measurements. For example, the system may provide an electronic activity (e.g., game) to a user and measure, based on the user's performance during the activity, the connection of the user's knowledge of goals and performance to strategies and life skills.

In particular examples, the system may expose the user to strategies before and/or during the activity (e.g., gameplay), measure the user's strategy performance during the activity, and generate a strategy score based on the measurements of the user's strategy performance during the activity. In various embodiments, the system may perform, before or during the activity, one or more of: (1) providing one or more strategy reviews to the user during the activity (e.g., in-game strategy review); (2) providing one or more prompts to the user to review strategy during the activity (e.g., prompts from a coach); and/or (3) generating one or more strategies for or on behalf of the user during the activity. In particular examples, the system may perform post-activity (e.g., end-game) strategy review. For example, the system may facilitate the selection of a (e.g., most) salient strategy (by the user and/or by the system), a strategically assessed effective mindset (by the user and/or by the system), etc. The system may generate one or more strategies based on the mistakes of other users. The system may also facilitate the review of a user's personal approach and game-based insights during Mindful Examination of Thinking and Awareness (META) training and the periodic review of goals and/or strategies (e.g., daily, weekly, etc.).

In various embodiments, the system will expose the user to one or more strategies before and during the activity (e.g., before gameplay starts and during the game) and measure the user's strategy-related choices. The system may then generate and/or modify the user's strategy score based on such measurements. In particular examples, the system may provide the user with the option to view a particular strategy (e.g., game plan) before or during an activity. The system may adjust the user's strategy score based on the user's response to such an option. For example, the system may: (1) increase (e.g., add a maximum value to) the user's strategy score if the user chooses to view the game plan before starting the activity; (2) increase (e.g., add an incremental value less than a maximum value to) the user's strategy score if the user chooses to view the game plan during (e.g., after commencing and before ending) the activity; and/or (3) not change the user's strategy score if the user does not choose to view the game plan before or during the activity.

In various embodiments, the system may detect that the user has made one or more mistakes during performance of the activity. At least partially in response to detecting such mistakes, the system may facilitate the prompting (e.g., prompting by a coach) of the user to make use of assistance that may be provided by the activity (e.g., hints, repeat task (re-do) opportunities, tutorials, etc.). When the user chooses to make use of (e.g., view, perform, etc.) one or more assistance offers after being prompted, the system may increase (e.g., add a maximum value to) the user's strategy score in response to the user's acceptance of assistance options. When the user declines to make use of one or more assistance offers after being prompted, the system may not change the user's strategy score in response to the user's non-use of assistance options.

In various embodiments, the system may provide an option for the user to perform a trial run ("dry run") of the activity prior to actually performing the activity to obtain a score. By providing this option, the system may promote practice and experiential knowledge and gain measurements that may be used to generate and/or modify a user's strategy score to reflect the connection between new game demands and learning strategy. At the initiation of an activity, the system may offer the user the opportunity to engage in such a dry run. If the user chooses to perform the dry run, the system may increase the user's strategy score. In particular embodiments, the system may increase the user's strategy score if the user chooses to perform the dry run and also provides an accurate, or otherwise successful, performance (based on any type of performance measurement or threshold) of the dry run. In particular embodiments, the system may decrease the user's strategy score if the user chooses to perform the dry run and also provides an inaccurate, or otherwise unsuccessful, performance (based on any type of performance measurement or threshold) of the dry run. If the user chooses to not perform the dry run, the system may decrease the user's strategy score or leave the user's strategy score unchanged.

As a further aspect of a training system for the development of executive functions, at the completion or termination of an activity, the system may present questions to the user to assess the user's use of strategy. For example, the system may ask the user to identify the executive function area that was trained or otherwise associated with the activity or one or more tasks performed during the activity. If the user accurately identifies the associated executive function area, the system may, in response, increase the user's strategy score. If the user does not accurately identify the associated executive function area, the system may, in response, make no change to the user's strategy score. In another example, the system may ask the user to correctly place in order several (e.g., two, three, four, etc.) concepts addressed by the activity based on the concepts' importance and/or significance to the activity (e.g., order from most to least frequently addressed concepts in the activity). If the user places the concepts in the correct order, the system may, in response, increase the user's strategy score. If the user does not place the concepts in the correct order, the system may, in response, make no change to the user's strategy score.

In another example, the system may ask the user to identify one or more reasons why the user did or did not make use of assistance offered before or during the activity. The system may then ask the user to select a most salient strategy for others to use when they are presented with the option to use, or not use, available assistance. If the user selects a strategy for others that matches or is otherwise associated with the user's provided reason for making use (or not making use) of available assistance, the system may increase (e.g., add a maximum possible value to) the user's strategy score. If the user selects a strategy for others that does not match or is otherwise not associated with the user's provided reason for making use (or not making use) of available assistance, but is otherwise an important or significant strategy, the system may increase (e.g., add an incremental value less than a maximum possible value to) the user's strategy score. If the user selects a strategy for others that does not match or is otherwise not associated with the user's provided reason for making use (or not making use) of available assistance, and is not otherwise an important or significant strategy, the system may decrease or leave unchanged the user's strategy score.

In another example, the system may ask the user to identify the user's mood after completing the activity. Then, the system may ask the user select one or more suggestions for elevating the mood of the user or other users strategically. If the user selects a mindset that corresponds to a (e.g., predefined) correct mood, the system may increase the user's strategy score. If the user selects a mindset that does not correspond to a (e.g., predefined) correct mood, the system may leave the user's strategy score unchanged.

In various embodiments, the system may perform activity-specific error analysis. To accomplish this, the system may request, during the activity, that the user select a strategy to help someone else in completing the current portion of the activity. The system may then modify the strategy score based on the user's selection to reflect the connection between new learning based on errors and useful strategies to prevent such errors. If the user selects the correct strategy, the system may increase (e.g., add a maximum possible value to) the user's strategy score. If the user selects an incorrect strategy, the system may leave the user's strategy score unchanged. In another example, the system may prompt the user to choose the best answer to a question of why another user may have made a particular mistake. If the user selects the correct answer, the system may increase (e.g., add a maximum value to) the user's strategy score. If the user selects an incorrect answer, the system may leave the user's strategy score unchanged. In yet another example, the system may prompt the user to select the appropriate executive function skill(s) that may be added to, or improved upon in, an activity during which an error occurred in order to avoid that particular error in future performance of that activity. If the user selects the correct executive function skill(s), the system may increase (e.g., add a maximum possible value to) the user's strategy score. If the user does not select a correct executive function skill, the system may leave the user's strategy score unchanged.

In various embodiments, the system may present one or more particular real-life scenarios to the user based on one or more errors detected during the user's performance of the activity. The system may prompt the user to indicate whether the user has had any experiences similar to the presented scenario(s) (e.g., "does this happen to you?" or "does this not happen to you?"). If the user indicates that a particular scenario does not happen to the user, the system may prompt the user to elaborate (e.g., provide a reason why the scenario does not happen to the user) and may increase (e.g., add a maximum value to) the user's strategy score.

In various embodiments, after completion of any error analysis processes and/or tasks, a coach may provide the user with further assistance or information, such as helpful "game plans," "smart habits," "mindsets," further strategies, etc. for review. The system may prompt the user to indicate and/or select a value and relevance for such strategy assistance. If the user indicates that the offered assistance or information is very helpful (e.g., three stars), the system may increase (e.g., add a maximum possible value to) the user's strategy score. If the user indicates that the offered assistance or information is somewhat helpful (e.g., two stars), the system may increase (e.g., add an incremental value less than a maximum value to) the user's strategy score. If the user indicates that the offered assistance or information is not helpful (e.g., one star), the system may decrease the user's strategy score or leave the strategy score unchanged.

As a further aspect of a training system for the development of executive functions, during training, such as periodic (e.g., daily, weekly, monthly, etc.) META training sessions, the system may prompt the user to review and indicate the user's use of one or more strategies. The system may then generate and/or adjust the strategy score based on the user's responses.

In particular embodiments, the system may present the user with multiple categories of strategies. For example, the system may present the user with the strategy categories of: (1) be reflective (e.g., self-awareness strategies); (2) be well (e.g., mindset strategies); (3) be smart (e.g., executive function strategies); (4) be social (e.g., social-emotional strategies); and (5) be "infinite" (e.g., strategies to learn from mistakes, ability to learn from mistakes). The system may then ask the user to review the user's use of one or more strategies associated with each strategy category and, in response, adjust the strategy score. In particular embodiments, the system may conditionally adjust the user's strategy score, for example, based on one or more other criteria. For example, when the user indicates that the user will begin to use a particular strategy associated with a strategy category, the system may increase (e.g., add a maximum value to) the user's strategy score if the system also determines that the user's current, or most recent, strategy score is below a threshold (e.g., is less than 80%). If the system determines that the user's current, or most recent, strategy score meets or exceeds a threshold (e.g., is greater than or equal to 80%), the system may increase (e.g., add an incremental value less than a maximum value to) the user's strategy score in response to the user indicating that the user will begin to use a particular strategy associated with a strategy category. In such embodiments, if the user indicates that the user already uses the particular strategy associated with the strategy category, the system may somewhat increase (e.g., add an incremental value less than a maximum value to) the user's strategy score if the system also determines that the user's current, and/or most recent, strategy score is at or above a threshold (e.g., is greater than or equal to 80%). If the system determines that the user's current, and/or most recent, strategy score is below a threshold (e.g., is less than 80%), the system may fully decrease (e.g., reduce by a maximum possible value) the user's strategy score in response to the user indicating that the user already uses the particular strategy associated with the strategy category.

In various embodiments, the system may be configured to allow a user to review one or more strategies using a self-evaluation (e.g., "self-check") method. For example, the system may periodically (e.g., daily, weekly, monthly, etc.) prompt a user to assess a plurality (e.g., 5, 10, etc.) of executive function habits to monitor personal progress. For example, for each executive function habit presented to a user, if the user indicates that the user engages in the particular habit, the system may increase (e.g., add a maximum possible value to) the user's strategy score. If the user indicates that the user does not engage in the particular habit, the system may leave the user's strategy score unchanged.

As a further aspect of a training system for the development of executive functions, before or at the beginning of engaging with the training system, the system may facilitate a user's creation of a video capturing the user's intended and/or hoped-for results of the training (e.g., a "Dear Future Me" video). During the training (e.g., periodically), the system may ask the user to review and respond to this video and then adjust the user's strategy score based on the user's response. For example, if the user reviews the user's "Dear Future Me" video and indicates that the video was a very helpful aid (e.g., the user rates the video three stars—"this is a great reminded"), the system may fully increase (e.g., add a maximum possible value to) the user's strategy score. If the user reviews the user's "Dear Future Me" video and indicates that the video was a somewhat helpful aid (e.g., the user rates the video two stars—"this is a good reminder"), the system may somewhat increase (e.g., add an incremental value less than a maximum possible value to) the user's strategy score. If the user reviews the user's "Dear Future Me" video and indicates that the video was not a helpful aid (e.g., the user rates the video one star—"this does not help me"), the system may decrease the user's strategy score.

In various embodiments the system may facilitate the creation of a user profile and/or one or more user goals (e.g., generated by the system itself with or without input from the user). During the training (e.g., periodically), the system may ask the user to review and provide input on such a profile and goals and then adjust the user's strategy score based on the user's input. For example, if the user reviews the profile and goals and indicates that the review was a very helpful aid (e.g., the user rates the helpfulness of the review three stars—"this is a great reminder!"), the system may fully increase (e.g., add a maximum value to) the user's strategy score. If the user reviews the profile and goals and indicates that the review was a somewhat helpful aid (e.g., the user rates the helpfulness of the review two stars—"this is a good reminder"), the system may somewhat increase (e.g., add an incremental value less than a maximum possible value to) the user's strategy score. If the user reviews the profile and goals and indicates that the review was not a helpful aid (e.g., the user rates the helpfulness of the review one star—"this does not help me"), the system may decrease the user's strategy score.

As a further aspect of a training system for the development of executive functions, during the process of engaging with the training system, the system may facilitate a user's creation of one or more videos summarizing the user's training experience thus far (e.g., META summary videos). During the training (e.g., periodically, after a few weeks of training), the system may ask the user to review and/or respond to one or more such previously created summary videos and then adjust the user's strategy score based on the user's response. For example, if the user reviews a particular previously-created summary video and indicates that the video was a very helpful aid (e.g., the user rates the video three stars—"I am learning a lot from myself!"), the system may fully increase (e.g., add a maximum possible value to) the user's strategy score. If the user reviews the particular previously created summary video and indicates that the video was a somewhat helpful aid (e.g., the user rates the video two stars—"I am learning a little from myself!"), the system may somewhat increase (e.g., add an incremental value less than a maximum value to) the user's strategy score. If the user reviews the particular previously created summary video and indicates that the video was not a helpful aid (e.g., the user rates the video one star—"I am not learning anything from myself!"), the system may decrease the user's strategy score.

In various embodiments, the system may facilitate the user's creation of a plan for real-life self-advocacy. To stimulate examination of the user's perceived strengths and self-advocacy capabilities, the system may present to the user one or more real-life scenarios and solicit input from the user regarding whether and why such scenarios do not happen to the user. Similarly, to stimulate examination of the user's perceived weaknesses and self-advocacy capabilities, the system may present to the user one or more real-life scenarios (e.g., a person not remembering to remember to complete particular tasks) and solicit input from the user regarding whether and why such scenarios do happen to the user. The system may present the same one or more scenarios to one or more discussion partners associated with the user (e.g., parents, teachers, peers, etc.) and solicit input from such partners regarding whether and why such scenarios do or do not happen to the user. In various embodiments, the system may present the scenarios to partners selected by the user. The system may solicit these partner selections from the user during the training process.

After receiving one or more responses from the user and the partner(s), the system may compare the results received from the user to the results received from the discussion partner(s) and use the comparison to adjust the user's strategy score. For example, if the input for a particular scenario received from the user matches the input for that particular scenario received from the discussion partner(s), the system may fully increase (e.g., add a maximum value to) the user's strategy score. If the input for a particular scenario received from the user does not match the input for that particular scenario received from the discussion partner(s), the system may not increase or may only somewhat increase the user's strategy score.

In various embodiments, the system may facilitate a discussion between a coach and a user at the end of a training session to discuss strategies that the user used. For example, periodically during the training (e.g., at the end of each week, each day, etc.), the system may facilitate the coach providing feedback to the user regarding the user's performance, use of in-training assistance, and/or strategies for that training period. The system may then solicit input from the user regarding the coach's feedback strategies and adjust the strategy score based on that input. For example, if the user reviews a particular piece of feedback from a coach and indicates that the feedback was a very helpful aid (e.g., the user rates the feedback as thumbs up—"This is so helpful!"), the system may fully increase (e.g., add a maximum possible value to) the user's strategy score. If the user reviews a particular piece of feedback from a coach and indicates that the feedback was not helpful (e.g., the user rates the feedback as thumbs down—"This doesn't help"), the system may decrease the user's strategy score.

The system may also, or instead, facilitate a discussion between a coach and a user at the beginning of a training session to discuss strategies that the user may use in that training session. For example, periodically during the training (e.g., at the start of each week, each day, etc.), the system may facilitate the coach providing the user with one or more strategies that the user may have previously indicated that the user will use in the future. The system may then solicit input from the user regarding each of such one or more strategies and adjust the strategy score based on that input. For example, if the user reviews a particular strategy and indicates that the user intends to use the particular strategy during this session (e.g., the user rates the strategy with three stars—"I will use this strategy!"), the system may fully increase (e.g., add a maximum value to) the user's strategy score. If the user reviews the particular strategy and indicates that the user might use the particular strategy during this session (e.g., the user rates the strategy with two stars—"I might use this strategy"), the system may somewhat increase (e.g., add an incremental value less than a maximum value to) the user's strategy score. If the user reviews the particular strategy and indicates that the user will not use the particular strategy during this session (e.g., the user rates the strategy with one star—"I will not use this strategy"), the system may decrease the user's strategy score. These and other various embodiments of an executive functions training and self-awareness assessment system are described more fully below.

Exemplary Technical Platforms

As will be appreciated by one skilled in the relevant field, the present invention may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems), and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus to create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational Steps to be performed on the computer or other programmable apparatus to produce a computer implemented process such that the instructions that execute on the computer or other programmable apparatus provide Steps for implementing the functions specified in the flowchart block or blocks.

Accordingly, blocks of the block diagrams and flowchart illustrations support combinations of mechanisms for performing the specified functions, combinations of Steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or Steps, or combinations of special purpose hardware and other hardware executing appropriate computer instructions.

Example System Architecture

FIG. 1 is a block diagram of a Self-Awareness Assessment System 100 according to a particular embodiment. In various embodiments, the Self-Awareness Assessment System 100 may be implemented in any suitable context, such as in the diagnosis and/or treatment of one or more issues related to an individual's executive function. In some embodiments, the Self-Awareness Assessment System 100 is configured to calculate and measure a user's self-awareness, provide feedback and coaching related to improving that self-awareness, predict the user's future performance in self-awareness assessments, etc.

As may be understood from FIG. 1, the Self-Awareness Assessment System 100 includes one or more computer networks 115, a Self-Awareness Assessment Server 110, one or more remote computing devices 130 (e.g., a desktop computer, laptop computer, tablet computer, smartphone, etc.), and One or More Databases 140. In particular embodiments, the one or more computer networks 115 facilitate communication between the Self-Awareness Assessment Server 110, one or more remote computing devices 130 (e.g., a desktop computer, laptop computer, tablet computer, etc.), and one or more databases 140.

The one or more computer networks 115 may include any of a variety of types of wired or wireless computer networks such as the Internet, a private intranet, a public switch telephone network (PSTN), or any other type of network. The communication link between Self-Awareness Assessment Server 110 and Database 140 may be, for example, implemented via a Local Area Network (LAN) or via the Internet. In other embodiments, the Database 140 may be stored on any suitable server described herein.

Figure 2:
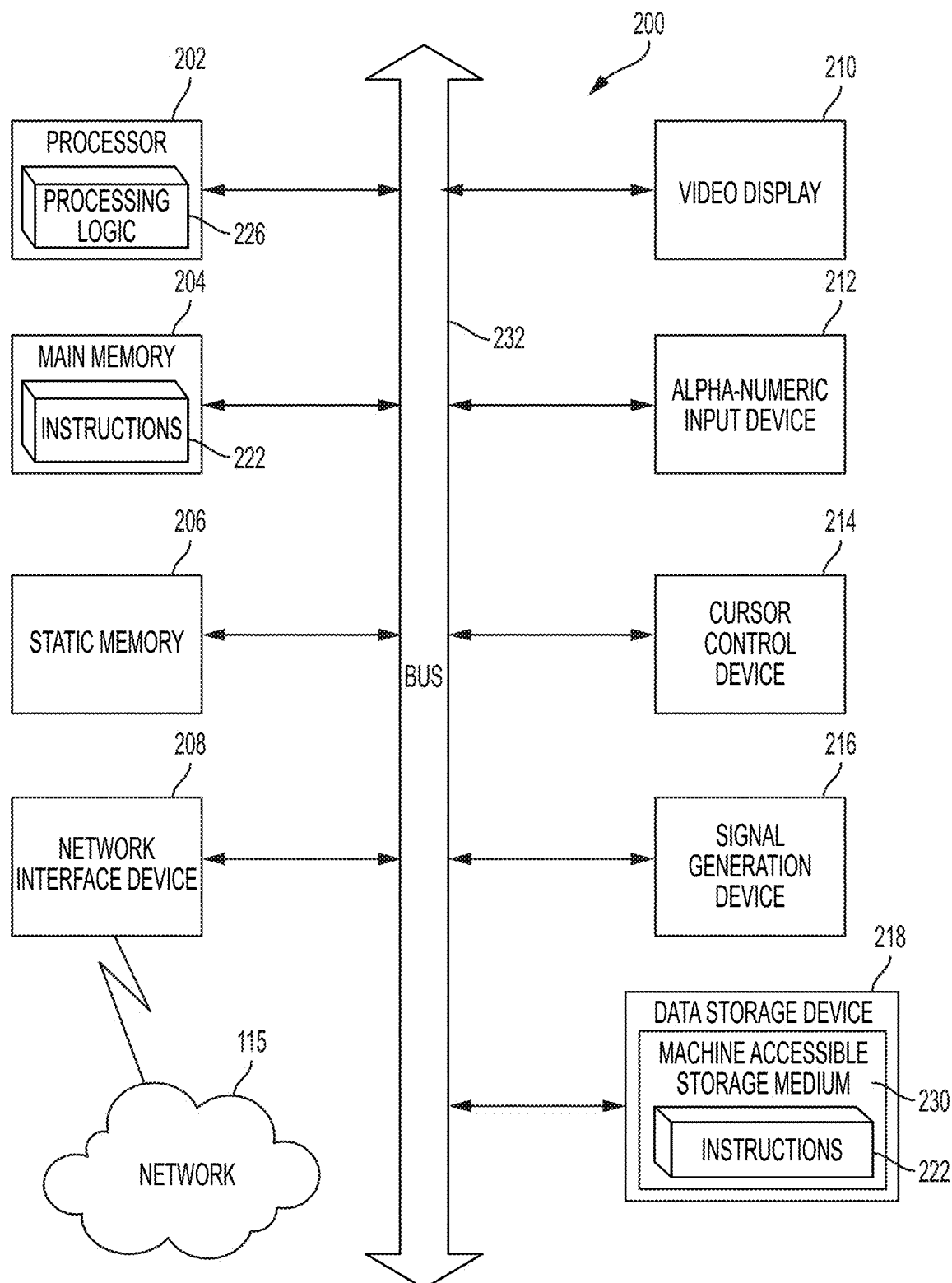
FIG. 2 is a schematic diagram of a computer (such as the self-awareness assessment server 110, or one or more remote computing devices 130) that is suitable for use in various embodiments of the self-awareness assessment system shown in FIG. 1.

FIG. 2 illustrates a diagrammatic representation of a computer 200 that can be used within the Self-Awareness Assessment System 100, for example, as a client computer (e.g., one or more remote computing devices 130 shown in FIG. 1), or as a server computer (e.g., Self-Awareness Assessment Server 110 shown in FIG. 1). In particular embodiments, the computer 200 may be suitable for use as a computer within the context of the Self-Awareness Assessment System 100 that is calculate a self-awareness score for a user, evaluate a user's self-awareness assessment performance data, etc.

In particular embodiments, the computer 200 may be connected (e.g., networked) to other computers in a LAN, an intranet, an extranet, and/or the Internet. As noted above, the computer 200 may operate in the capacity of a server or a client computer in a client-server network environment, or as a peer computer in a peer-to-peer (or distributed) network environment. The Computer 200 may be a personal computer (PC), a tablet PC, a set-top box (STB), a Personal Digital Assistant (PDA), a cellular telephone, a web appliance, a server, a network router, a switch or bridge, or any other computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

An exemplary computer 200 includes a processing device 202, a main memory 204 (e.g., read-only memory (ROM), flash memory, dynamic random access memory (DRAM) such as synchronous DRAM (SDRAM) or Rambus DRAM (RDRAM), etc.), static memory 206 (e.g., flash memory, static random access memory (SRAM), etc.), and a data storage device 218, which communicate with each other via a bus 232.

The processing device 202 represents one or more general-purpose processing devices such as a microprocessor, a central processing unit, or the like. More particularly, the processing device 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processing device 202 may be configured to execute processing logic 226 for performing various operations and Steps discussed herein.

The computer 200 may further include a network interface device 208. The computer 200 also may include a video display unit 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker).

The data storage device 218 may include a non-transitory computer-accessible storage medium 230 (also known as a non-transitory computer-readable storage medium or a non-transitory computer-readable medium) on which is stored one or more sets of instructions (e.g., software instructions 222) embodying any one or more of the methodologies or functions described herein. The software instructions 222 may also reside, completely or at least partially, within main memory 204 and/or within processing device 202 during execution thereof by computer 200 - main memory 204 and processing device 202 also constituting computer-accessible storage media. The software instructions 222 may further be transmitted or received over a network 115 via network interface device 208.

While the computer-accessible storage medium 230 is shown in an exemplary embodiment to be a single medium, the term "computer-accessible storage medium" should be understood to include a single medium or multiple media (e.g., a centralized or distributed database, and/or associated caches and servers) that store the one or more sets of instructions. The term "computer-accessible storage medium" should also be understood to include any medium that is capable of storing, encoding or carrying a set of instructions for execution by the computer and that cause the computer to perform any one or more of the methodologies of the present invention. The term "computer-accessible storage medium" should accordingly be understood to include, but not be limited to, solid-state memories, optical and magnetic media, etc.

Exemplary System Platform

Various embodiments of a Self-Awareness Assessment System 100 may be implemented in the context of any suitable system (e.g., a mobile computing system). For example, the Self-Awareness Assessment System 100 may be implemented to evaluate performance and self-awareness data related to a user's performance during a self-awareness assessment (e.g., or an iterative series of electronic activities). The system may, for example, calculate a self-awareness score for the user based at least in part on inputs provided by the user during the completion of one or more particular self-awareness assessments. The system may further be configured to, for example: (1) provide training to improve an individual's executive function; and (2) modify a particular self-awareness assessment to aid a user in identifying their own executive function limitations, etc.

Various aspects of the system's functionality may be executed by certain system modules, including: (1) a Self-Awareness Determination Module 300; (2) a Self-Awareness and Memory Module 600; (3) a Self-Awareness and Error Evaluation Module 1400; and (4) an Executive Function Training Module 1500. These modules are discussed in greater detail below. Although these modules are presented as a series of steps, it should be understood in light of this disclosure that various embodiments of the modules described herein may perform the steps described below in an order other than in which they are presented. In still other embodiments, the modules may omit certain steps described below. In various other embodiments, any of the modules described herein may perform steps in addition to those described, and/or may include steps described with respect to one or more of the other modules described.

Self-Awareness Determination Module

Figure 3:
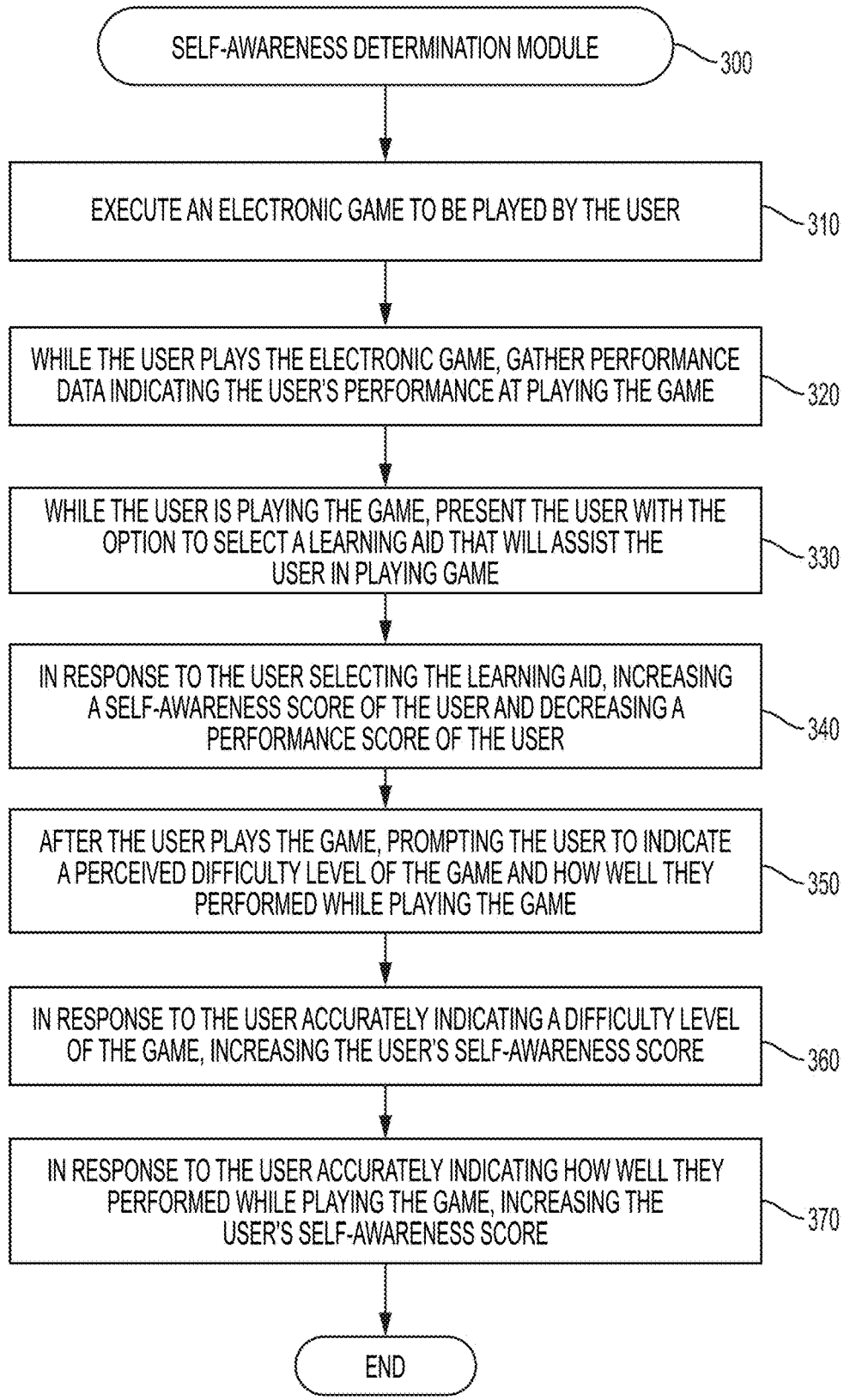
FIG. 3 is a flowchart showing an example of a processes performed by the Self-Awareness Determination Module according to particular embodiments.

FIG. 3 illustrates an exemplary process for operationalizing a determination of a user's self-awareness (e.g., by calculating a self-awareness score for the user). The Self-Awareness Determination Module 300, which may be executed by the one or more computing devices of the system 100, may perform this process. In exemplary embodiments, a client-computing device, such as one or more remote computing devices 130, can execute the Self-Awareness Determination Module 300 and access a database (e.g., the one or more databases 140 shown in FIG. 1) through a suitable network (e.g., one or more networks 115). In various exemplary embodiments, the Self-Awareness Determination Module 300 may call upon other modules (e.g., such as any suitable module described herein) to perform certain functions. In exemplary embodiments, the software may also be organized as a single module to perform various computer-executable routines.

The system, when executing the Self-Awareness Determination Module 300, according to various embodiments, is configured to: (1) assess the self-awareness of a user in performing one or more iterations of a particular activity (e.g., an electronic game or other activity). In particular embodiments, the system may do this by: (1) generating multiple iterations of a particular electronic activity; (2) having the user complete the multiple iterations of the particular electronic activity; (3) in the context of the user executing the multiple iterations of the particular electronic activity, prompting the user for feedback regarding the user's past or future performance in performing one or more of the particular iterations of the particular electronic activity; (4) as the user executes each iteration of the particular electronic activity, collecting data regarding the user's actual performance while executing the particular electronic activity; (5) comparing the user's assessment of their performance with the data regarding the user's actual performance; (6) based on the comparison, determining whether the user was accurate in assessing their performance in executing the one or more iterations of the particular electronic activity; (7) adjusting a self-awareness score for the user based at least partially on the user's determined accuracy level in assessing their performance in executing the one or more iterations of the particular electronic activity; and (8) saving the user's adjusted self-awareness score to computer memory.

For each particular iteration of a particular electronic activity discussed above, the system, when executing the Self-Awareness Determination Module 300 begins by initiating Step 310, by receiving a command to execute an electronic game to be played by a user. The electronic game, as described below, may be presented on any suitable display, such as a video display 210 (e.g., see FIG. 2). The electronic game can include many different types of games such as matching pictures or patterns, correlating pictures or patterns, selecting particular items presented to the user in the display, or identifying pathways between two or more points, among others. In various embodiments, the electronic games are designed to enable the system, when executing the Self-Awareness Determination Module 300, or any other module of the system 100, to assess, modify, and/or otherwise adjust the user's self-awareness and track the user's performance on the electronic game and over the course of a plurality of iterations of one or more games. Additionally, in some embodiments, one or more of the electronic games (e.g., one or more iterations of the electronic games) may be adjusted based on length, difficulty, and/or complexity.

At Step 320, as the user plays the electronic game, the system is configured to gather performance data indicating how well the user is performing at the electronic game as the user is playing the electronic game. In particular embodiments, the performance data may include a performance score for a particular electronic activity or for each iterations of a particular electronic activity. In various embodiments, the performance score may include a score that reflects the user's actual performance on a particular activity (e.g., how many correct answers the user provides, how accurately the user responded to one or more questions in the electronic activity, how many incorrect answers the user provides or mistakes the user makes on the electronic activity, etc.).

In particular embodiments, the system may, in addition to gathering performance data for the user, evaluate the user's self-awareness in performing various iterations of a particular electronic activity. In such embodiments, the system is configured to calculate a self-awareness score to identify a level of self-awareness of the user as well as a performance score to identify a level of how well the user is performing on a current iteration of the electronic game, as well as the user's awareness surrounding that performance. The self-awareness score may be calculated based on one or more algorithms that are used to indicate the user's self-awareness. In various embodiments, the self-awareness score may incorporate one or more weighting factors and may be based upon, for example: (1) whether the user selected a learning aid while playing a particular game; (2) how accurately the user predicted how well they performed on a particular game or how well the user predicted how well they would perform on a particular iterations of an electronic game; (3) how accurately the user perceived the difficulty of a particular game to be, etc. These particular factors that relate to the calculation of a user's self-awareness (e.g., self-awareness score) will be discussed more fully below.

Continuing to Step 330, the system, while the user is playing a particular game, presents the user with the option to select a learning aid that will assist the user in playing the game (e.g., is designed to assist the user). For examples, the one or more performance aids may include, for example: (1) a demonstration of how the particular electronic activity should be performed (e.g., a demonstration of the successful play of a particular electronic game); (2) one or more hints as to how to improve their performance at the particular electronic activity; (3) one or more dry runs at the particular electronic activity; and/or (4) an opportunity to redo their performance of a particular iteration of the particular electronic activity.

At Step 340, in response to the user selecting the learning aid or performance aid, the system is configured to modify the user's self-awareness score and/or the user's performance score. In particular embodiments, the system may increase the user's self-awareness score and/or decrease the user's performance score. For example, the system may increase the self-awareness score in response to the user selecting the learning aid. In various embodiments, the increase in the self-awareness score may reflect, for example, the user's recognition that: (1) the user requires aid in a particular game or electronic activity; (2) the user is not performing well on the activity; (3) the user is confused by the activity; and/or (4) etc.

Additionally, the system may decrease the user's performance score in response to the user selecting the performance aid, because, as the user receives assistance from the learning aid, their performance at the electronic game may be falsely inflated above their present abilities. As may be understood in light of this disclosure, the user's selection of the learning aid may reflect well on their awareness of their abilities (e.g., resulting in an increase in awareness score), but may reflect poorly on their ability to perform in the game or activity (e.g., resulting in a decrease of the user's performance score).

In further embodiments, in response to the user not selecting a presented learning aid while playing the electronic game, the system may be configured to modify the self-awareness score for the user (e.g., by increasing or decreasing the score). For example, if the user is not performing well (e.g., the user has a low performance score) on the electronic game and the user does not select the learning aid, then the system may decrease the self-awareness score (e.g., to indicate a lower level of self-awareness because the user did not realize that they could have used some aid), but if the user is performing well (e.g., the user has a high performance score) on the electronic game and the user does not select the learning aid, then the system may increase the self-awareness score (e.g., to indicate a higher level of self-awareness because the user realized that they were performing well and didn't require aid).

Continuing to Step 350, the system prompts the user to indicate a perceived difficulty level of the game and/or a perceived level of how well they performed while playing the electronic game. The perceived difficultly level may be selected from a list of available selections that are presented to the user in the display, or the user may be prompted to input a difficulty level. In some implementations, the difficulty level may be a numerical value or letter indication, which can be within a range (e.g., 1 to 10 or A to F). The difficultly level may be provided to indicate how difficult the user perceived the iteration of the electronic game that was just completed by the user. In some embodiments, the system may prompt the user to indicate how well they performed on the iteration of the electronic game just completed by the user. For example, this may include an indication by the user of how well they met one or more objective of the electronic game, how well they scored on the electronic game, etc. In some embodiments, the indication provided by the user of how well they performed at the electronic game may be selected from a list of available selections that are presented to the user in the display, or the user may be prompted to input syntax in a text box to indicate how well they believe they performed. In particular embodiments, the system may further prompt the user to indicate how well the user thinks they will perform on a particular game prior to the user playing the game. For example, the system may prompt the user to provide a prediction of how well the user will perform in the game (e.g., how many correct answers the user will provide during the game, how accurately the user will play the game, etc.).

In further embodiments, the system is configured to compare the perceived level of difficulty provided by the user with an actual difficulty level for the electronic game, the user's performance relative to the perceived difficulty, etc. In particular embodiments, the system may use this comparison to determine a user's self-awareness related to how difficult a user perceives a game to be relative to how difficult the game was designed to be or actually was for the user.

Continuing to Step 360, in response to the comparison of the perceived level of difficulty provided by the user with an actual difficulty level, is configured to adjust and/or modify the self-awareness score for the user. For example, if the user accurately indicates the difficulty level of the electronic game, the system may increase the user's self-awareness score. However, if the user does not accurately assess the game's difficulty level, the system may decrease the user's self-awareness score. The system may then be configured to save the adjusted self-awareness score to memory.

A number of methods may be used to determine whether the user accurately assessed the game's difficulty level. In some embodiments, the game's difficulty level may be indicated as a numerical value, and the system may provide a range (e.g., one number higher and one number lower than the actual difficulty level) of numerical values that the system may compare the perceived difficulty to. The system may then determine whether the user accurately assessed the difficulty level based on the comparison. For example, if the game has an actual difficulty level of 4 in a range between 1- and 10, then the system may indicate that the user accurately indicated the actual level of difficulty for the electronic game if the user indicated that the perceived level of difficulty was between 3 and 5 (i.e., the range). However, in other embodiments the range associated with an accurate indication may be smaller or larger.

In other implementations, the difficulty level may not be provided in numerical values, and for example, may include levels of "Easy," "Medium," "Hard," or "Very Difficult," among others. Additionally, in some embodiments, the system may provide one or more difficulty levels that may include selectable levels of difficulty, such as "Piece of cake," "Just Right," "Made me Sweat," or "Way too hard," among others. In such implementations, the user may be required to indicate the exact difficulty level in order for the system to determine that the user accurately indicated the actual difficulty level of the electronic game. In some implementations, such as those discussed above, multiple iterations of the electronic game are provided for the user to play, and each iteration of the multiple iterations may include a different difficulty level. The system may prompt the user to indicate a perceived difficulty level for each iteration of the electronic game, and the system may then determine whether the user accurately indicated the actual difficulty level for one or more of the iterations of the electronic game, as discussed above. The system may modify the difficulty level in the iterations of the electronic game by making the patterns or pathways of the electronic game more or less inconspicuous or difficult/easier to complete.

In particular embodiments, the system may determine that the user accurately indicated a difficulty level based on the user's performance score. For example, if the user indicates that a particular game was relatively easy (e.g., by assigning a low difficulty rating), the system may decrease the user's self-awareness score if the user performed poorly on the game (e.g., received a poor performance score). This may reflect, for example, a lack of awareness on the part of the user relating to the difficulty of the game because the user felt the game was easy but did not perform well. Similarly, the system may be configured to decrease the user's self-awareness score if the user indicated that a game was relatively difficult but the user performed well in the game. In yet another example, the system may be configured to increase a user's self-awareness score where the user's perceived difficulty level provided to the system substantially aligns with (e.g., matches) their actual performance. For example, if the user indicates that a game was difficult and the user performed poorly on the game, the system may increase the user's awareness score. Similarly, if the user indicates that a game was easy and the user performed well, the system may increase the user's awareness score.

Returning to Step 370, the system is configured to adjust the user's self-awareness score based at least in part on how accurately a user predicts that they will perform on a future game (e.g., a future iteration of an electronic game) or how well the user just performed on a particular electronic game). In some implementations, two or more iterations of the electronic game are provided for the user to play. In such implementations, after the user completes the performance of at least one iteration of the game, and before the user completes at least one additional iteration of the game, the system may prompt the user to input the user's prediction of their future performance on the at least one additional iteration of the game. In some implementations, the user is prompted to input the user's prediction of their future performance prior to initiating the first iteration of the electronic game.

The prompt provided by may be embodied as a list of potential choices (e.g., numerical values between 1 and 10 and/or syntax indicating how well the user will perform such as "Excellent," "Good," or "Poor," among others). After the user completes the additional iteration of the electronic game, the system may be configured to compare the user's prediction of their future performance with the user's actual performance on that iteration of the electronic game. In response, the system, in particular embodiments, is configured to adjust the user's self-awareness score. For example, if the user accurately indicates how well they will perform on the electronic game, the system may increase the user's self-awareness score. However, if the user does not accurately assess how well the user will perform on the electronic game, the system may decrease the user's self-awareness score. The system may then be configured to save the adjusted self-awareness score to memory associated with the Self-Awareness Determination Module 300.

A number of methods may be used to determine whether the user accurately assessed how well they performed on the game or will perform on a future came. In comparing how well the user predicted they would perform and how well they actually performed, a performance threshold may be used to determine if the user accurately assessed how well they performed on the electronic game. When the user's predicted performance and actual performance are based on a numerical value, the performance threshold can be a numerical value in the range of numerical values. For example, if the user's predicted performance and actual performance are in a numerical range between 1 and 10, the performance threshold may be a number in this range, such as 5. In other implementations, the performance may be classified based on syntax indicating the predicted and actual performance level, such as "Excellent," "Good," or "Poor," among others. In such a configuration, the performance threshold may be one of the performance classifications, such as "Good."

In various embodiments, the system is configured to can compare the user's predicted performance (e.g., predicted performance of how the user just performed on a game or how the user will perform on a future game) and actual performance to the performance threshold. If the user's predicted performance and actual performance are both either above the threshold or below the threshold, then the system may be configured indicate that the user accurately predicted how well they will perform on the electronic game. The system may then increase the user's self-awareness score. However, if either (1) the user's predicted performance exceeded the performance threshold and the actual performance did not exceed the performance threshold, or (2) the user's predicted performance did not exceed the performance threshold and the actual performance did exceed the performance threshold, then the system may indicate that the user did not accurately predict how well they will perform on the electronic game. The system may then decrease the user's self-awareness score.

Further, after the user completes the performance of at least one iteration of the game, the system may prompt the user to input a reason why the user performed at least a portion of the game accurately. For example, in an electronic game where the objective is to select matching items, the user may input the reason as being that the user matched an item provided on a first display with an item provided in a second display. The prompt for the user to input the reason may be a list of input reasons provided for the user to select from or a section of the display for the user to input text indicating the one or more reasons. Upon the user providing the one or more reasons, the system may determine whether the one or more reasons are correct, and in response, adjust the user's self-awareness score. In some implementations, if the one or more reasons are correct, then the system may increase the user's self-awareness score; however, if the one or more reasons are incorrect, then the system may decrease the user's self-awareness score. For example, in the matching electronic game described above, if the user provides the reason of the user matching two items presented on different displays, the system may determine this is a correct answer; however, if the user provides input indicating the reason that the user played the game accurately is that they completed the game quickly, the system may determine this is an incorrect answer.

In some embodiments, the system is configured to provide a performance aid or learning aid in the electronic game, as discussed above. The user may indicate that using the performance aid or learning aid is a reason why the user performed at least a portion of the game accurately. In response to this reason provided by the user, the system may determine whether the user actually used the performance aid or learning aid while performing the at least one iteration of the game and adjust the user's self-awareness score accordingly. For example, where the user indicated that using the performance aid or learning aid aided the user's performance, and the user actually used the performance aid or learning aid while performing the at least one iteration of the game, the system may increase a self-awareness score of the user. However, where the user indicated that using the performance aid or learning aid aided the user's performance, and the user did not use the performance aid or learning aid while performing the at least one iteration of the game, the system may decrease the self-awareness score of the user. Further, where the user indicated that the user did not use the performance aid or learning aid in the user's performance, and the user actually used the performance aid or learning aid while performing the at least one iteration of the game, the system may decrease the self-awareness score of the user.

In particular embodiments, the system is configured to modify the user's self-awareness score as the user completes additional iterations of the one or more electronic activities. In particular embodiments, the system is configured to store the self-awareness score in memory and associate the self-awareness score with the user. In various embodiments, the system is configured to track one or more changes to the user's self-awareness score over time. In particular embodiments, the system is configured to generate a visual or graphical representation (e.g., graph, chart, etc.) of the change in the user's self-awareness score and display the visual or graphical representation to any suitable individual upon request.

Exemplary User Experience of a Self-Awareness Assessment for Determining a User's Self-Awareness In the exemplary embodiments of the system for processing data regarding the self-awareness of a user for use in the development of the user's executive functions, the system, when executing the Self-Awareness Determination Module 300, or any other module of the system 100, may facilitate the playing of an electronic game or the completion of a self-awareness assessment by the user. As described above, the user may play one or more different electronic games, and the electronic games can include many different types of games, such as matching pictures or patterns, correlating pictures or patterns, selecting particular items presented to the user in the display, or identifying pathways between two or more points, among others. The user may further play multiple iterations of the same electronic game.

One or more directions or objectives for the electronic game may be provided when the user initiates the electronic game; however, in different iterations of a particular electronic game, more or fewer directions or objectives may be provided. In implementations, the electronic games are designed to enable the system executing the Self-Awareness Determination Module 300, or any other module of the system 100, to assess the user's self-awareness and track the user's performance on the electronic game.

Figure 4:
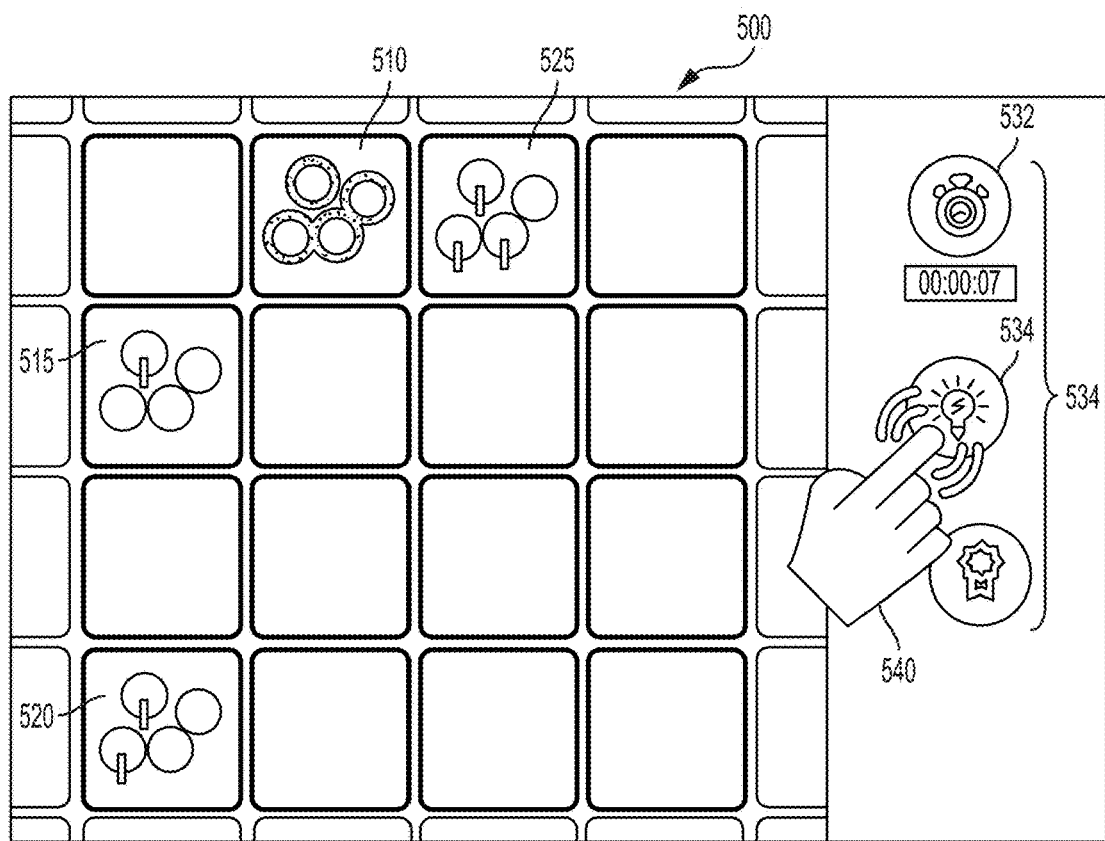
FIGS. 4-5 depict exemplary screen displays and graphical user interface (GUI) according to various embodiments of the system, which may display information associated with the system or enable access to or interaction with the system by one or more users, completion of one or more self-awareness assessments or games by one or more users, etc.
Figure 5:
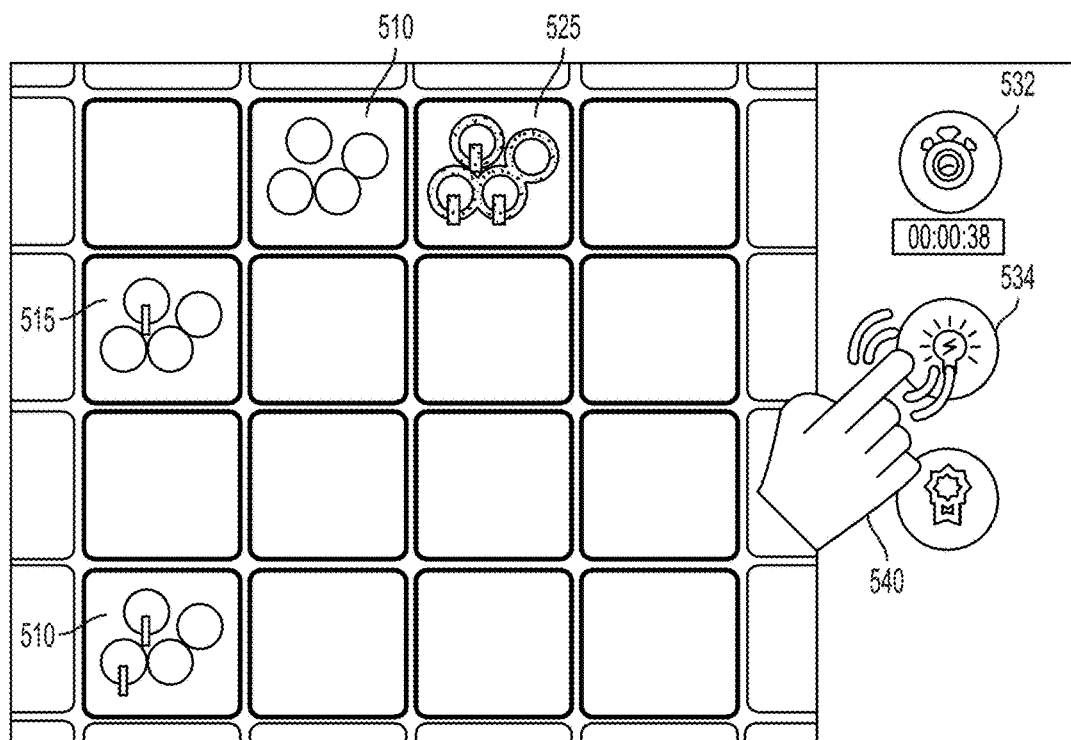

FIG. 5 illustrates an example user interface of an electronic game 500 that the user may play. In the electronic game 500, the display (e.g., video display 110) provides a grid of selectable blocks. In the exemplary embodiment shown in this figure, the game is a four row by four column grid 505; however, such a configuration is not required and a different number of rows and/or columns may be provided in the grid. The electronic game 500 includes a particular pattern or shape within two or more of the selectable blocks (510, 515, 520, 525), which in the present embodiment is a four circle pattern, and a unique indicator is a distinguishing aspect of the particular pattern or shape presented in the different selectable blocks. As may be understood from FIG. 4, the unique indicator is a number of vertical lines provided in the bottom portion of one or more of the four circle pattern. The first selectable block 510 does not include a vertical line in the bottom portion of any of the circles of the pattern; the second selectable block 515 includes a vertical line as part of one of the circles of the pattern; the third selectable block 520 includes a vertical line as part of two of the circles of the pattern; and the fourth selectable block 525 includes a vertical line as part of three of the circles of the pattern. The unique indicator associated with each instance of the pattern may indicate a sequential order of the pattern for the electronic game.

As presented in the example shown in FIG. 4, the objective of the electronic game 500 is to select (e.g., by using a pointing device, such as a mouse, or using the user's finger in a touch screen display), within the user interface, as many selectable blocks as possible, without reselecting any selectable blocks, in traversing between each selectable block that includes the pattern. Additionally, in traversing between the selectable blocks, the objective is to select the selectable blocks that include the pattern in the sequential order as identified by the unique identifier of each instance of the pattern. For example, in the present implementation of electronic game 500, the objective is to traverse from the first selectable block 510 to the second selectable block 515 to the third selectable block 520, and finally, to the fourth selectable block 525 while selecting as many selectable blocks in the grid 505 without reselecting (i.e., selecting a block more than once) any of the selectable blocks.

Additionally, the electronic game 500 includes a menu 530 that includes a timer 532, and a hint button 534. Upon selection of the hint button 534, as shown by the pointer 540 in FIG. 5, the electronic game 500 provides a hint regarding the electronic game 500. For example, in the present implementation, the hint may initiate the first selectable block 510 to be identified in a highlighted presentation, as shown in the first selectable block 510, which is the first instance of the pattern in the sequential order for which the selectable blocks that include the pattern are to be selected. In some implementations, the electronic game 500 may indicate that this is the first instance of the pattern, but in other implementations, only the highlighted presentation in the user interface is provided and the user is required to identify the significance of the highlighted presentation. Additionally, as described above, when the user selects a learning aid or performance aid, such as hint button 534, the user's self-awareness score and performance score may be adjusted.

Further, FIG. 5 provides a second user interface of the electronic game 500. FIG. 5 shows an occurrence of the user, with the pointer 540, selecting the hint button 534 for a second time. For example, in the present implementation, the hint initiates the fourth selectable block 525 to be identified in a highlighted presentation, as shown in the fourth selectable block 525, which is the final instance of the pattern in the sequential order for which the selectable blocks that include the pattern are to be selected. In some implementations, the electronic game 500 may indicate that this is the final instance of the pattern, but in other implementations, only the highlighted presentation in the user interface is provided and the user is required to identify the significance of the highlighted presentation. Additionally, in other implementations, more or different hints may be provided. As described above, the user's self-awareness score and/or performance score may be adjusted based on the user selecting the hint button 734 for a second occurrence (or any other occurrence).

Figure 23A:
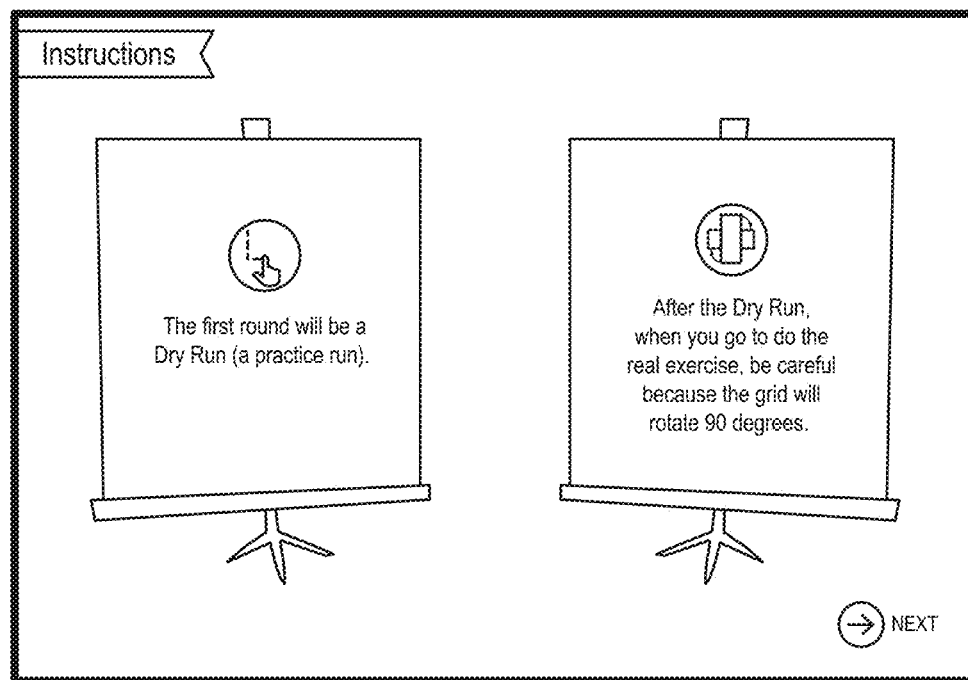

As discussed above, rather than presenting one or more hints to a user, the system may allow, or require a user to execute, a dry run of a particular electronic activity (e.g., a game) before executing the electronic activity for evaluation purposes (e.g., to earn points that would be used to evaluate the user's performance). FIG. 23A shows a system user interface displaying instructions where the user must execute a dry run of a particular game before executing the game for evaluation purposes. FIG. 23C shows a system user interface displaying instructions where the user has the option of executing a dry run of a particular game before executing the game for evaluation purposes.

Figure 23B:
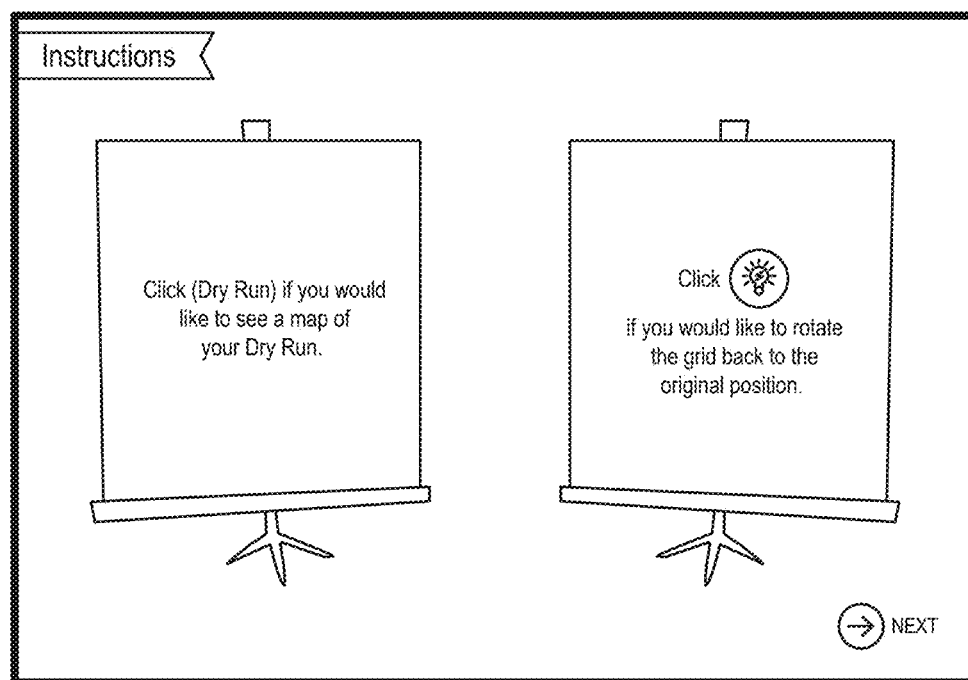
Figure 23C:
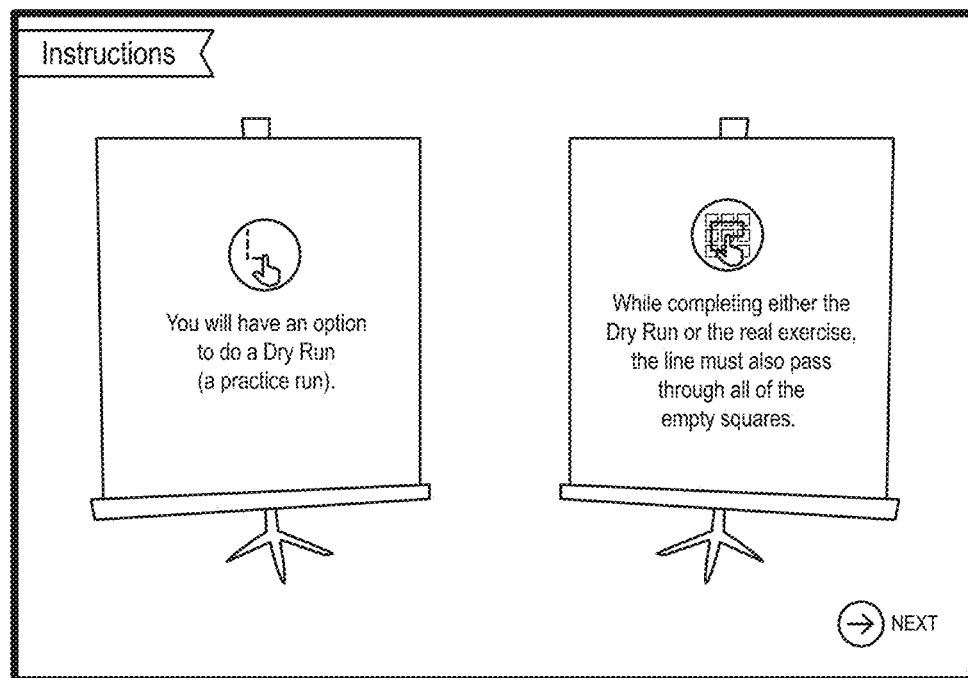
Figure 24A:
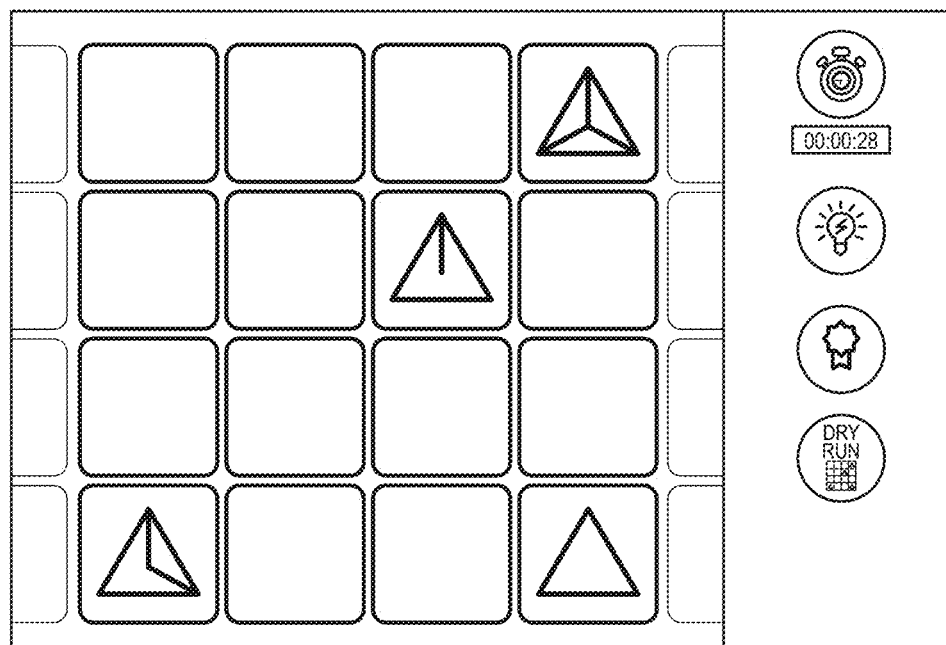
Figure 24B:
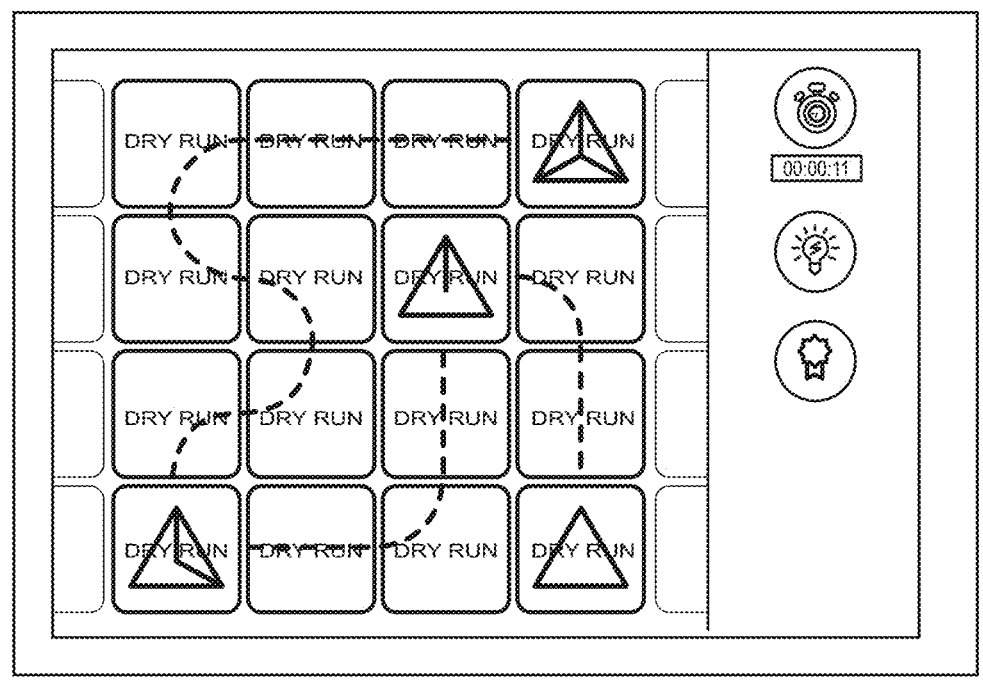

As shown in FIG. 23B, in various embodiments, the system may allow a user to optionally display a visual representation of their performance during a dry run (e.g., a path followed by a user during a dry run of a particular game). This may be useful in helping the user learn from their performance during the dry run. FIG. 24A shows a game board before the user plays the game. FIG. 24B shows the path taken by the user during a dry run, where the user's path is represented by dashed lines beginning with the lower right triangle and ending with the upper right triangle. FIG. 23B shows that the user may selectively cause the system to display the path taken by a user during a dry run by selecting a "dry run" icon, such as the "dry run" icon shown in FIG. 24A.

Self-Awareness and Memory Module

In particular embodiments, a Self-Awareness and Memory Module 600 is configured to: (1) initiate a self-awareness assessment; (2) provide one or more instructions for the self-awareness assessment; and (3) calculate (e.g., or modify an existing) awareness score (e.g., self-awareness score) for a user based on the user's adherence to the one or more instructions during completion of the self-awareness assessment.

Figure 6:
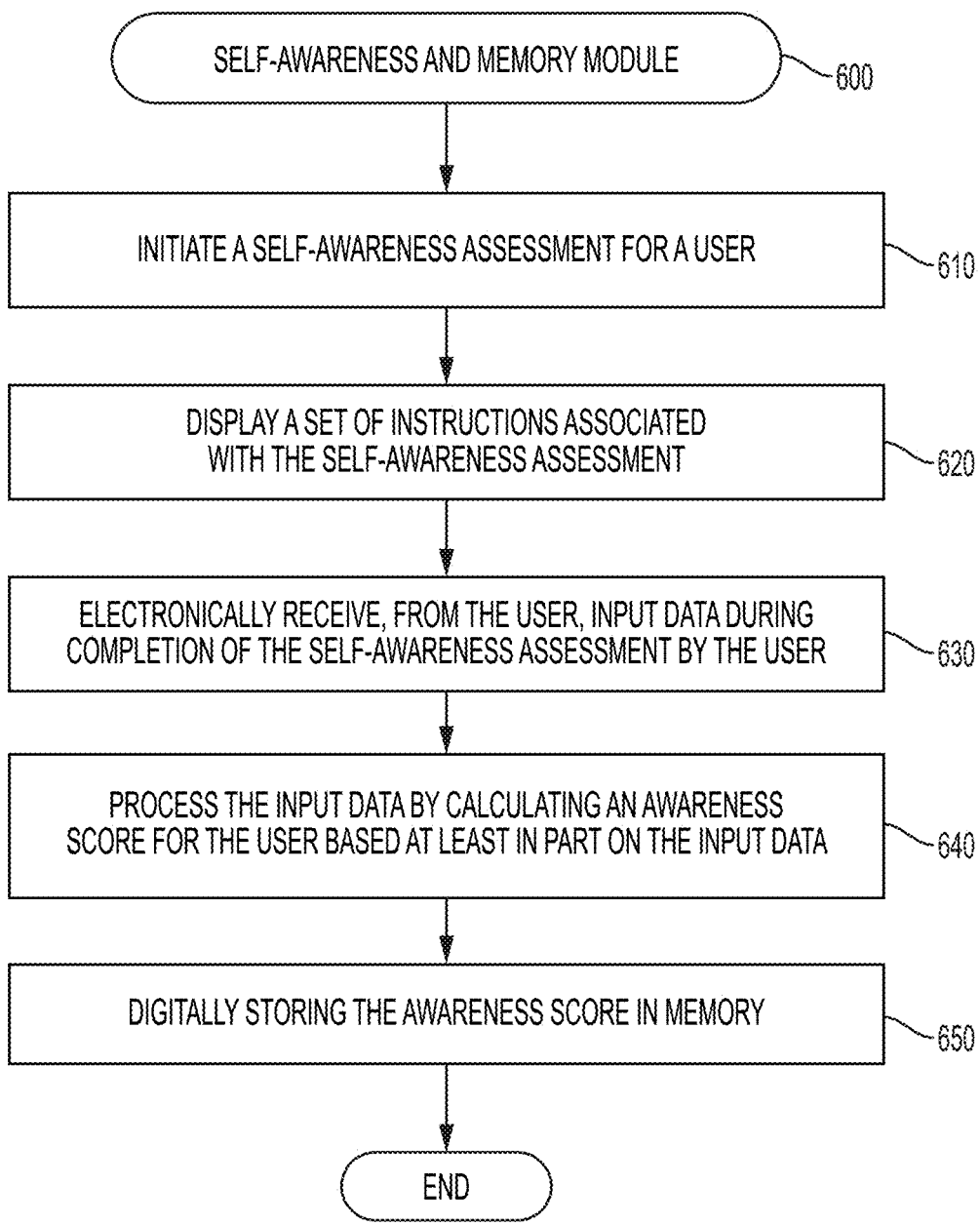
FIG. 6 is a flowchart showing an example of a processes performed by the Self-Awareness and Memory Module according to particular embodiments.

Turning to FIG. 6, in particular embodiments, when executing the Self-Awareness and Memory 600, the system begins, at Step 610, by initiating a self-awareness assessment (e.g., one or more electronic activities or games) for a user. In particular embodiments, initiating the self-awareness assessment comprises executing computer code on a suitable computing device such as a smartphone or tablet computer (e.g., or any of the one or more remote computing devices 130 shown in FIG. 1). In particular embodiments, initiating the self-awareness assessment comprises displaying, via a suitable computing display, a graphical user interface comprising the self-awareness assessment. In various embodiments, initiating the self-awareness assessment further comprises creating an electronic record for the self-awareness assessment, digitally storing the record in memory, and electronically associating the record with a user that is to complete the self-awareness assessment. In particular embodiments, the self-awareness assessment is embodied as an electronic game comprising a plurality of inputs through which the user can provide input to the system, respond to one or more prompts from the system, and otherwise interact with the system during the self-awareness assessment.

Continuing the Step 620, the system is configured to display a set of instructions associated with the self-awareness assessment. In particular embodiments, the system is configured to display the set of instructions on a graphical user interface (e.g., on a suitable video display screen associated with a computing device). In various embodiments, the set of instructions is associated with the self-awareness assessment and includes one or more tasks related to the self-awareness assessment, one or more goals related to the self-awareness assessment, one or more instructions related to the self-awareness assessment, etc.

In particular embodiments, the set of instructions includes one or more activities that the user must (e.g., or should) perform during the self-awareness assessment. For example, a self-awareness assessment may include: (1) a main task (e.g., a primary task); (2) one or more sub-tasks (e.g., one or more targeted tasks); (3) one or more conditional tasks; (4) one or more time conditional tasks, and/or (5) any other suitable task or activity that the self-awareness assessment is tasking the user with doing or completing for the purpose of measuring the user's awareness (e.g., and/or performance).

In particular embodiments, the set of instructions comprise a main task (e.g., a primary task). In particular embodiments, the primary task may include any suitable primary task such as entering data via the graphical user interface (e.g., via one or more keyboard inputs). The main task may include, for example, completing one or more math problems, reading, data entry, selecting a sequence of inputs, matching, or any other task that includes the provision, by the user, of one or more inputs to the system.

In still other embodiments, the set of instructions includes one or more sub-tasks (e.g., one or more targeted tasks). The one or more sub-tasks may include, for example: (1) an instruction to select a particular indicia on the graphical user interface when a particular image appears on the display; (2) an instruction to select a particular indicia on the graphical user interface if the user provides a particular input as part of the main task (e.g., enters a number within a particular range, selects a particular object, etc.); and/or (3) any other suitable instruction to select a particular indicia on the graphical user interface or perform any other suitable action as part of the self-awareness assessment for any suitable reason.

In any embodiment described herein, the one or more conditional tasks may include an instruction to perform a suitable action or select a suitable indicium in response to the occurrence of a particular condition. For example, during the course of the self-awareness assessment, a particular condition may occur (e.g., one or more images may change on the display, one or more portions of the main task may be completed, etc.). The set of instructions may include an instruction for the user to perform a particular action (e.g., or complete a particular task) in response to the occurrence of the one or more conditional tasks.

In various embodiments, the set of instructions include one or more instructions related to one or more time conditional tasks. In such embodiments, the one or more time conditional tasks may include an instruction to perform a particular task at a particular time during the self-awareness assessment. As may be understood in light of this disclosure, a particular self-awareness assessment may include a particular time limit. In such embodiments, the self-awareness assessment may include, on the display, a time indicator that indicates, for example, an elapsed time, an amount of time remaining, etc. The one or more time conditional tasks may include an instruction to perform a particular task (e.g., select a particular indicia) at a particular time during the self-awareness assessment. This may, for example, test whether the user can keep track of time as the user completes the main task.

Returning to Step 630, the systems electronically receives, from the user, input data during completion of the self-awareness assessment. In various embodiments, the system is configured to receive the input data via selection, by the user, of one or more on-screen indicia (e.g., via a touchscreen device). In other embodiments, the system is configured to receive the input data via one or more input devices (e.g., a keyboard and/or mouse). In various embodiments, the input data comprises timing data for each particular input received from the user during the self-awareness assessment (e.g., a time at which each particular input was received).

For example, the input data may include one or more of the following: (1) first input data received at a first time associated with a main task; (2) second input data received at a second time associated with a sub-task; (3) third input data received at a third time associated with a conditional task; and/or (4) fourth input data received at a fourth time associated with a time conditional task. In various embodiments, the system may be configured to receive a plurality of input data at a plurality of different times for each of the particular tasks described above. In some embodiments, the system is configured to store the input data and associated timing data in memory.

Continuing to Step 640, the system processes the input data by calculating an awareness score for the user (e.g., or modify an existing awareness score associated with the user) based at least in part on the input data. In various embodiments, each particular task described above may include a plurality of target inputs for the user, each having a particular target time. In various embodiments, the system is configured to modify the awareness score for the user based at least in part on a proximity of a completion time of each of the plurality of target inputs to its respective target time. In particular embodiments, the target time may, for example, be based on the set of instructions.

The system may, for example, electronically adjust the awareness score based at least in part on a first input, a first input time associated with the first input, and one or more instructions associated with a task for which the first input was provided (e.g., the main task). Where the one or more instructions associated with the task for which the first input was provided include a target time, the system may, for example: (1) determine whether the first input time is the first target time; (2) in response to determining that the first time is the first target time, increasing the awareness score by a first particular amount; (3) in response to determining that the first time is not the first target time, determining a delay time between the first input time and the first target time; and (4) increasing the awareness score by a second particular amount based at least in part on the delay time. In some embodiments, if the delay time is longer than a threshold amount (e.g., or if the system never receives a target input), the system may be configured to decrease the awareness score. As may be understood in light of this disclosure, the longer it takes a user to provide the input after the first target time, their awareness score will increase by a lesser amount or even decrease as more time elapses (e.g., because this may indicate a lack of awareness).

In a particular example, while completing the main task during the self-awareness assessment, the system may display a targeted task (e.g., by displaying a particular image on the display screen). In response to the user selecting an associated indicium to indicate that the user noticed the targeted task, the system is configured to increase the awareness score. In some embodiments, in response to the user selecting the associated indicia after a delay, the system is configured to increase the awareness score (e.g., by an amount less than the system increases the score if the user notices the targeted task right away). In response to the user not selecting the associated indicia after the targeted task appears and disappears, the system is configured to decrease the awareness score.

In further embodiments, the system is configured to cause one or more conditions to occur that may trigger a conditional task (e.g., by displaying one or more images or videos, by modifying one or more images or videos in the graphical user interface, etc.). In response to the user selecting an associated indicium to indicate that the user noticed that the condition occurred as part of the conditional task, the system is configured to increase the awareness score. In some embodiments, in response to the user selecting the associated indicia after a delay, the system is configured to increase the awareness score (e.g., by an amount less than the system increases the score if the user notices the conditional task right away). In response to the user not selecting the associated indicia after the one or more conditions occur and then stop occurring, the system is configured to decrease the awareness score.

In still other embodiments, the system is configured to indicate to the user, via the interface, that one or more time conditions have occurred (e.g., via a clock, etc.), triggering a time conditional task. In response to the user selecting an associated indicium to indicate that the user noticed the time conditional task, the system is configured to increase the awareness score. In some embodiments, in response to the user selecting the associated indicia after a delay, the system is configured to increase the awareness score (e.g., by an amount less than the system increases the score if the user notices the time conditional task right away). In response to the user not selecting the associated indicia during the occurrence of the one or more time conditions, the system is configured to decrease the awareness score.

In various embodiments, the system is configured to modify, increase, or decrease the awareness score based on an analysis of each input provided by the user during the self-awareness assessment in addition to a time of each input and its related target time. In particular embodiments, the system is configured to modify, increase or decrease the score in an amount based on one or more weighting factors related to an importance of a task associated with the particular input. For example, missing or completing one or more inputs related to a main task may cause a greater decrease or increase in the awareness score than missing or completing one or more less important inputs (e.g., such as one related to a time conditional or other task).

In such embodiments, the system is configured to receive one or more weighting factors for each particular task that makes up the set of instructions. In various embodiments, the system is configured to use the one or more weighting factors to calculate the awareness score. In various embodiments, the one or more weighting factors may, for example, be specific to the user. For example, a particular user may desire to improve particular skills related to executive function (e.g., based on the user's one or more goals discussed herein). In such embodiments, the system may be configured to automatically weight particular input types higher for scoring purposes for such users. For example, for a particular user that has trouble remembering particular time commitments or tasks, the system may weigh time conditional tasks higher (e.g., than other tasks) for awareness score calculation purposes (e.g., 1% higher, 2% higher, 5% higher, 10% higher, and so on). In various embodiments, the awareness score may be on a scale, as a percentage, as a letter grade, or in any other suitable configuration.

Returning to Step 650, the system digitally stores the awareness score in memory. In various embodiments, the system is configured to associate the awareness score with the electronic record for the self-awareness assessment. In other embodiments, the system is configured to associate the awareness score with the user. In various embodiments, the system is configured to track a change in awareness score for a particular user over time (e.g., based on a change in awareness score determined and/or calculated from different self-awareness assessments that the user takes over time). In particular embodiments, the system is further configured to generate a visual representation of the change in awareness score (e.g., a graph) and display the visual representation to any suitable individual upon request.

Exemplary User Experience of a Self-Awareness Assessment

Figure 7:
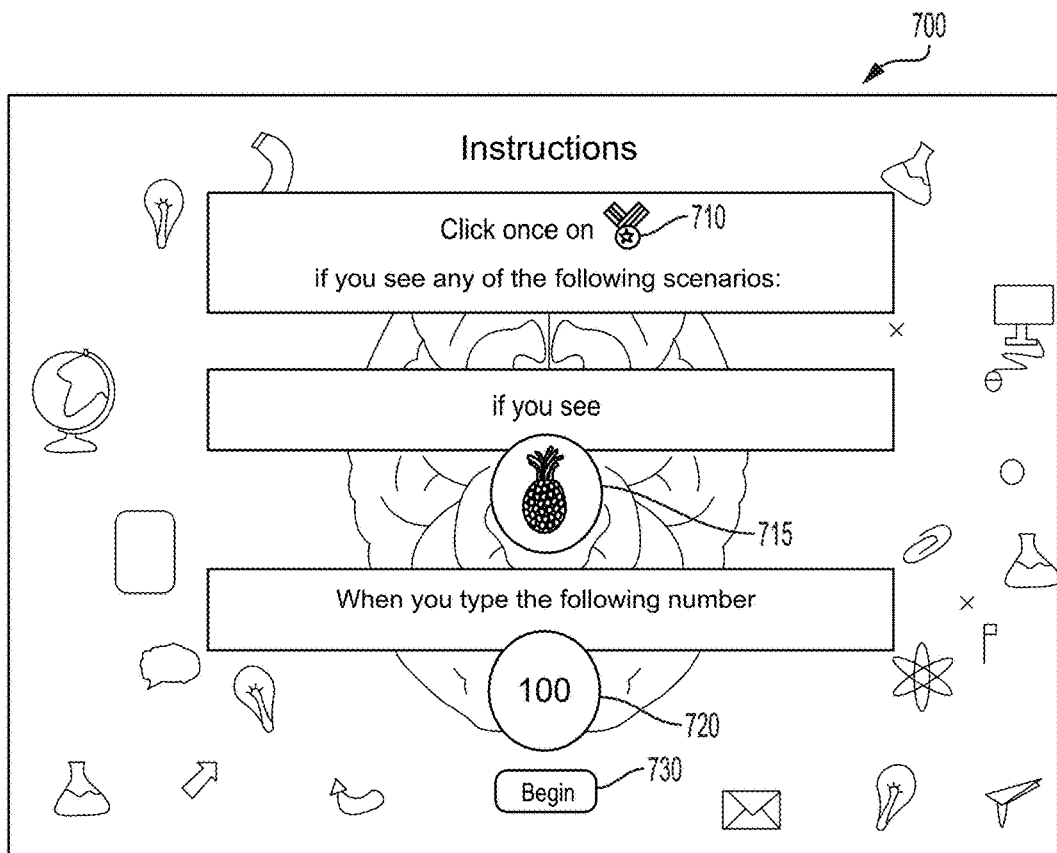
FIGS. 7-11 depict exemplary screen displays and graphical user interface (GUI) according to various embodiments of the system, which may display information associated with the system or enable access to or interaction with the system by one or more users, completion of one or more self-awareness assessments by one or more users, etc.

FIG. 7 depicts an exemplary screen display with which a user may complete a self-awareness assessment. As may be understood in this figure, the screen display 700 depicts a set of instructions 905 for the user to follow during the completion of the self-awareness assessment. As may be understood from this figure, the set of instructions 705 may include any suitable set of instructions, such as those described above with respect to the Self-Awareness and Memory Module 600. As shown in this figure, the set of instructions 705 includes an instruction to click on a medal indicia 710 if: (1) the user sees a pineapple indicia 715 displayed on the screen; and/or (2) the user types in the number "100" 720. The screen display also includes a Begin button 730, which the user may select to initiate or otherwise begin the self-awareness assessment. As may be understood in light of this disclosure and the description of the Self-Awareness and Memory Module 600, these instructions may include one or more instructions related to a targeted task or sub-task of a main task that the user is completing during the self-awareness assessment.

Figure 8:
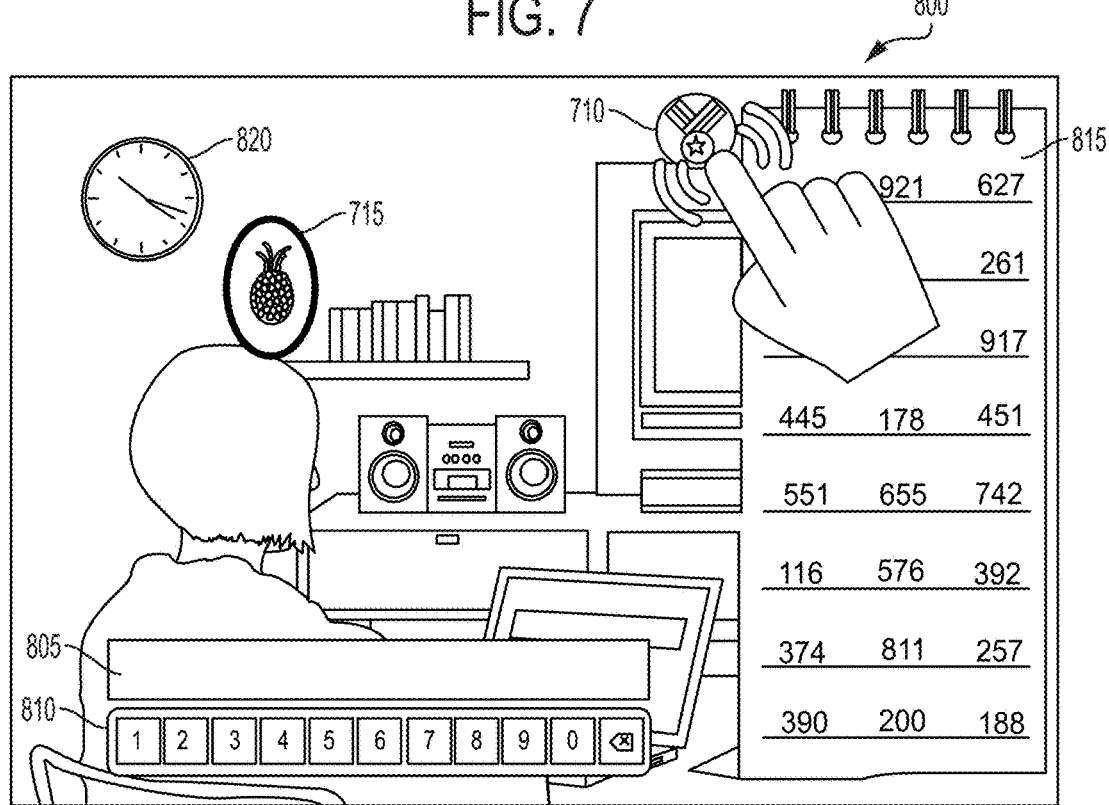

FIG. 8 depicts an exemplary screen display 800 and user interface with which a user may complete a self-awareness assessment according to a particular embodiment. In the example shown in this figure, the main task of the self-awareness assessment may include the user entering, using a text entry box 805 and associated number inputs 810, a plurality of numbers from a listing of numbers 815. The user may, for example, be tasked with systematically entering all of the numbers from the listing of numbers 815 into the text entry box 805 during the self-awareness assessment. The assessment may, for example, be timed, and the system may track the time and display time elapsed and/or remaining to the user using a clock 820 or other suitable time display. This may, for example, test a user's ability to accurately reproduce entries (e.g., pay attention to what they are doing), maintain awareness that they are making entries correctly, etc.

As may be understood from FIG. 8, the embodiment of the self-awareness assessment displayed may implement the set of instructions 705 described above with respect to FIG. 7. As shown in FIG. 7, the appearance of the pineapple indicia 715 should trigger the user to select the medal indicia 710 (e.g., when the pineapple indicia 715 appears while the user is completing the main task). Although the number "100" 720 does not appear in the current listing of numbers 815, the user should also select the medal indicia 710 if the number "100" 720 did appear on the list, when the user was entering the number "100" 720 into the text entry box 805. In the example describe above, because the user selected the medal indicia 710 while the pineapple indicia 715 was being displayed, the system would increase the awareness score (e.g., based on an amount of time elapsed between the appearance of the pineapple indicia 715 and selection, by the user, of the medal indicia 710.

Although FIG. 8 incorporates the set of instructions 705 from FIG. 7 in the example described above, other embodiments may utilize any other suitable set of instructions. For example, the self-awareness assessment shown in FIG. 8 may utilize one or more time conditional tasks using, for example, the clock 820 (e.g., the instructions may instruct the user to select the medal indicia 710 if the clock reads a particular time while the user is playing a game).

Figure 9:
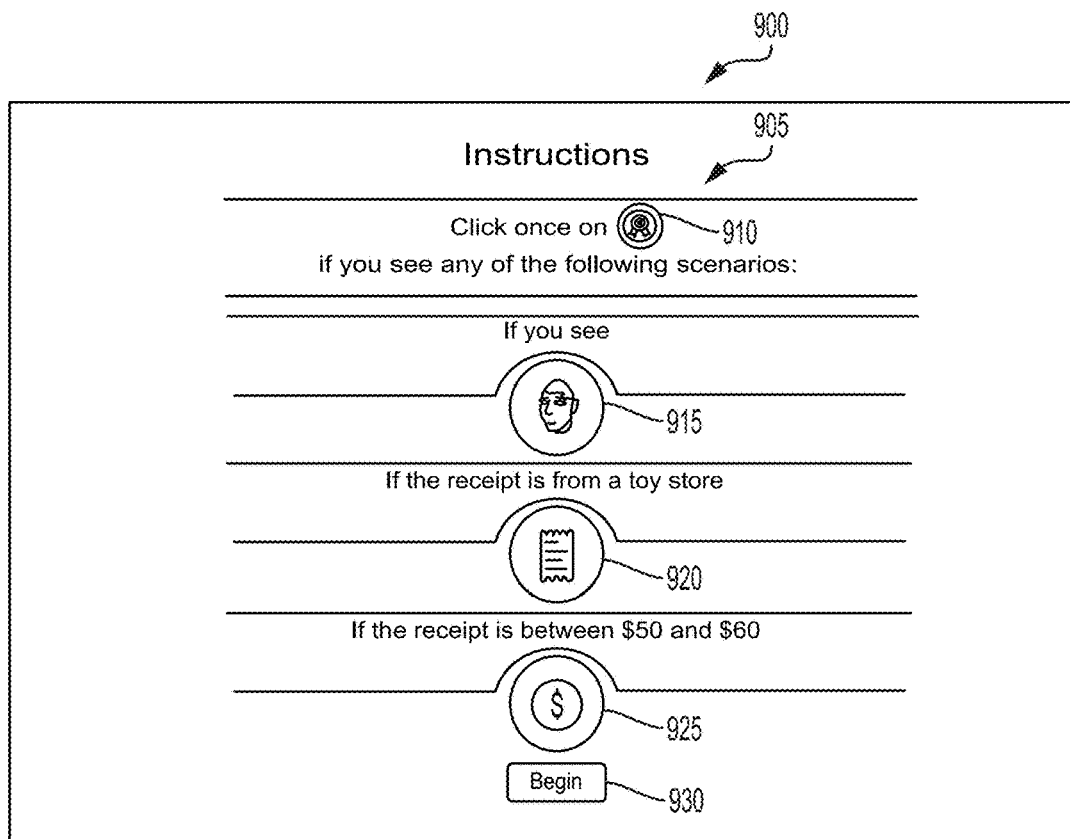

FIG. 9 depicts another exemplary screen display 900 with which a user may complete another exemplary self-awareness assessment. As may be understood in this figure, the screen display 900 depicts a set of instructions 905 for the user to follow during the completion of the self-awareness assessment. As may be understood from this figure, the set of instructions 905 may include any suitable set of instructions, such as those described above with respect to the Self-Awareness and Memory Module 600. In the embodiment shown in this figure, the set of instructions 905 include an instruction to click on a medal indicia 910 if: (1) the user sees a face indicia 915 displayed on the screen; (2) the receipt is a toy store receipt 920; and/or (3) the receipt is a receipt between "$50 and $60" 925. The screen display also includes a Begin button 930, which the user may select to initiate or otherwise begin the self-awareness assessment. As may be understood in light of this disclosure and the description of the Self-Awareness and Memory Module 600, these instructions may include one or more instructions related to a targeted task or sub-task of a main task that the user is completing during the self-awareness assessment.

Figure 10:
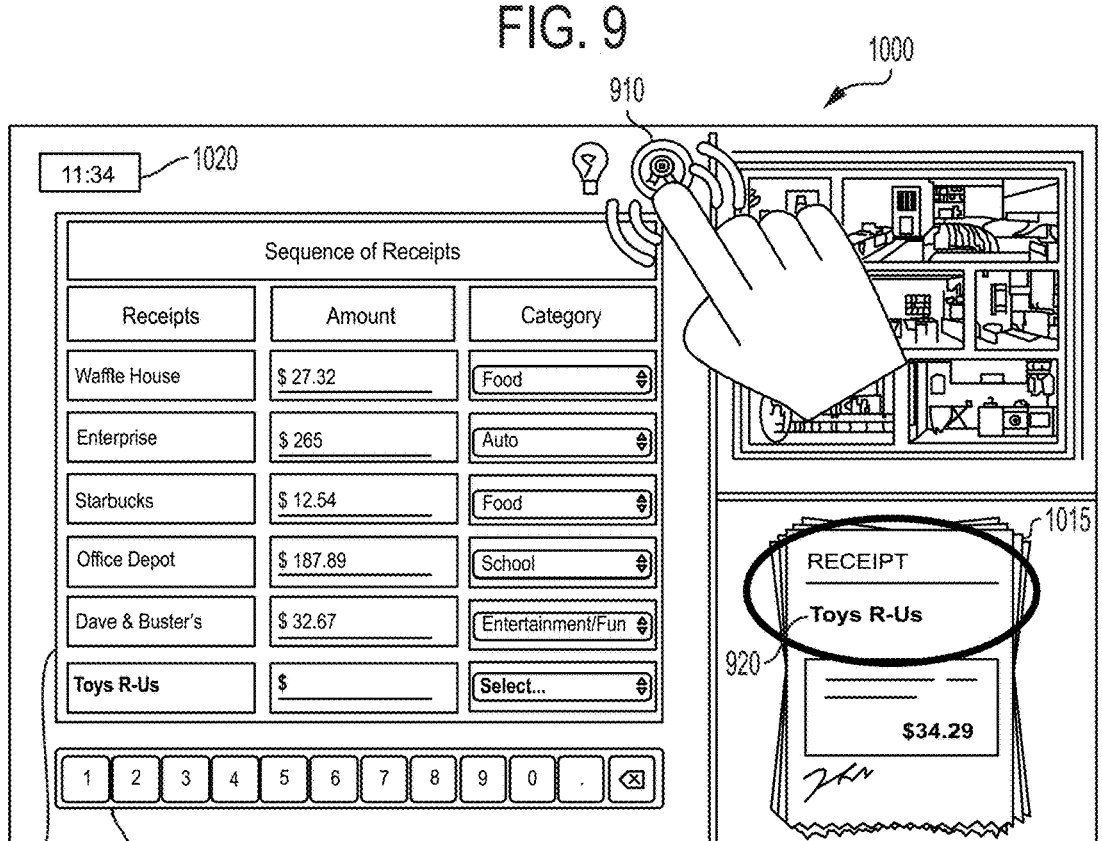

FIG. 10 depicts an exemplary screen display 1000 and user interface with which a user may complete a self-awareness assessment according to a particular embodiment. In the example shown in this figure, the main task of the self-awareness assessment may include the user entering, using a receipt entry field 1005 and associated number inputs 1010, information regarding a plurality of receipts from a stack of receipts 1015. The user may, for example, be tasked with systematically entering data such as a store name, amount, and category for all of the receipts from the stack of receipts 1015 during the self-awareness assessment. The assessment may, for example, be timed, and the system may track the time and display time elapsed and/or remaining to the user using a clock 1020 or other suitable time display.

As may be understood from FIG. 10, the embodiment of the self-awareness assessment displayed may implement the set of instructions 905 described above with respect to FIG. 9. As shown in FIG. 10, because the receipt 920 at the top of the stack of receipts is a toy store receipt 920 (e.g., a Toys R-Us receipt), the user is selecting the medal indicia 910 as instructed. Because the user is successfully selecting the medal indicia 910, the system would increase the awareness score (e.g., based on a weighting factor associated with the receipt recognizing task).

Figure 11:
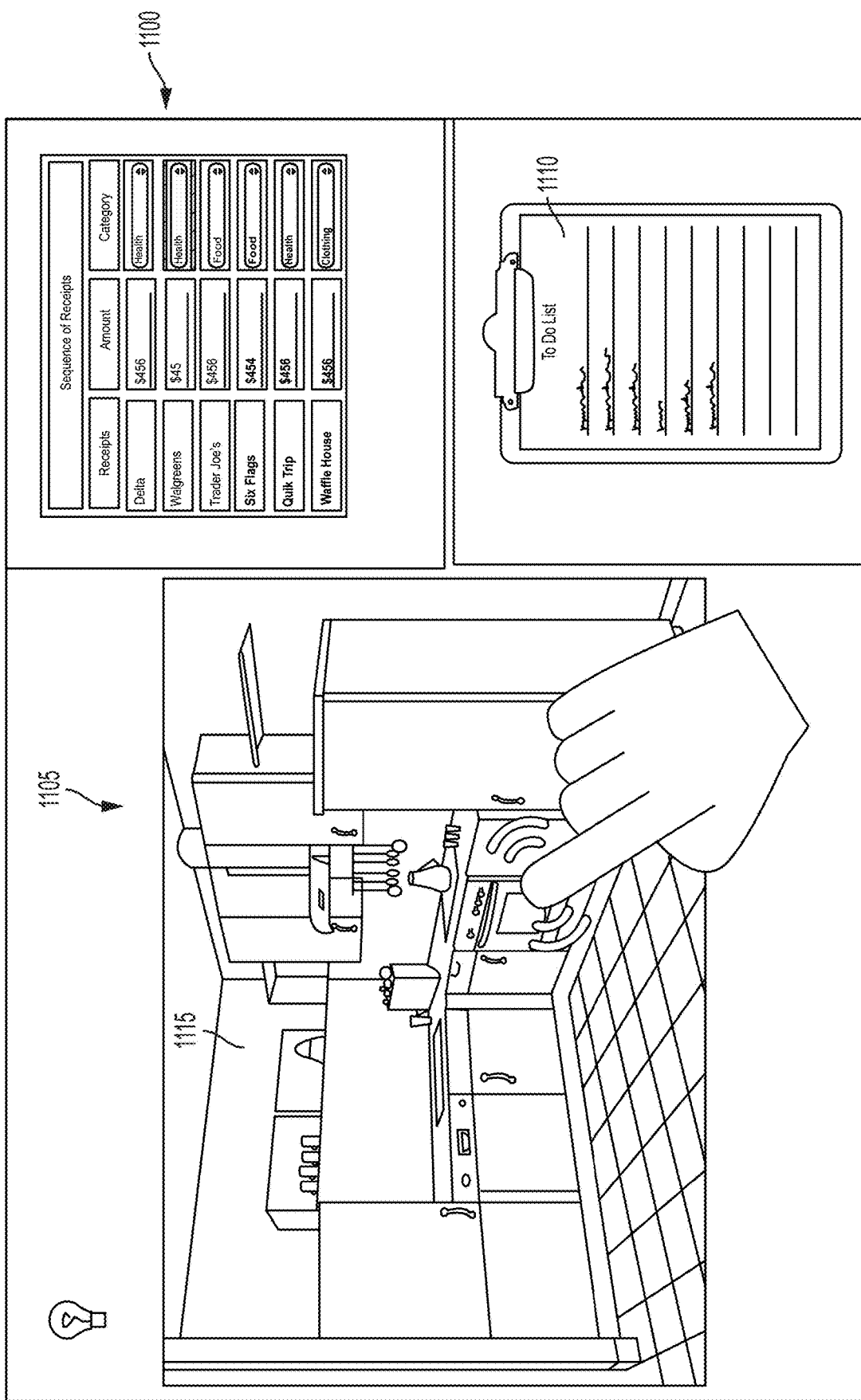

FIG. 11 depicts an exemplary screen display 1100 showing an exemplary new task 1105 interrupting a main task that the user is performing (e.g., the main task described above with respect to FIG. 10). As may be understood from this figure, the new task 1105 includes a To Do List 1110 of actions to perform. The To Do List 1110 may include, for example, a list of tasks to perform in the representation of a kitchen 1115 shown in this figure. The list of tasks may include, for example, putting away dishes (e.g., by selecting the dishes and then selecting a cabinet), cleaning particular items in the kitchen (e.g., by selecting them), etc. In various embodiments, the user must perform the list of tasks in order. In various embodiments, the system may return the user to the main task (e.g., in FIG. 10) once the user has completed the list of tasks in the new task 1105.

For example, if the user performs the tasks from the To Do List 1110 in order, the system may increase a performance or awareness score for the user. If the user tries to perform an erroneous task or chore as part of the new task 1105 or performs a task out of order, the system may decrease the performance and/ or awareness score. If the user omits a task, the system may decrease the awareness and/or performance score.

Self-Awareness and Error Evaluation Module

In particular embodiments, when executing a Self-Awareness and Error Evaluation Module 1200, the system is configured to provide an interface with which the user can review and evaluate the user's own or another user's performance on a particular game. The system may, for example, display a replay of another user's performance of a particular game (e.g., a visual representation of the user's actions). While the user is reviewing the other user's play in a particular game, the system may be configured to prompt the user to evaluate one or more errors made by the other user. In particular embodiments, the system is configured to modify the user's awareness score in response to the user correctly identifying a type of a particular error. In still other embodiments, the system is configured to modify the user's score if the user is able to evaluate a correct reason for the error.

In particular embodiments, the system is configured to enable the user to evaluate their own performance (e.g., without informing the user that it is their own performance that they are evaluating). Some individuals may, for example, be unable to recognize their own shortcomings, but are better able to point out mistakes and reasons for mistakes in others. By presenting the user with their own performance for their review, the system may be configured to enable the user to evaluate their own performance more accurately or openly.

In particular embodiments, the system is configured to provide feedback to the user during a particular evaluation session. For example, by having the user identify one or more errors in replays of games previously played by themselves or others, the system may teach the user to identify errors in execution when playing a game and reasons for those errors. In particular embodiments, this teaching may enable the user to identify potential errors in the future when the user is playing other iterations of various games. In particular embodiments, the system is further configured to modify a user's awareness score based at least in part on the user's recognition of the benefit of the evaluation sessions. For example, the system may be configured to increase the user's awareness score in response to the user providing feedback that the evaluations and feedback that the user received was helpful and that the user will incorporate that feedback into their life. In various embodiments, the Self-Awareness and Error Evaluation Module 1200 may facilitate coaching of the user using techniques to improve their executive function skills though review.

Figure 12:
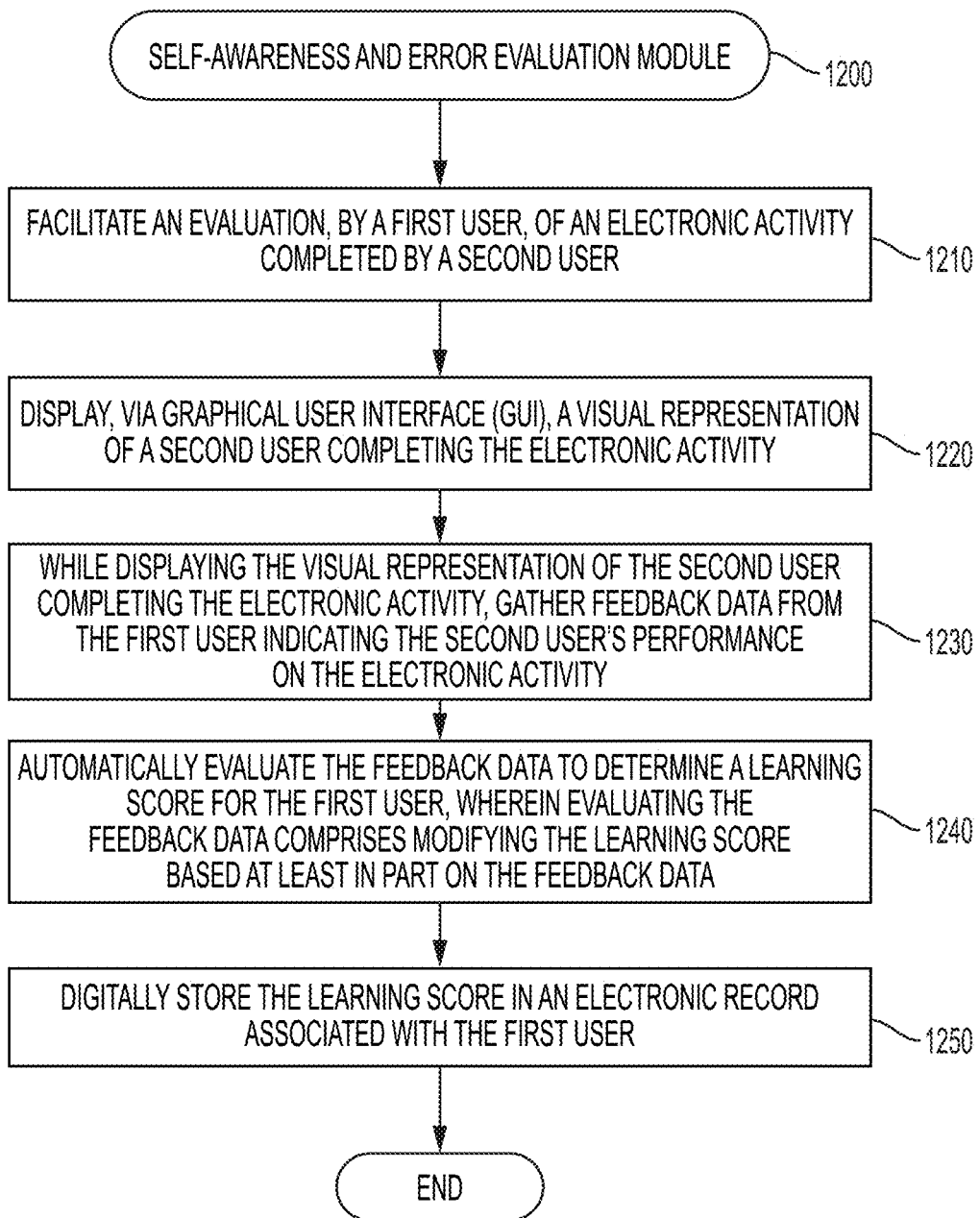
FIG. 12 is a flowchart showing an example of a processes performed by the Self-Awareness and Error Evaluation Module according to particular embodiments.

Turning to FIG. 12, when executing the Self-Awareness and Error Evaluation Module 1200, the system begins, at Step 1210 by facilitating an evaluation, by a first user, of an electronic activity completed by a second user. In particular embodiments, the second user is any suitable user that has completed any suitable electronic activity (e.g., electronic game, self-awareness assessment, etc.). In other embodiments, the second user is a user that has completed a game that the first user has also completed. In still other embodiments, the first user is the second user. In particular embodiments, for example, the system is configured to enable the user to evaluate their own performance (e.g., without informing the user that it is their own performance that they are evaluating). Some individuals may, for example, be unable to recognize their own shortcomings, but are better able to point out mistakes and reasons for mistakes in others. By presenting the user with their own performance for their review, the system may be configured to enable the user to evaluate their own performance more accurately or openly.

Continuing to Step 1220, the system displays, via a suitable graphical user interface (GUI), a visual representation of a second user completing the electronic activity. In particular embodiments, the system is configured to display the GUI via a suitable computing device (e.g., the one or more remote computing devices 130 shown in FIG. 1). In particular embodiments, the visual representation of the second user completing the electronic activity comprises a video replay of the second user completing the electronic activity. In other embodiments, the visual representation comprises one or more images of the second user completing the electronic activity. In still other embodiments, the visual representation comprises a visual indication of the second user's input device (e.g., finger, mouse, etc.) while the user is (e.g., was) completing the electronic activity. This may, for example, indicate to the first user what the second user was clicking on, selecting, and otherwise inputting while completing the electronic activity. In still other embodiments, the system may also include an audio representation of the second user's completion of the activity. This may include, for example, audio of one or more ambient noises that the second user heard as the second user completed the activity, or any other suitable sound.

Returning to Step 1230, the system, while displaying the visual representation of the second user completing the electronic activity, gathers feedback from the first user indicating the second user's performance on the electronic activity. In particular embodiments, gathering feedback comprises gathering feedback regarding the second user's performance in completing the electronic activity. The feedback may include, for example: (1) that the second user should have used a learning aid; (2) that the second user should have utilized a different learning aid than they utilized; (3) that the second user seemed to struggle with a particular type of task; (4) that the second user committed a particular error; (5) that the second user committed a particular type of error; (6) one or more reasons for an identified error; (7) one or more distractions identified by the first user; (8) one or more obvious consequences of the one or more distractions; (9) one or more unseen consequences of the one or more distractions; and/or (10) etc.

In particular embodiments, the system is configured to assign the first user to an additional user that is evaluating the second user. The system may then be configured to enable the first user to evaluate the additional user's evaluation of the second user. In such embodiments, the system is configured to collect additional feedback data from the first user regarding the additional user's evaluation of the second user such as, for example: (1) the additional user has misidentified an error; (2) the additional user has misidentified a cause of an error or reason for the error; (3) the additional user has missed one or more errors; and/or (4) the additional use made any other suitable mistake in their evaluation. In particular embodiments, the additional user is a third user. In various embodiments, the additional user is the first user. In such embodiments, the system may display, to the first user, a visual representation of the first user evaluating the second user at a prior time. In various embodiments, the additional user is a virtual user. (e.g., the additional user may not include a real person, but a simulated person).

In still other embodiments, the feedback data comprises feedback data associated with one or more correct actions taken by the second user. In this way, the system may provide a learning opportunity to the first user even if the first user is not merely identifying mistakes (e.g., even if there are no mistakes to identify).

At Step 1240, the system is configured to automatically evaluate the feedback data to determine a learning score for the first user, wherein evaluating the feedback data comprises modifying the learning score based at least in part on the feedback data. The system may, for example, identify a type of error identified from the feedback data gathered at Step 1230 above. The system may then determine whether the identified type of error is relevant to one or more errors actually committed by the second user. The system may then, in response to determining whether the identified type of error is relevant to the one or more errors, modify the learning score by: (1) increasing the learning score if the identified type of error is relevant; and (2) decreasing (e.g., not increasing) the learning score if the identified type of error is not relevant.

In particular embodiments, the system is further configured for: (1) in response to determining that the identified type of error is not relevant to the one or more errors, prompting the user to identify a second type of error; (2) determining whether the identified second type of error is relevant to the one or more errors; and (3) in response to determining that the identified second type of error is relevant to the one or more errors, increasing the learning score. In this way, the system may provide the first user with an additional opportunity to identify the error.

In particular embodiments, the feedback data may comprise one or more distractions identified by the first user. In such embodiments, the system may prompt the first user to identify one or more errors caused by the one or more distractions (e.g., audio or visual distractions).

In embodiments in which the first user is reviewing a third user's evaluation of a second user, the system may be configured to: (1) identify a type of glitch regarding the third user's evaluation; (2) prompt the first user to evaluate one or more consequences of the glitch; and (3) in response to the first user evaluating the one or more consequences, modifying the first user's learning score (e.g., based on the first user's evaluation of the one or more consequences). In this way, the system may be configured to teach the user to identify obvious and unseen consequences in errors in both performing and evaluating a particular electronic activity. The user may then use these skills of identification when completing future activities to avoid potential pitfalls and mistakes that could affect their performance and/or awareness.

In various embodiments, the feedback data may be related to the one or more goals discussed below with respect to the Executive Function Training Module 1800 below. As will be discussed more fully below, the system may be configured to prompt a user to connect errors and other feedback derived from various electronic activities to real-life goals that the system has identified for the first user.

In particular other embodiments, the system is configured to prompt the user to evaluate one or more benefits of the evaluation sessions discussed above. The system may, in response to receiving positive feedback regarding the evaluation sessions, be configured to modify the user's learning score (e.g., by increasing it). This may, for example, encourage the user to see the benefit in evaluation and coaching as it pertains to an overall improvement in executive function and related skills.

Returning to Step 1250, the system digitally stores the learning score in an electronic record associated with the first user. In various embodiments, the electronic record associated with the first user is the electronic record for the self-awareness assessment discussed above with relation to Step 650 of the Self-Awareness and Memory Module 600. In particular embodiments, the system is configured to associate the learning score with the first user in computer memory (e.g., the one or more databases 140 shown in FIG. 1). In various embodiments, the system is configured to track a change in learning score for a particular user over time (e.g., based on a change in learning score determined and/or calculated as the user completes additional electronic activities and/or self-awareness assessments, provides feedback, provides strategy recommendations/selections, etc.). In particular embodiments, the system is further configured to generate a visual representation of the change in learning score (e.g., a graph) and display the visual representation to any suitable individual upon request.

Exemplary User Experience of Error Evaluation

Figure 13:
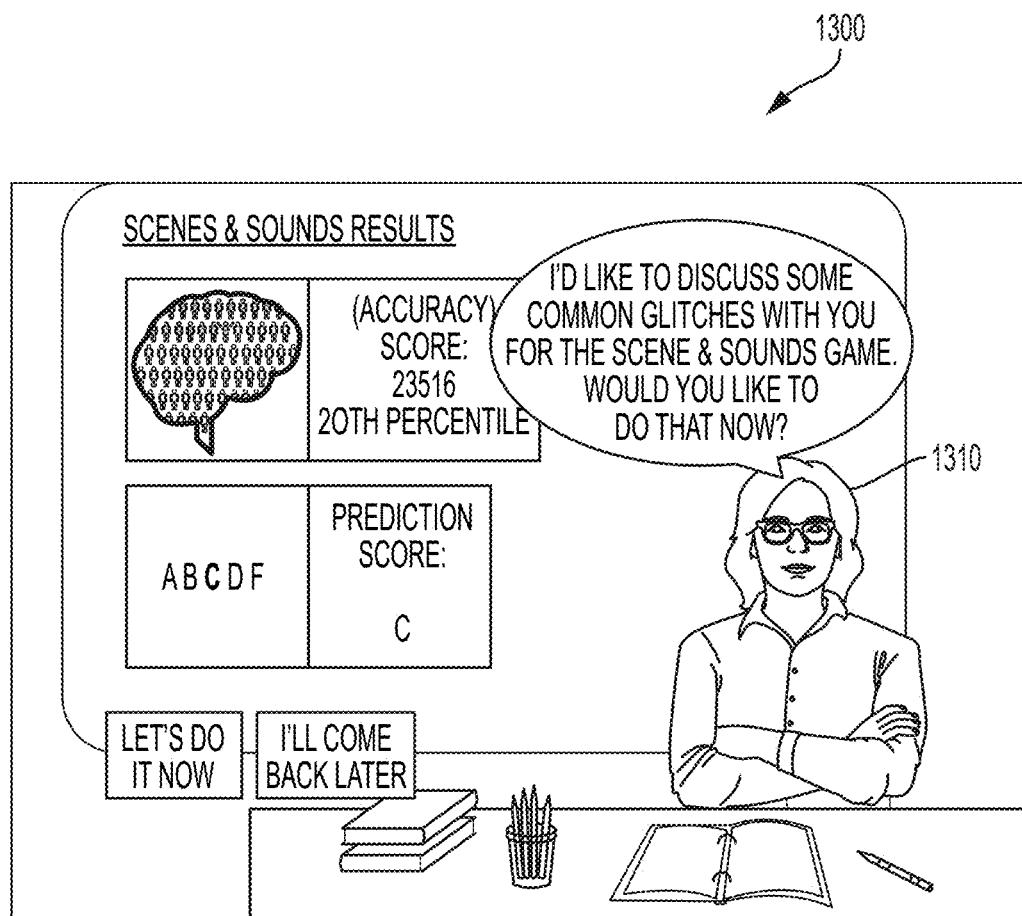
FIGS. 13-17 depict exemplary screen displays and graphical user interface (GUI) according to various embodiments of the system, which may display information associated with the system or enable access to or interaction with the system by one or more users, completion of one or more evaluation sessions by one or more users, etc.
Figure 14:
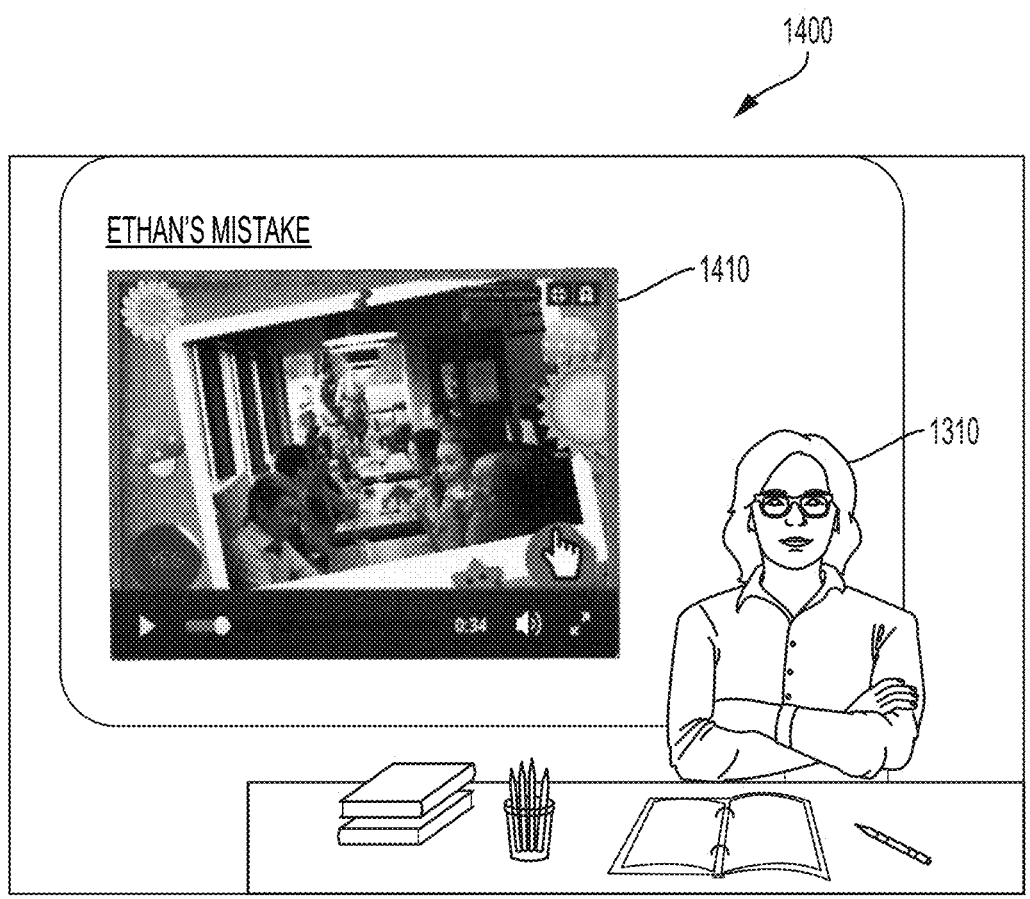

FIGS. 13-17 depict exemplary screen displays that a user may experience when evaluating one or more electronic activities performed by a second user (e.g., a virtual user). Turning to FIG. 13, as may be understood from this interface 1300, the system may display a virtual representation of a coach 1310, who may, for example, guide the user through the process of evaluating the second user. As shown in FIG. 13, the user may select to go over one or more glitches from a particular electronic activity (e.g., game).

FIG. 1400 shows a user interface 1400 via which a user may review a second user's (e.g., Ethan's) performance on a particular electronic activity. As may be shown in this figure, the user interface 1400 includes a visual representation 1410 of the second user completing the electronic activity. In particular embodiments, the visual representation 1410 includes a simulated display of a virtual user completing the electronic activity. Continuing to FIG. 15, the system displays a user interface 1500 via which the user can provide feedback regarding the second user's completion of the electronic activity. As shown in this figure, the interface 1500 comprises a plurality of selected mistake options 1510, from which a user may select an identified mistake or issue with the second user's completion of the activity.

Figure 15:
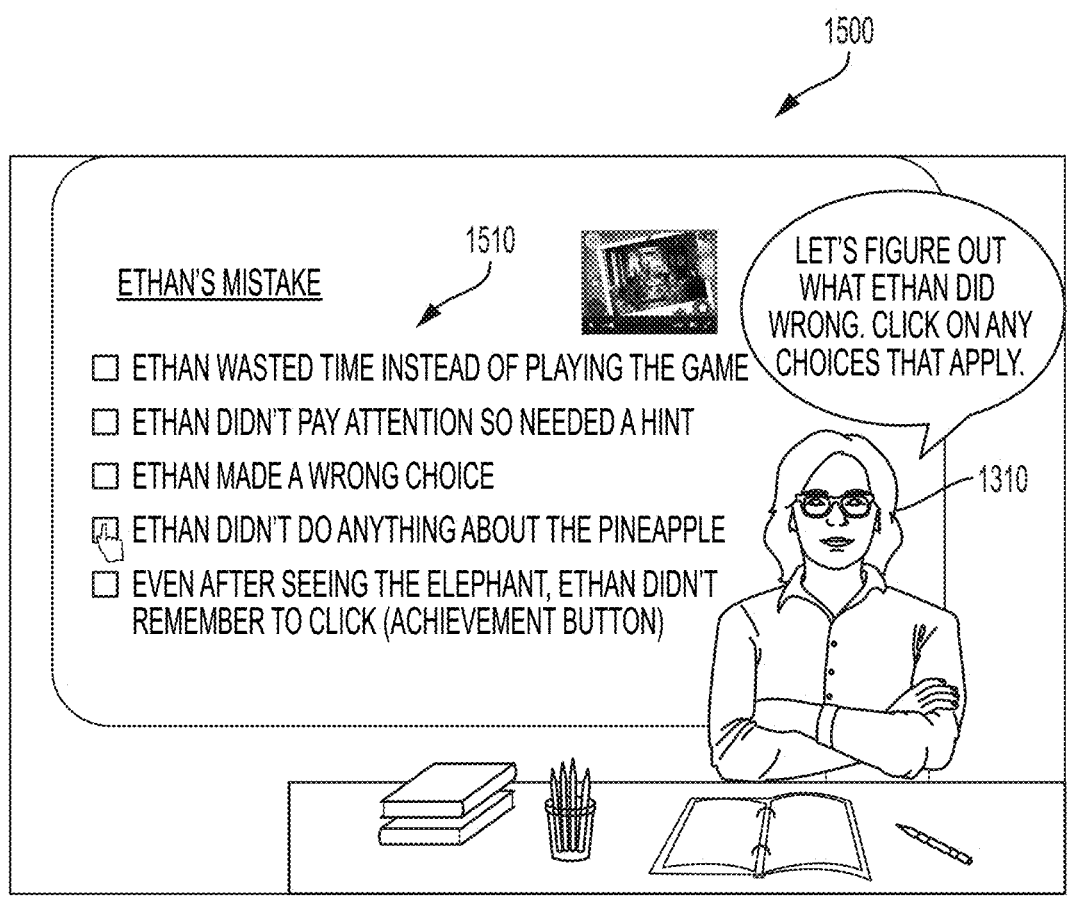
Figure 16:
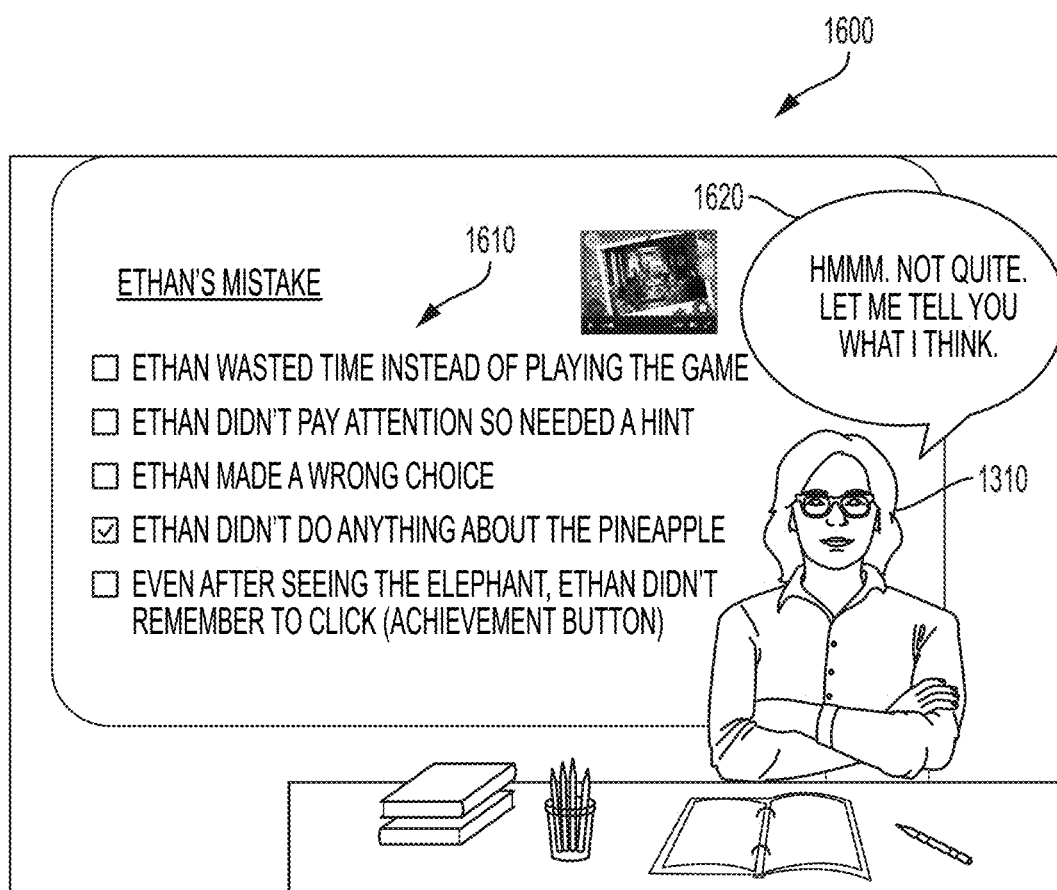
Figure 17:
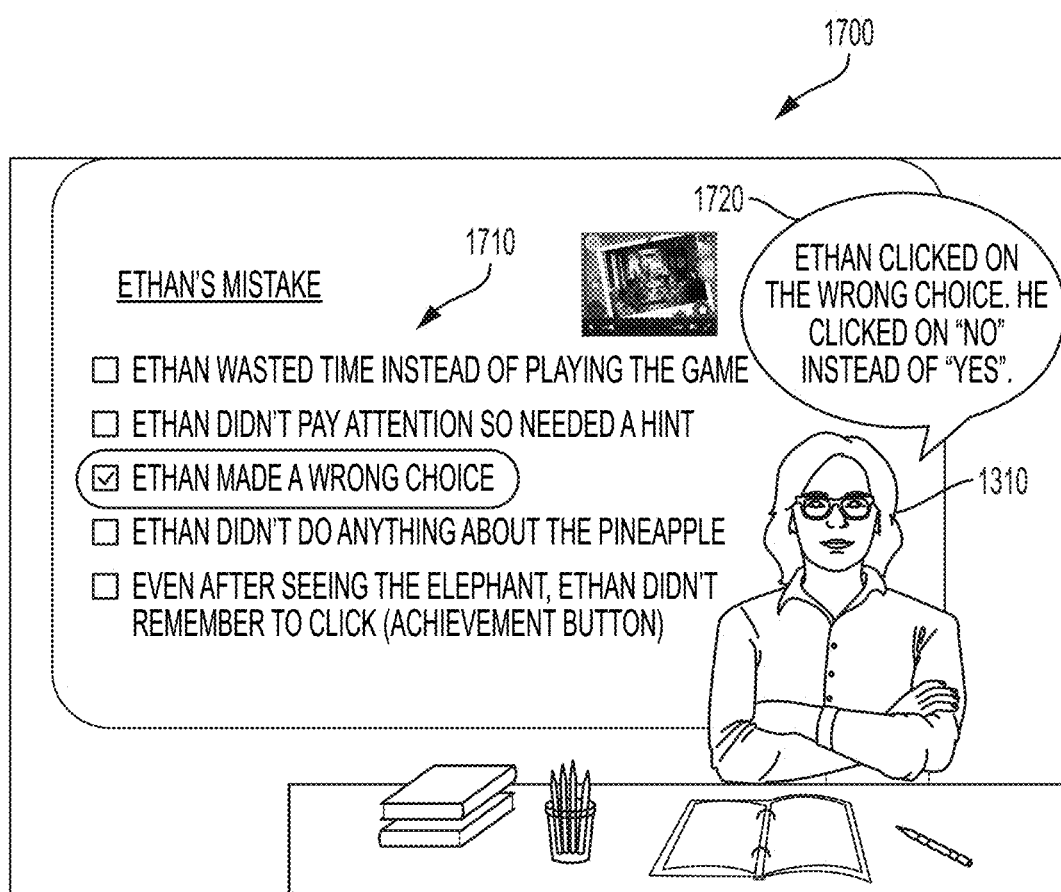

Continuing to FIG. 16, the user interface 1600 provides feedback regarding the user's selection provided via the interface 1500 in FIG. 15. In particular, the coach 1310 in FIG. 16 is providing feedback 1620 that the user provided an incorrect answer (e.g., identified a mistake that the second user did not make). Continuing to FIG. 17, the interface 1700 comprises feedback 1720 from the coach 1310 indicating the correct mistake, and further depicts the correct selected mistake from the selected mistake options 1710.

Executive Function Training Module

In various embodiments, the system, when executing an Executive Function Training Module 1800, is configured to facilitate an improvement of a particular user's executive function skills (e.g., by tracking the user's executive function progress, modifying and updating a user's goals related to improving his or her skills related to executive function, etc.) In particular embodiments, when executing the Executive Function Training Module 1800, the system is configured to create an electronic record for each individual user, which may, for example, include a user profile. In various embodiments, the system may populate the user profile with information regarding the user's strengths and weaknesses relating to the user's executive function. The system may identify these strengths and weaknesses based at least in part on data related to the user's performance and self-awareness determined during the user's completion of the various iterations of games and other electronic activities discussed above. In particular embodiments, the system is configured to calculate a self-awareness score, performance score, etc. for a user based on the user's performance on one or more particular activities such as one or more self-awareness assessments, one or more games, etc. The system may then generate and/or store goals for the user and associate those goals with the user profile.

In particular embodiments, the system (e.g., via the Executive Function Training Module 1800) comprises a training process for improving the user's executive function (e.g., such as the executive function skills discussed above). For example, the system may provide a plurality of training games that are tailored to the user and based at least in part on the user's goals. The system may, for example, as part of the training process, track the user's progress by analyzing one or more connections between the user's strategy in playing particular games, the user's goals, and real-life skills that the user is attempting to develop.

As part of the training process, the system may measure the user's ability to connect strategies for performing in particular games to real life skills and the user's goals. The system may, for example, calculate a score for the user that relates to the user's ability to evaluate the usefulness of particular strategies that reflect a connection between new things the user has learned while evaluating errors and real-life skills that are reflected in the user's goals. For example, the system, in various embodiments, may be configured to modify such a score based on a user's ability to: (1) identify one or more effective habits to take away from evaluating another user's performance in particular games; (2) pick a strategy aid that actually helps the user's performance in a particular game (e.g., results in improved performance); (3) match one or more strategies or habits to particular life goals; (4) rate the usefulness of provided strategies; and/or (5) etc.

Figure 18:
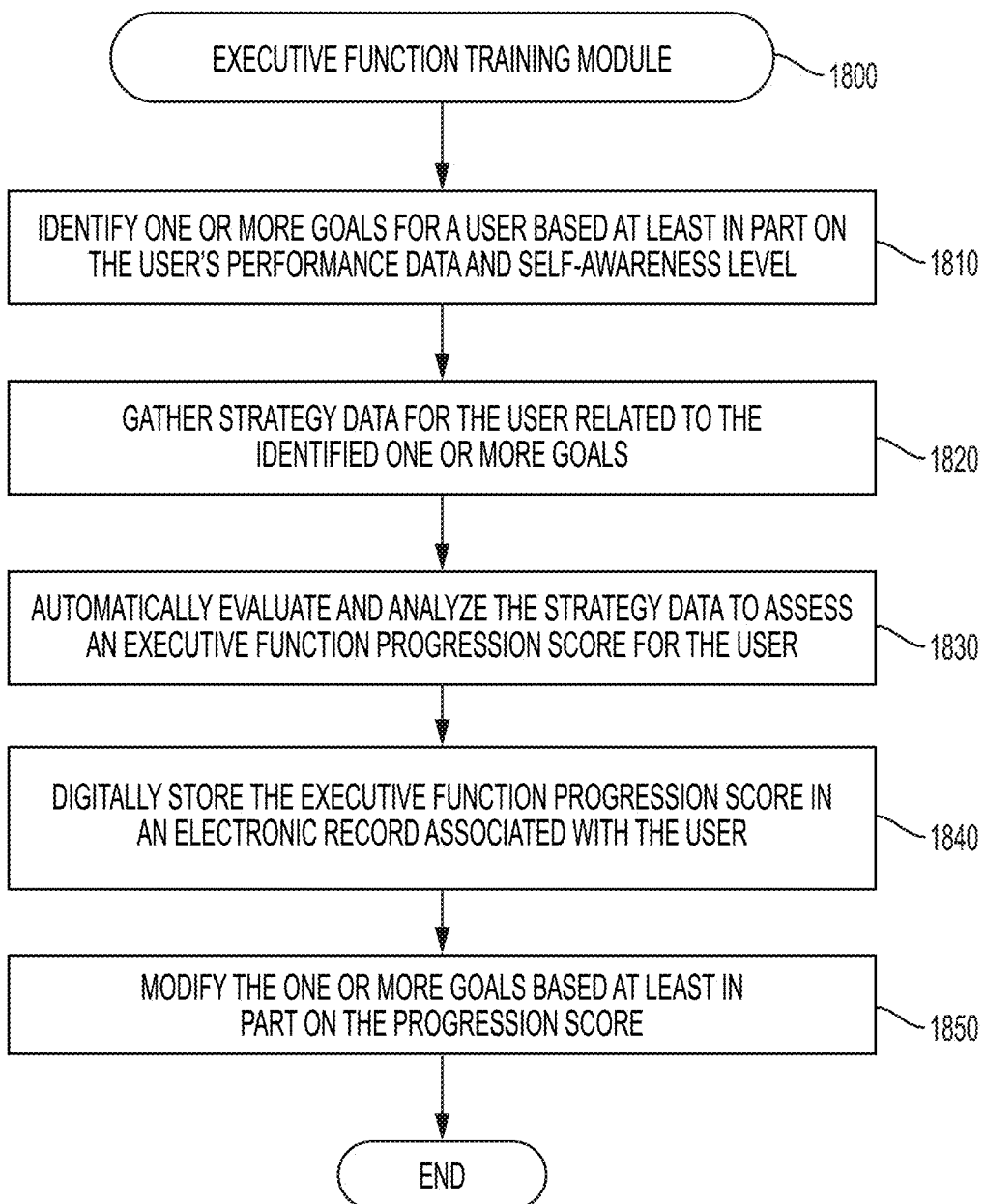
FIG. 18 is a flowchart showing an example of a processes performed by the Executive Function Training Module according to particular embodiments.

Referring to FIG. 18, when executing the Executive Function Training Module 1800, the system begins, at Step 1810, by identifying one or more goals for a user based at least in part on the user's performance data and self-awareness level. In particular embodiments, the system may be configured to gather such performance and self-awareness data using any suitable technique described herein (e.g., via the Self-Awareness Determination Module 300 and/or the Self-Awareness and Memory Module 600 described above).

In particular embodiments, the one or more goals may include any suitable goal such as a goal to improve one or more skills related to executive function that the system identifies that the user may lacking in or be in need of improvement on. These skills may include, for example: (1) keeping track of time; (2) making plans; (3) making sure work is finished on time; (4) multi-tasking; (5) applying previously learned information to solve a problem; (6) analyzing ideas; (7) looking for help or more information if they need it; and/or (8) any other suitable skill related to executive function and/or described herein. In a particular example, referring back to FIG. 10, when entering the information from the various receipts, a user that has trouble remembering to look out for the face indicia 915 may struggle with the skill of multi-tasking. In this example, the system may determine that the one or more goals for the user include a goal to improve multi-tasking ability.

In particular embodiments, the one or more goals comprise real-life goals for the user to aspire to. In still other embodiments, the one or more goals include one or more goals related to the one or more electronic activities (e.g., complete a particular number of activities, make a particular amount of progress in a particular amount of time, improve an awareness or performance score by a particular amount, etc.).

Returning to FIG. 18, at Step 1820, the system is configured to gather strategy data for the user related to the identified one or more goals. In particular embodiments, the system may, for example, require the user to select a particular strategy aid (e.g., for use in a particular electronic game or activity, such as any electronic activity described herein). In various embodiments, the strategy aid may include, for example, (1) a demo of the game; (2) a hint regarding how to play the game successfully; and/or (3) an opportunity to replay the game. In other embodiments, the strategy aid may include, for example: (1) enabling the user to review a video of themselves playing another iteration of the game; (2) enabling the user to view a video related to the importance of training; (3) enabling the user to review their one or more goals; and/or (4) etc.

In still other embodiments, the system is configured to collect strategy data by prompting the user to recommend the single most relevant strategy from one or more provided options (e.g., most relevant for a particular game). In still other embodiments, the system may gather data by prompting the user to provide at least a particular number of effective smart habits for use in one or more future iterations of a game. In still other embodiments, the system may prompt the user to math one or more of the user's goals to strategies identified by the user. In still other embodiments, the system is configured to enable the user to rate the usefulness of one or more provided strategies. In such embodiments, the system may be configured to collect such strategy data in order to analyze a connection between strategies that the user is able to successfully or unsuccessfully apply to an electronic game to the user's real-life goals identified at Step 1810.

Continuing to Step 1830, the system is configured to automatically evaluate and analyze the strategy data to assess an executive function progression score for the user. For example, in embodiments in which the system is configured to prompt the user to select a particular strategy aid, the system may, for example: (1) modify the user's executive function progress score based at least in part on whether the user actually selects a strategy aid as instructed; (2) modify the user's executive function progress score based at least in part on whether the strategy aid actually assists the user in playing the game (e.g., increases the user's performance score for the game); (3) modify the user's executive function progress score based at least in part on a relevance of the selected strategy to the particular electronic activity; (4) modify the user's executive function progress score based at least in part on whether the user selects an appropriate number of smart habits or strategy aids for a particular activity; (5) modify the user's executive function progress score based at least in part on whether based on how highly the user rates a particular strategy aid; and/or (6) modifies the user's executive function progress score based on any other suitable factor related to one or more strategy aids selected, recommended, or otherwise employed (e.g., not employed) by the user.

In particular embodiments, the system is configured to: (1) present the user with an option to select a learning aid (e.g., strategy aid) to assist the user in playing a game; (2) determine whether the user opted to use the learning aid; (3) in response to determining that the user opted to use the learning aid, increasing the executive function progression score; and (4) in response to determining that the user opted not to use the learning aid, decreasing (e.g., or not increasing) the executive function progression score. In still other embodiments, the system is configured to: (1) determine whether the learning aid improved the user's performance while the user completed one or more electronic activities; (2) in response to determining that the learning aid improved the performance, increasing a progression score of the user; and (3) in response to determining that the learning aid did not improve the performance, decreasing (e.g., not increasing) a progression score of the user. In various embodiments, the learning aid may comprise reviewing, by the user, the one or more goals prior to completing a particular electronic activity.

Additionally, in some embodiments, the user may be presented with a learning aid prior to the user playing the game (e.g., prior to the user selecting the start the game). In response to determining that the user opted to use the learning aid prior to the user playing the game, the system may increase (e.g., by at least about 5%, at least about 10%, and/or at least about 20%) the progression score of the user. In response to determining that the user opted to use the learning aid during the user playing the game, the system may increase (e.g., by at least about 5%, at least about 10%, and/or at least about 20%) the progression score of the user. In some implementations, in response to determining that the user did not opt to use the learning aid prior to or during the user playing the game, the system may decrease (e.g., not increase) the progression score of the user.

In some embodiments, as the user is performing the electronic activity (e.g., playing a game), a virtual coaching module, as described above, may determine whether the user is making, or has made, one or more mistakes (e.g., performing inaccurately). In response to determining that the user is executing one or more mistakes, the virtual coaching module may prompt the user to use help in the performance of the electronic activity. The help may be an option that was provided throughout the duration of the electronic activity, and/or another option that is available to the user after the coach prompts the user to use help, or at any other suitable time. The help options may include, for example, (1) a selection of a learning aid, (2) an option to redo the electronic activity, (3) one or more tutorials, and/or (4) any other suitable options. In response to determining that the user selected a help option after being prompted by the coach, the system may increase the progression score of the user. Additionally, in response to determining that the user did not select a help option after being prompted by the coach, the system may decrease (e.g., not increase) the progression score of the user.

In various other embodiments, the system is configured to: (1) present the user with an option to select a learning aid that is most relevant to one or more electronic activities; (2) determine a relevance level of the learning aid to the one or more electronic activities; and (3) in response to determining the relevance level, modifying the performance score for the user (e.g., based at least in part on the relevance level). In various embodiments, the system is configured to determine the relevance level based on, for example, an association between the learning aid and the activity. In other embodiments, the system may determine the relevance based on one or more pieces of feedback data received from the user (e.g., in the context of the Self-Awareness and Error Evaluation Module 1200 described above). For example, if the user had identified a particular type of strategy or learning aid that would have been helpful when evaluating their own previous gameplay or that of another user for a similar type of electronic game, the system may determine that the learning aid selected by the user as relevant was, in fact, relevant based at least in part on such information (e.g., if the user selects the same type of learning aid as relevant in an instant game as compared to when the user provided feedback as part of an error evaluation).

In some embodiments, the system may be further configured to: (1) determine that the learning aid has a high relevance; and (2) in response, increasing the progression score by a first amount. In other embodiments, the system is configured to: (1) determine that the learning aid has a medium relevance; and (2) in response, increasing the progression score by a second amount. In some embodiments, the second amount is less than the first amount. In still further embodiments, the system may be configured to: (1) determine that the selected learning aid has a low relevance; and (2) in response, decreasing (e.g., not increasing or otherwise not modifying) the progression score.

In some embodiments, the system is configured to analyze the user's performance on a particular electronic activity (e.g., self-awareness assessment or game) to identify one or more errors committed during the electronic activity. In such embodiments, the system may present the user with an option to select a particular number of smart habits for avoiding those errors during future activities. For example, the system may present the user with the option to select two smart habits, three smart habits, four smart habits, or any other suitable number of smart habits. In various embodiments, the system may be further configured to modify the user's executive function progression score based at least in part on a number of smart habits selected by the user. The system may, for example, increase the user's executive function progression score in response to determining that the user selected the indicated number of habits. The system may decrease (e.g., not increase) the user's progression score in response to determining that the user selected fewer than the indicated number of habits.

In various other embodiments, the system is configured to: (1) present the user with an option to match the one or more goals to a particular smart habit; and (2) modify the executive function progression score in response to the user selecting a smart habit. In various embodiments, the system may increase the progression score to indicate that the user is successfully connecting lessons taken from the one or more activities to the user's real-life goals identified at Step 1810. The system may further modify the progression score based at least in part on the selected goal and habit. For example, in response to the user selecting a habit of asking for help as a good habit for a goal of improving multi-tasking, the system may be configured to reduce the progression score because asking for help may not relate to a user's ability to multi-task. However, the system may increase the progression score in response to the user selecting a habit of asking for help as a good habit for completing required tasks on time. For example, recognizing that the user needs help to complete the task on time and asking for the help have a strong causality toward the user recognizing ways they can work toward the goal of completing tasks on time (e.g., because the user may be unable to complete the task on time without help).

As discussed above, the system may allow the user to select to perform a dry run of a particular electronic activity (e.g., a game) before executing the electronic activity for evaluation purposes. The system may adjust the executive function progression score of the user based on (1) whether the user selected to perform the dry run of the particular electronic activity, and (2) how the user performed on the dry run of the particular electronic activity if the user selected to perform the dry run.

In response to determining that the user opted to perform a dry run of the particular activity prior to user performing the electronic activity and that the user performed well on the dry run, the system may increase a progression score of the user. In response to determining that the user opted to perform a dry run of the particular activity prior to the user performing the electronic activity, but the user did not perform well on the dry run, the system may decrease or not increase a progression score of the user. In some embodiments, the system may calculate a dry run performance score based on the user's performance in the dry run of the electronic activity. For example, the dry run performance score may increase when the user performs more accurately in the dry run performance and decrease (or stay the same) when the user performs inaccurately in the dry run performance. In some implementations, in response to determining that the user did not opt to perform a dry run of the particular activity prior to the user performing the electronic activity, the system may decrease or not increase the progression score of the user.

Returning to Step 1840, the system is configured to digitally store the executive function progression score in an electronic record associated with the user. In various embodiments, the electronic record associated with the user is the electronic record for the self-awareness assessment discussed above with relation to Step 650 of the Self-Awareness and Memory Module 600. In particular embodiments, the system is configured to associate the executive function progression score in computer memory (e.g., the one or more databases 140 shown in FIG. 1). In various embodiments, the system is configured to track a change in executive function progression score for a particular user over time (e.g., based on a change in executive function progression score determined and/or calculated as the user completes additional electronic activities and/or self-awareness assessments, provides feedback, provides strategy recommendations/selections, etc.). In particular embodiments, the system is further configured to generate a visual representation of the change in executive function progression score (e.g., a graph) and display the visual representation to any suitable individual upon request.

At Step 1850, the system may optionally modify the one or more goals based at least in part on the progression score. For example, in response to determining that the user's progression score has increased for a particular goal or skill, the system may reduce an amount of training directed toward that particular goal or skill (e.g., the system may provide the user with fewer games catered toward improving that particular goal or skill to complete). The system may, for example, increase a number of electronic activities that the user must/may complete for one or more other skills for which the user has made less progress (e.g., based on the user's progression score associated with that particular goal or skill decreasing, remaining the same, or increasing by a lower amount than a progress score for another skill).

In particular embodiments, the system may modify a training plan associated with the user to include more or fewer electronic activities related to a particular executive function skill. The system may, in other embodiments, adjust a difficulty of one or more existing games in the training plan. The training plan may, for example, comprise a plurality of electronic activities that the user is scheduled to complete. The system may, in particular embodiments, automatically adjust the training plan (e.g., the one or more games and/or electronic activities that make up the plan) based at least in part on the user's determined progress.

Exemplary User Experience of Executive Function Training

Figure 19:
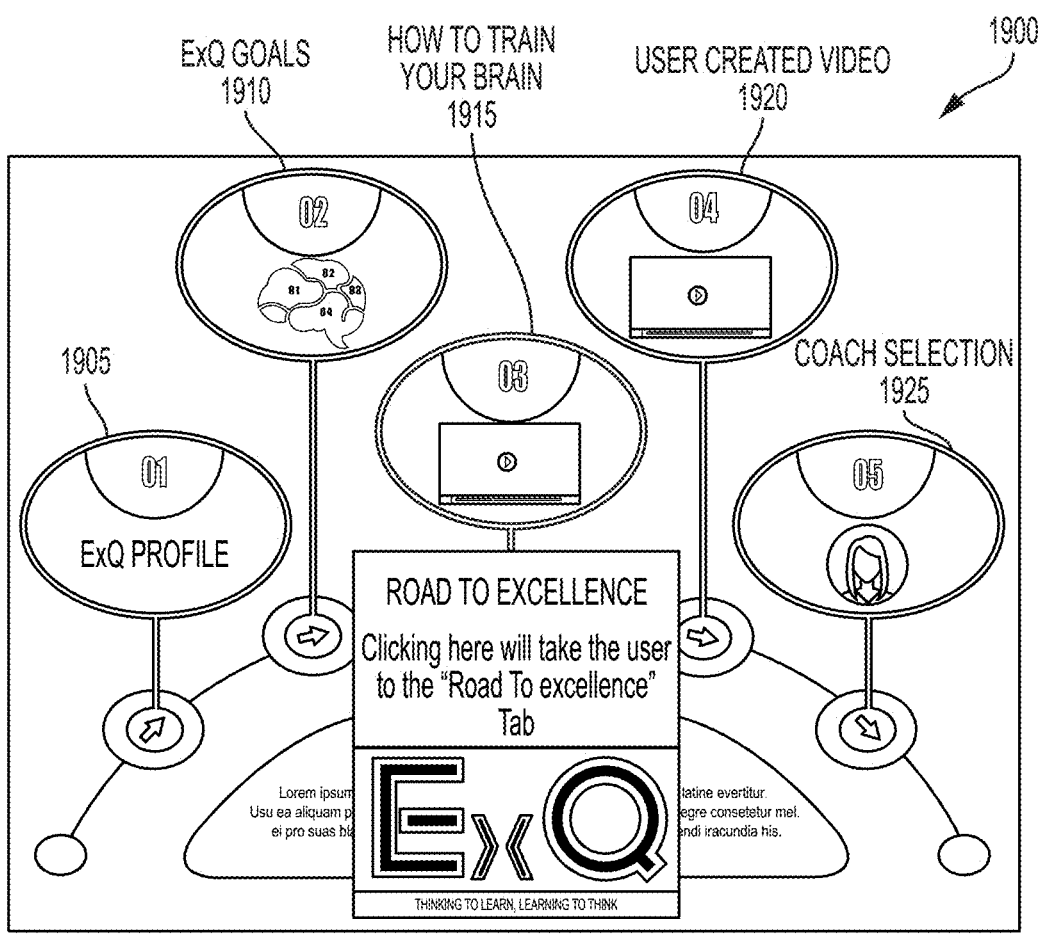

FIGS. 19-22 depict exemplary screen displays that a user may experience related to executive function training. FIG. 19 depicts an interface 1900 via which a user can access their executive function profile 1905, their executive function goals 1910, one or more training games, 1925, one or more user created videos 1920 (e.g., for review, evaluation, etc.), and/or a coach selection 1925 (e.g., for use in user evaluation as discussed above).

FIGS. 20A-20B depict exemplary threshold questions which a user may answer, and which the system may use to determine one or more goals for the user. The system may, for example, generate scores for different areas related to executive function based at least in part on the user's responses to the questions in FIGS. 20A-20B. For example, the system may determine a score for the user that the system uses to identify one or more goals based on, for example: focus (may be referred to as "complex attention"), working memory, time management, prospective memory, organization and planning, flexibility and perspective taking, motivation, and meta-awareness, etc. In various embodiments, the system may use alternative labels for similar aspects used to determine such scores and/or goals. Table 1 below provides a listing of non-limiting, exemplary threshold questions that the system may present to a user, the answers to which the system may use to determine one or more goals for the user. As seen in some of the example threshold questions presented in Table 1, the system may associate a particular threshold question with one or more categories or areas related to executive function (e.g., strategy, social, emotional, social-emotional, etc.).

TABLE 1

Exemplary Treshold Questions

I get distracted by clutter or things in my surroundings.
In class or at home, I find myself daydreaming.
*I push myself to focus more even when things don't interest me. (Strategy)
In class or in a small group, I appear to be 'zoned out'.
I act impulsively and take actions without thinking them through.
I interrupt because I cannot hold back my question or comment. (Social-Emotional)
I get distracted by technology and feel the urge to check my phone.
I lose part of the instructions as my mind goes somewhere else when I am listening.
I find myself getting stuck on things by thinking about them again and again.
Even though it's easy and I can do the work, I get bored easily. (Social-Emotional)
When I'm with people, staying focused is hard for me.
While working on a task, I lose my place because of a small interruption.
*I remove distractions or stop myself from getting distracted so that I can get work done. (Strategy)
I get easily confused when dealing with too many details.
I am the one who distracts others. (Social-Emotional)
I find myself forgetting what I came into the room for.
I ask others to repeat directions, as I can't remember all the parts.
I juggle many things in my head, but I don't always finish them all.
*I actively take notes while listening to help myself. (STRATEGY)
While online, I get sidetracked by notifications or multiple open tabs.
I find it hard to keep a mental to-do list.
I am not good at completing tasks that have multiple steps.
As I am working out problems, I find it hard to hold on to details in my mind.
I find myself re-reading text as I keep losing my place.
While listening to people talk, I find that I have missed some parts.

TABLE 1-continued

Exemplary Treshold Questions

I have to go back and redo work because of careless mistakes.
I find myself pretending to understand something even
though I have no idea what was being said.
(Social-Emotional)
I find it hard to do math in my head.
I find that while reading, I miss out on things people say
to me. (Social-Emotional)
I find that when I'm about to write what I have just
heard, I suddenly forget it.
*I come prepared to class with the materials that I need.
Everyone can see that I am disorganized and my work
space is scattered.
I struggle to figure out what's most important when
getting things done.
*I am really good about using a planner for my assignments.
*I map out ideas and create an outline to write papers.
I waste time instead of getting the work done.
*I have a special place to store my homework so that I
don't misplace it. (Strategy)
I'm either late or rushing, which disrupts other people.
(Social-Emotional)
I insist on finishing something when I should be moving
on to a new task.
*When getting a project done, I'm good at sorting,
organizing, and sequencing ideas.
I leave everything, including school work, for the last minute.
*I don't lose or misplace my belongings even when I
move from class to class.
*My backpack is neat because I clean it daily. (Strategy)
My disorganization affects how other people get their
work done. (Social-Emotional)
*I have a habit of making my work space free of distractions
so that I can get things done. (Strategy)
I have many 'oops' moments in my day because I forget to
do small tasks.
I don't write down small tasks because I feel confident
that I won't forget.
*I have weekly goals for myself.
*I take actions to follow up with goals or tasks that
were interrupted.
I need reminders from others to get things done.
*I review my goals regularly.
*I'm good about coming up with a to-do list for myself.
I overestimate my ability to remember to study without
a written reminder.
*I think about upcoming events or items on my to-do
list to stay on top of my game.
*I am good about following up with things that
didn't get done.
* I use a calendar to plan and to remind myself. (STRATEGY)
*When I have an idea, I feel confident that I will follow
up with it without forgetting.
I get in trouble for not remembering to do things
that I have promised.
*When doing projects, I know what I need to do and I
map out the deadlines in advance.
*Because I know I might forget, I come up with a
written reminder for myself. (STRATEGY)
I ignore my problems in hopes that they will go away.
I am not able to work with unclear or confusing instructions.
*Even if it takes a while, I stick with things that are hard so
I can solve learning problems. (strategy)
I do not know how to translate complex instructions and
expectations into clear and easy ways.
I get frustrated when things don't go as expected.
(Social-Emotional)
Because I prefer to solve problems without any help,
I get bad results.
*I take the time to review any feedback I'm given.
(strategy)
*I recognize that having zeros on homework is a
problem that needs solving.
I find that diving deep into thinking is hard for me.
I am often told to 'figure it out' but I don't know what that means.
*I am good at learning from my mistakes.
By not solving my problems, I create problems for
other people. (Social-Emotional)

TABLE 1-continued

Exemplary Treshold Questions

I often run out of ideas when solving my personal problems.
*If there's no feedback, I ask the teacher to explain
why I have done poorly. (strategy)
I tend to give up too quickly before things can be
sorted out. (Social-Emotional)
I like to do things my way and no other way.
*I am good about changing my ways when things don't
work out well. (Social-Emotional)
*I am good at reading faces and can predict what people
are feeling or thinking. (Social-Emotional)
*I have no problem when somebody gets their
way over mine. (Social-Emotional)
I need things explained before I decide to go along with it.
I am not good about returning to a task after an interruption.
I get upset if my ideas are not welcomed or accepted
by the group. (Social-Emotional)
I get stuck in my ways and suffer from the negative
consequences. (Social-Emotional)
When I get upset, I take a deep breath and try to see things
from other's perspective. (strategy) (Social-Emotional)
People say I am argumentative because I challenge what
is being said. (Social-Emotional)
I am not happy to make changes to my plans because things
have changed. (Social-Emotional)
Once I get upset, I stay upset for a long time. (Social-Emotional)
*I pause and think about how my words and actions affect
other people. (strategy) (Social-Emotional)
I feel embarrassed or upset if people point out my mistakes.
(Social-Emotional)
Once I get stuck on a problem, I don't seem to find a
way out. (Social-Emotional)
I know what I'm good at and I take advantage of those skills.
*When I need help, I go to a patient and encouraging
adult that I know. (STRATEGY) (Social-Emotional)
I am not certain why grades I received are lower than I expected.
*I eagerly use the helpful tips people give me.
I don't like to ask for help because I don't think people
understand what I need. (Social-Emotional)
I don't know why things are easy for people when I find them hard.
*I ask for feedback even if it might be negative. (STRATEGY)
I find it hard to discuss my weaknesses or problems
and ask for help. (Social-Emotional)
I don't know how to improve my performance on a project.
I'm not always clear about my weaknesses.
When I'm told I have made a mistake, I find it hard to know
what I have done wrong.
Even when I check my work for mistakes before
turning it in, I still end up with some.
I'm not sure why people are unhappy with my
attitude and behaviors. (Social-Emotional)
I don't like to go to people for help because it takes too
much time and increases my work.
I don't know why I struggle with certain things.

Figure 21:
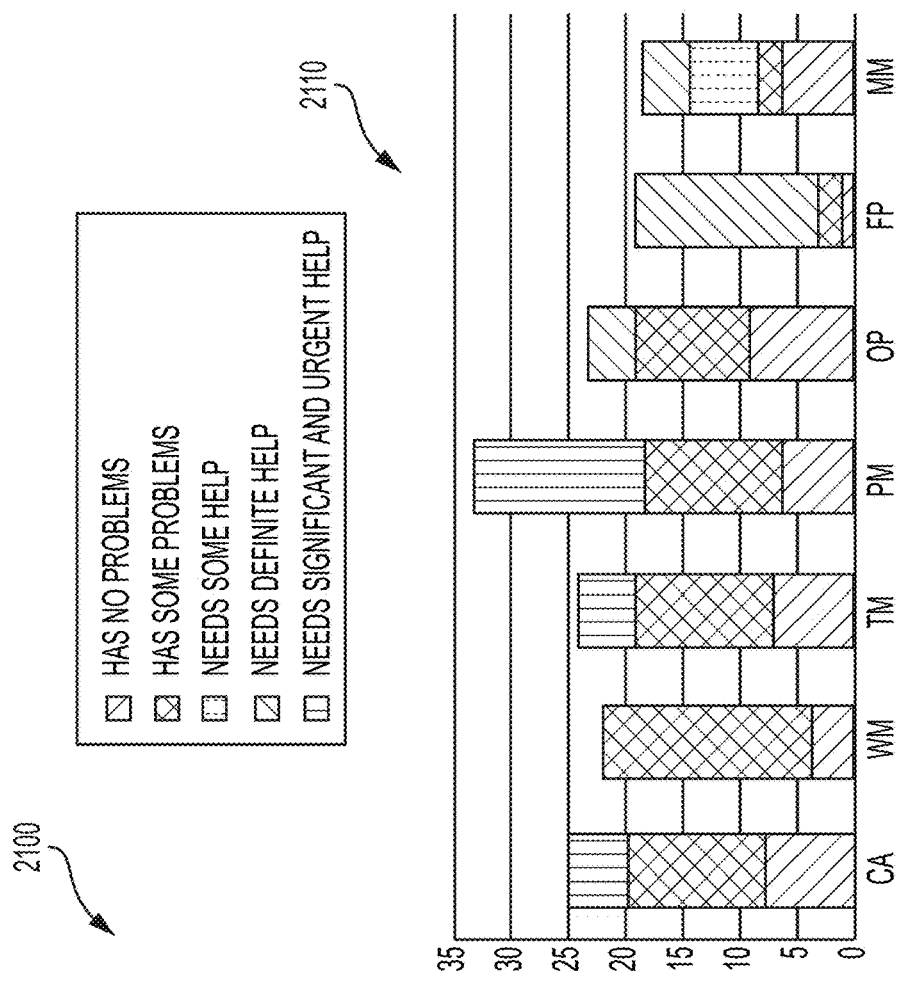
Figure 21:
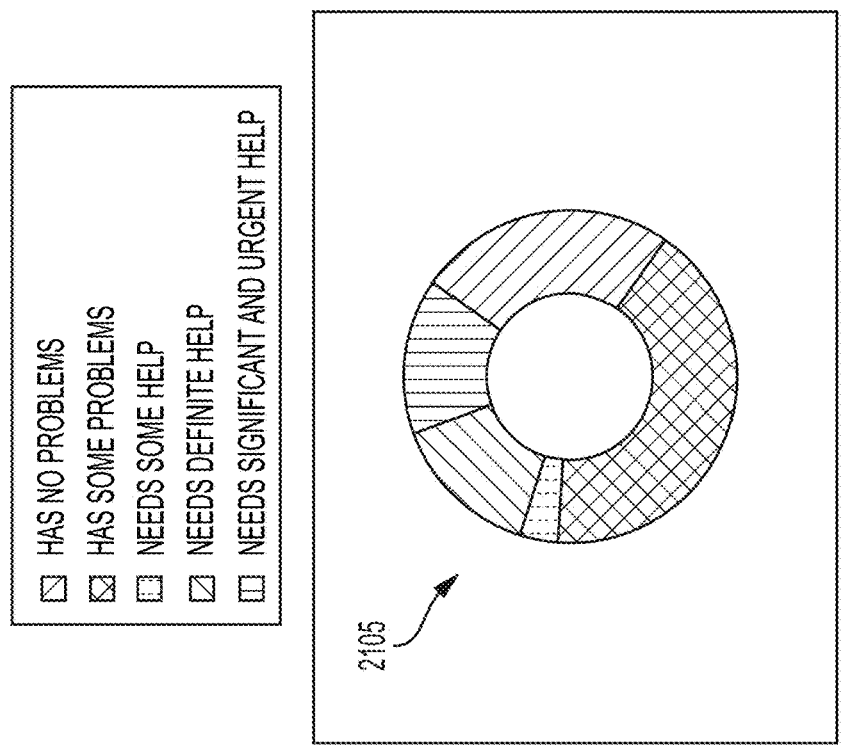

FIG. 21 depicts an exemplary screen display 2100 showing a breakdown of one or more scores derived for a particular user based, for example, on the user's responses to one or more questionnaires, the user's performance on one or more electronic games, etc. As may be understood from this figure, the screen display 2100 includes a breakdown 2105 of a particular skill, as well as breakdowns 2110 of a plurality of skills related to executive function. As may be understood form the example in this figure, the user likely needs the most help on motivation and meta-awareness. In this case, the system may be configured to identify a goal to improve those skills (e.g., by directing the user to complete one or more electronic games related to those skills). In particular embodiments, the system may present the screen display 2100 and/or a breakdown of the one or more scores derived for the particular user to a coach (e.g., admin, instructor, etc.) who is not a particular user. In this way, the coach may use such information to help tailor their assistance to the particular user.

Figure 22:
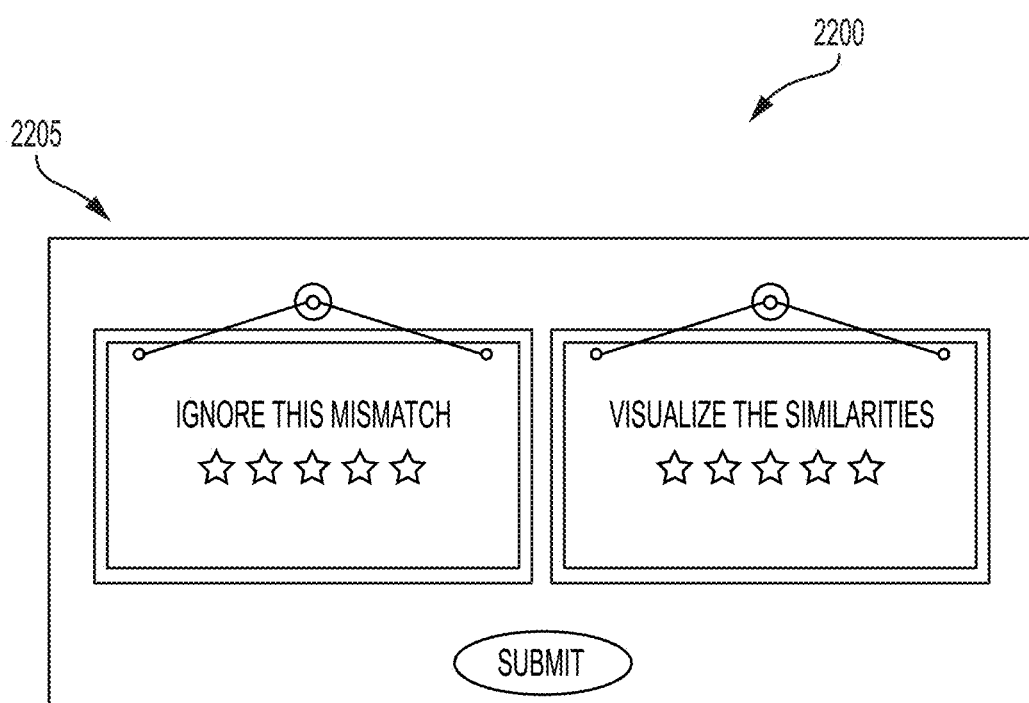

FIG. 22 depicts a screen display 2200 with which a user may provide feedback regarding a helpfulness rating 2205 of particular strategies. The user may, for example, rate a particular strategy on a star scale to provide the system with information regarding types of strategies that the user finds most helpful.

Strategy Review and Scoring Modules

Figure 25:
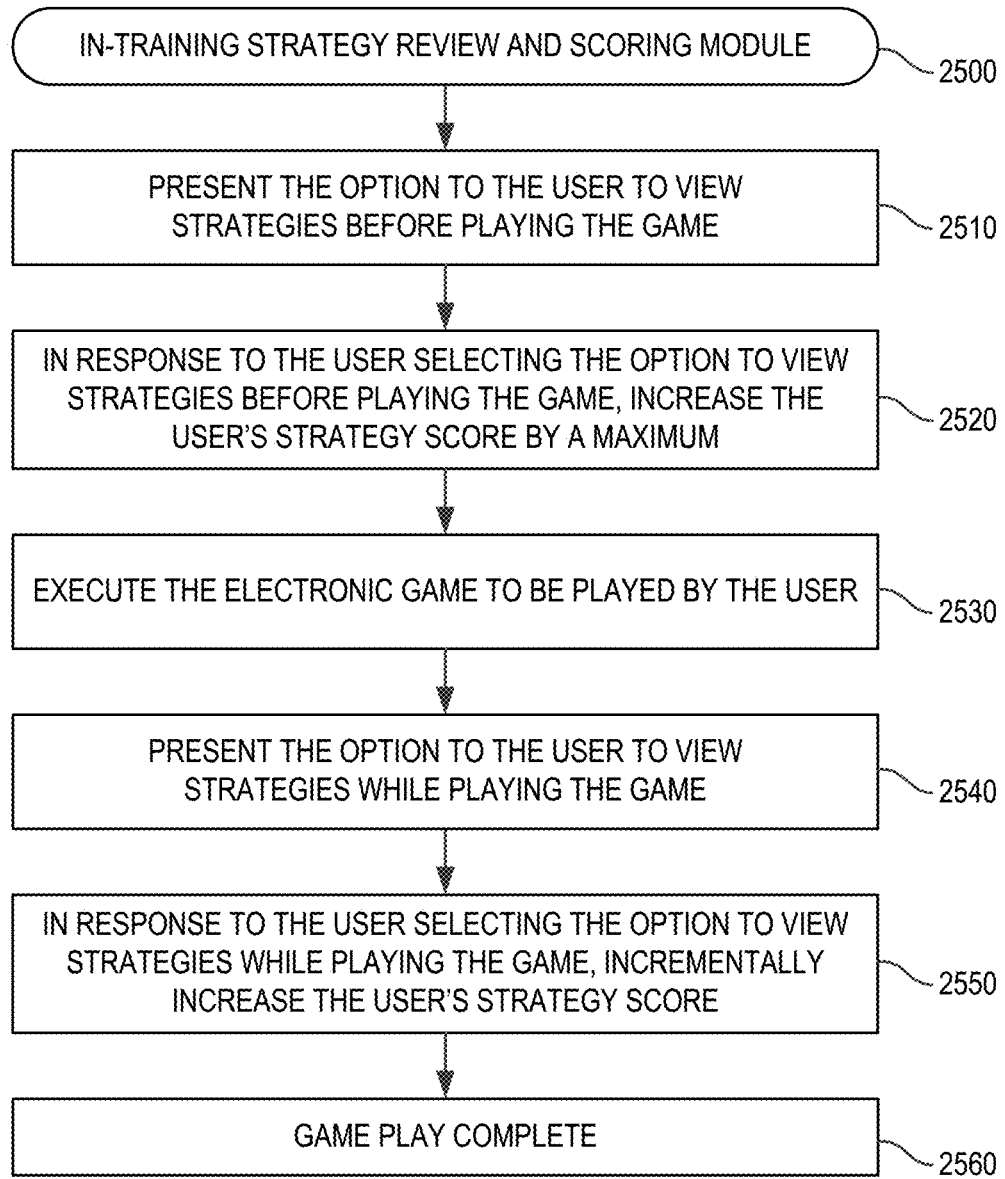
FIG. 25 is a flowchart showing an example of a processes performed by the In-Training Strategy Review and Scoring Module according to particular embodiments.

As noted above, as part of an executive functions training process, the system may generate a strategy score for a user that may be used to measure how well a user connects training goals to an activity, connects an activity to one or more strategies, and/or connects one or more strategies to one or more real-life skills. The system may utilize one or more methods or processes to determine and collect such measurements. FIG. 25 illustrates an exemplary process for providing strategy review before and/or during an activity (e.g., during game play) and adjusting a user's strategy score in response to the user's use of strategy review. The In-training Strategy Review and Scoring Module 2500, which may be executed by the one or more computing devices of the system 100, may perform this process.

At Step 2510, the system may present to the user the option of viewing one or more strategies (e.g., "game plans") before commencing with the activity. At Step 2520, the system may determine whether the user selected an option to review one or more strategies prior to beginning the activity and adjust the user's strategy score accordingly. For example, the system may increase the user's strategy score by a particular value (e.g., by a maximum possible value) if the user chose to view a strategy before starting the activity. At Step 2530, the system may execute the activity and facilitate user interaction during the activity. At Step 2540, as the user is performing the activity, the system may present to the user the option of viewing one or more strategies as the activity is ongoing. At Step 2550, the system may determine whether the user selected an option to review one or more strategies during the activity and adjust the user's strategy score accordingly. For example, the system may increase the user's strategy score by a particular value (e.g., by a value less than a maximum value) if the user chose to view a strategy while performing the activity. At Step 2560, the user may complete the activity. In particular embodiments, the system may not adjust the user's strategy score if the user chooses not to review any strategies before or during the activity.

Figure 26:
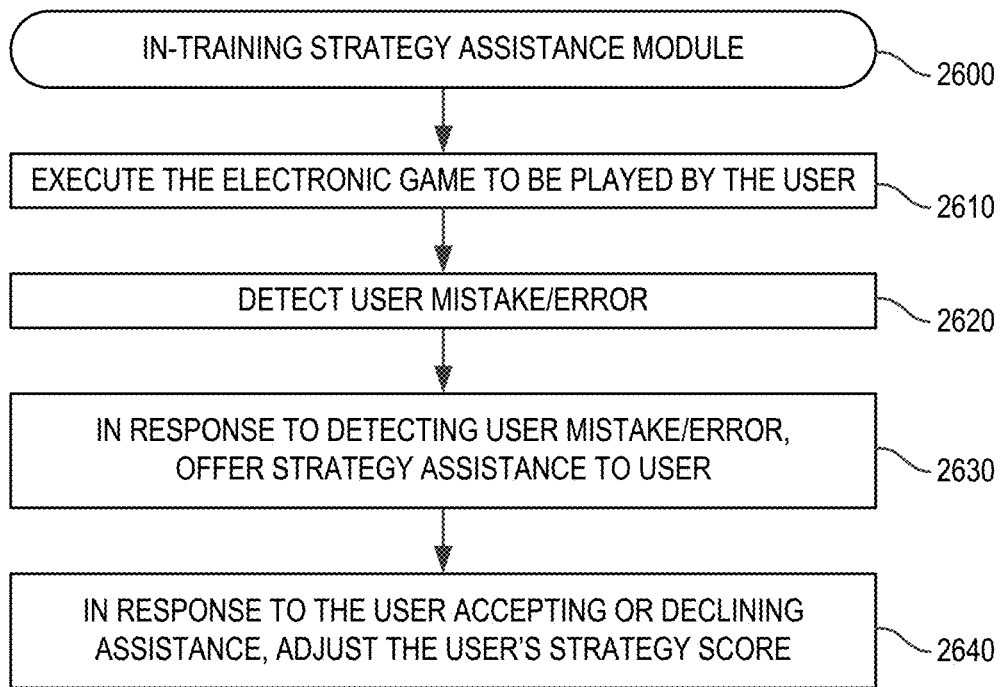
FIG. 26 is a flowchart showing an example of a processes performed by the In-Training Strategy Assistance Module according to particular embodiments.

FIG. 26 illustrates an exemplary process for providing strategy assistance during an activity (e.g., during game play) and adjusting a user's strategy score in response to the user's use of strategy assistance. The In-Training Strategy Assistance Module 2600, which may be executed by the one or more computing devices of the system 100, may perform this process. At Step 2610, the system may execute the activity and facilitate user interaction during the activity. At Step 2620, the system may detect that the user has committed an error of some type during performance of the activity. In response to detecting the user error, at Step 2630 the system may present an option to the user of presenting some form of strategy assistance to the user (e.g., hints, re-performance opportunity, tutorial, etc.). In particular embodiments, the system may facilitate a coach determining and presenting such strategy assistance options to the user. At Step 2640, the system may determine whether the user selected an option to view or otherwise accept offered strategy assistance and adjust the user's strategy score accordingly. For example, the system may increase the user's strategy score by a particular value (e.g., by a value less than a maximum value) if the user chooses to accept the offered strategy assistance. If the user does not choose to accept any of the offered strategy assistance, the system may not adjust the user's strategy score.

Figure 27:
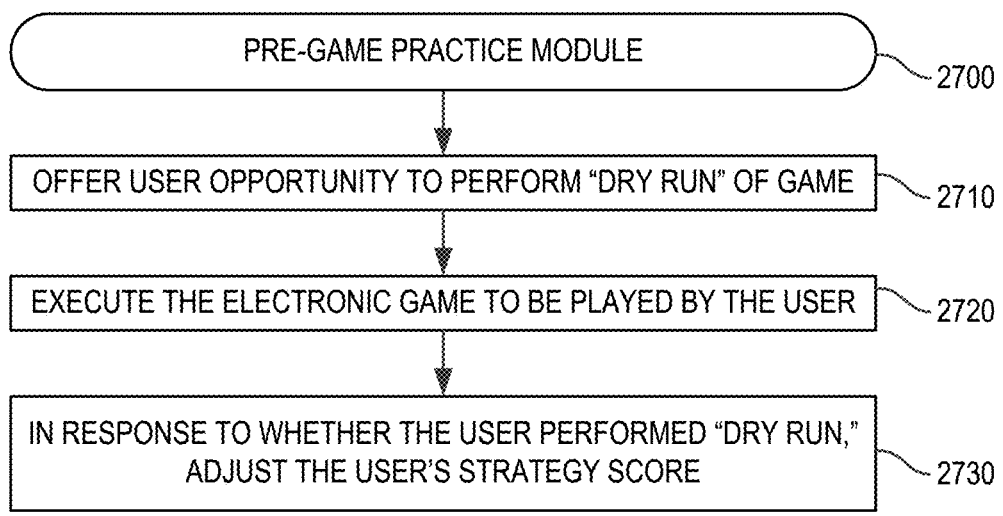
FIG. 27 is a flowchart showing an example of a processes performed by the Pre-Game Practice Module according to particular embodiments.

FIG. 27 illustrates an exemplary process for providing a trial activity before an actual activity (e.g., pre-game practice before actual game play) and adjusting a user's strategy score in response to the user's use of the trial activity. The Pre-Game Practice Module 2700, which may be executed by the one or more computing devices of the system 100, may perform this process. At Step 2710, the system may present to the user an option for the user to perform a trial run ("dry run") of the activity prior to actually performing the activity to generate a strategy score. At Step 2720, the system may execute the activity and facilitate user interaction with and completion of the activity. At Step 2730, the system may adjust the user's strategy score based whether the user took advantage of the opportunity to perform a trial run of the activity. For example, the system may increase the user's strategy score when the user chooses to perform the trial run and performs the trial run successfully (e.g., accurately - based on any type of performance measurement or threshold). The system may decrease the user's strategy score when the user chooses to perform the trial run and also performs the trial run unsuccessfully (e.g., inaccurately). When the user chooses to not perform the dry run, the system may decrease the user's strategy score or leave the user's strategy score unchanged.

Figure 28:
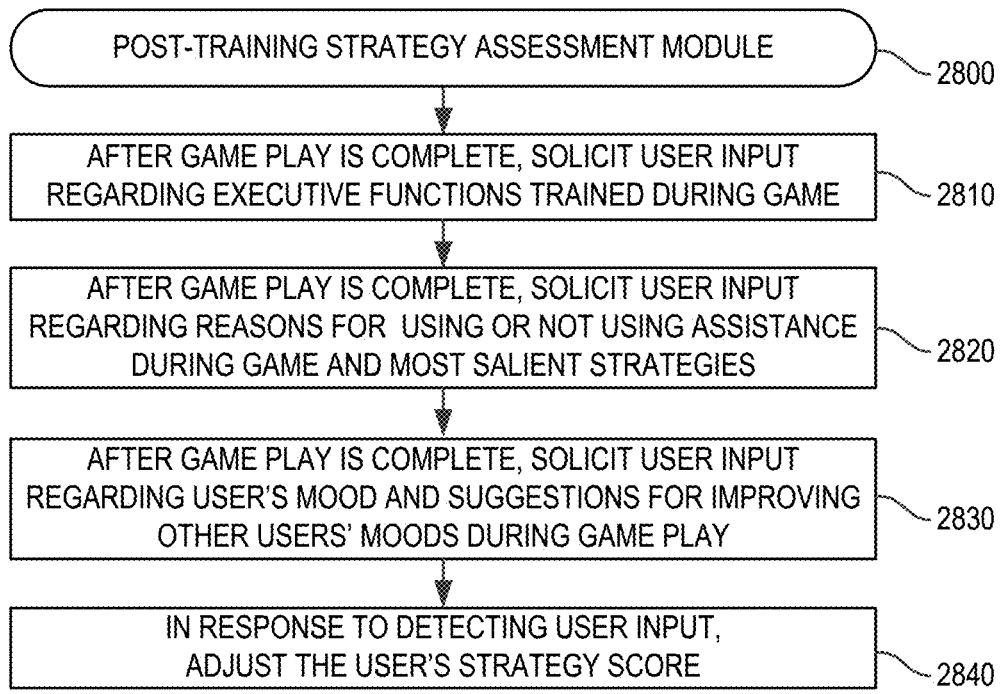
FIG. 28 is a flowchart showing an example of a processes performed by the Post-Training Strategy Assistance Module according to particular embodiments.

FIG. 28 illustrates an exemplary process for performing post-activity strategy assessment and adjusting a user's strategy score in response to assessment. The Post-Training Strategy Assessment Module 2800, which may be executed by the one or more computing devices of the system 100, may perform this process. At Step 2810, the system may present questions to the user asking the user to provide input identifying one or more executive function areas that were trained or otherwise associated with the activity or tasks performed during the activity. If the user accurately identifies the relevant executive function area(s), the system may increase the user's strategy score at Step 2840. If the user does not accurately identify the associated executive function area, the system may make no change to the user's strategy score. In particular embodiments, at Step 2810 the system asking the user to identify relevant executive function areas may include the system asking the user to correctly place in order several (e.g., two, three, four, etc.) executive function-related concepts addressed by the activity based on the concepts' importance or significance to the activity. For example, the system may prompt the user to order concepts from most to least frequently addressed within the activity. If the user places the concepts in the correct order, the system may increase the user's strategy score at Step 2840. If the user does not place the concepts in the correct order, the system may make no change to the user's strategy score.

At Step 2820, the system may prompt the user to identify one or more reasons why the user did or did not make use of assistance offered before or during the activity. The system may then prompt the user to select a most salient strategy for other users based, at least in part, on the user's use of available assistance. If the user selects a strategy for other users that matches or is otherwise associated with this user's indicated reason for taking advantage (or not taking advantage) of available assistance, the system may fully increase (e.g., add a maximum value to) the user's strategy score at Step 2840. If the user selects a strategy for other users that does not match or is otherwise not associated with this user's indicated reason for taking advantage (or not taking advantage) of available assistance, but is otherwise an important or significant strategy, the system may somewhat increase (e.g., add an incremental value less than a maximum value to) the user's strategy score at Step 2840. If the user selects a strategy for other users that does not match or is otherwise not associated with this user's provided reason for taking advantage (or not taking advantage) of available assistance, and is not otherwise an important or significant strategy, the system may decrease or leave unchanged the user's strategy score.

At Step 2830, the system may prompt the user to identify the user's mood after completing the activity. The system may then prompt the user select one or more suggestions for elevating the mood or otherwise changing the mindset of the user or of other users regarding strategies. If the user selects a suggestion associated with a mindset that corresponds to a (e.g., predefined) correct mood, the system may increase the user's strategy score at Step 2840. If the user selects a suggestion associated with a mindset that does not correspond to a (e.g., predefined) correct mood, the system may leave the user's strategy score unchanged at Step 2840.

Figure 29:
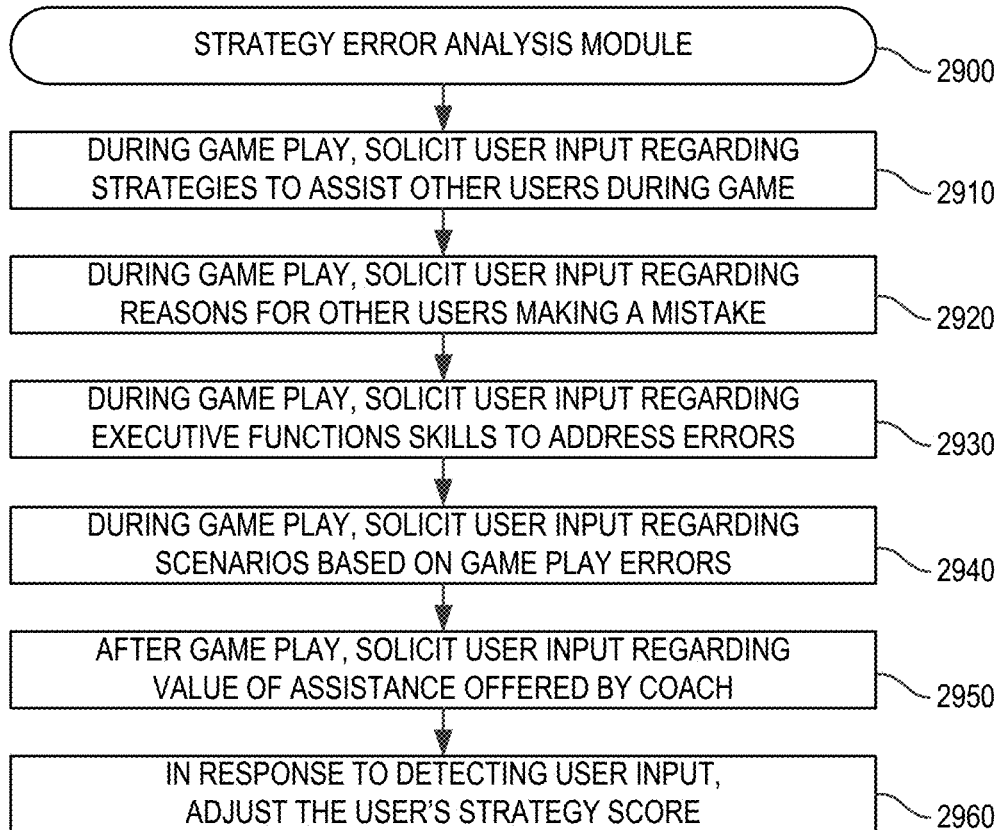
FIG. 29 is a flowchart showing an example of a processes performed by the Strategy Error Analysis Module according to particular embodiments.

FIG. 29 illustrates an exemplary process for performing activity-specific strategy error analysis. The Strategy Error Analysis Module 2900, which may be executed by the one or more computing devices of the system 100, may perform this process. At Step 2910, the system may, while the user is performing an activity, prompt the user to select a strategy that the user believes would be helpful to another user in completing the portion of the activity that the user is currently performing. The system may then, at Step 2960, modify the user's strategy score based on the user's strategy selection. For example, if the user selects the "correct" strategy (e.g., a predefined strategy associated with, or positively associated with, the particular portion of the activity), the system may increase (e.g., add a maximum value to) the user's strategy score at Step 2960. If the user selects an "incorrect" strategy (e.g., a predefined strategy not associated with, or negatively associated with, the particular portion of the activity), the system may leave the user's strategy score unchanged.

At Step 2920, the system may prompt the user to select a best answer to a query of why another user may have made a particular mistake. If the user selects the "correct" answer (e.g., a predefined answer associated with the presented particular mistake), the system may increase (e.g., add a maximum value to) the user's strategy score at Step 2960. If the user selects an incorrect answer (e.g., an answer other than a predefined answer associated with the presented particular mistake), the system may leave the user's strategy score unchanged.

At Step 2930, in response to detecting a user error at a particular portion of the activity, the system may prompt the user to select one or more executive function skills for which the user believes additional training will help other users avoid a similar error. If the user selects the "correct" executive function skill (e.g., a predefined skill associated with the particular error and/or particular portion of the activity), the system may increase (e.g., add a maximum value to) the user's strategy score at Step 2960. If the user does not select a correct executive function skill (e.g., selects a skill other than a predefined skill associated with the particular error and/or particular portion of the activity), the system may leave the user's strategy score unchanged.

At Step 2940, the system may prompt the user for input regarding one or more particular real-life scenarios that may be based on one or more errors detected during the user's performance of the activity. The system may prompt the user to indicate whether the user has had any experiences similar to the presented scenario(s) (e.g., "does this happen to you?" or "does this not happen to you?"). If the user indicates that a particular scenario does not happen to the user, the system may prompt the user to elaborate (e.g., provide a reason why the scenario does not happen to the user) and may increase (e.g., add a maximum value to) the user's strategy score at Step 2960.

At Step 2950, after completion of any error analysis processes and/or tasks and/or upon completion of the activity, the system may facilitate a coach providing the user with further assistance or information, such as one or more potentially helpful "game plans," "smart habits," "mindsets," further strategies, etc., and may solicit user input on such assistance. For example, the system may prompt the user to indicate whether the user found particular assistance of value and/or relevant to the activity and/or strategies associated therewith. If the user indicates that the offered assistance was very helpful (e.g., three stars), the system may increase (e.g., add a maximum value to) the user's strategy score at Step 2960. If the user indicates that the offered assistance or information was somewhat helpful (e.g., two stars), the system may increase (e.g., add an incremental value less than a maximum value to) the user's strategy score at Step 2960. If the user indicates that the offered assistance or information was not helpful (e.g., one stars), the system may decrease the user's strategy score at Step 2960 or leave the strategy score unchanged.

Figure 30:
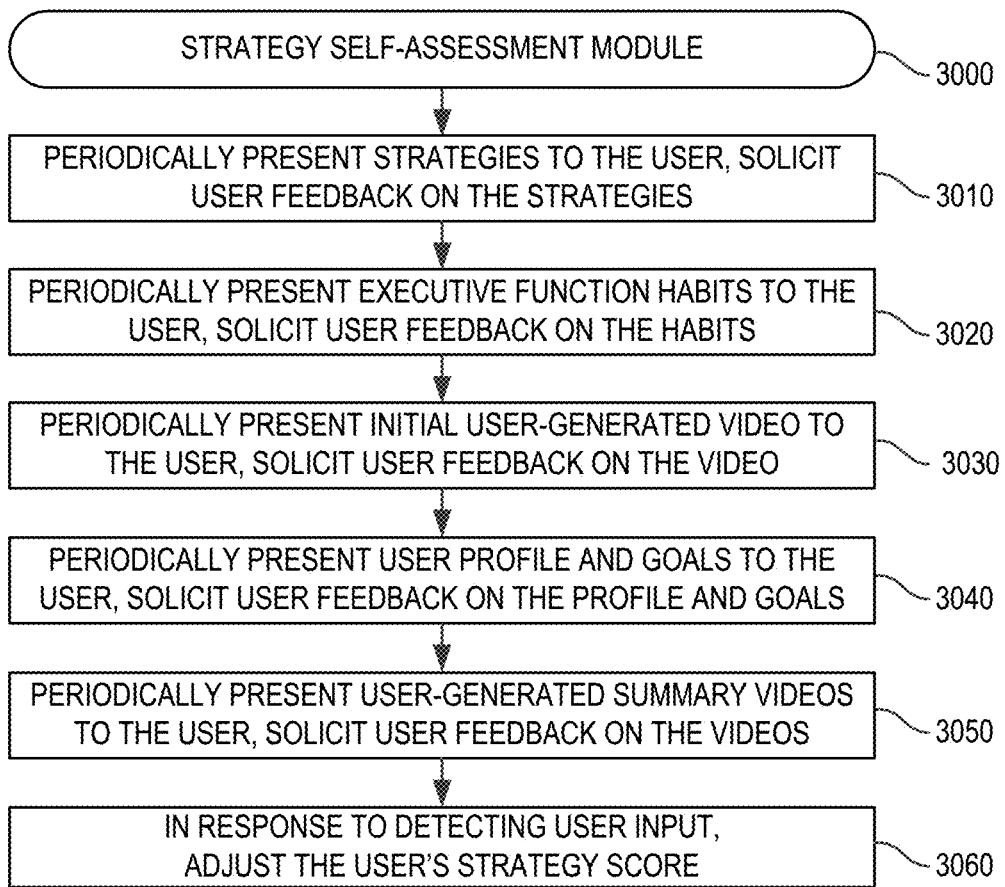
FIG. 30 is a flowchart showing an example of a processes performed by the Strategy Self-Assessment Module according to particular embodiments.

FIG. 30 illustrates an exemplary process for performing strategy self-assessment. The Strategy Self-Assessment Module 3000, which may be executed by the one or more computing devices of the system 100, may perform this process. At Step 3010, the system may periodically (e.g., daily, weekly, monthly, etc.) prompt the user to review and provide feedback on one or more various strategies. The system may then generate and/or adjust the strategy score at Step 3060 based on the user's responses. In particular embodiments, at Step 3010, the system may present the user with several categories of strategies. For example, the system may present the user with any one or more strategy categories such as, but not limited to, self-awareness strategies, mindset strategies, executive function strategies, social-emotional strategies, and strategies to help learn from mistakes. The system may then prompt the user to provide input regarding user's implementation of one or more strategies associated with each strategy category. In response to such input, at Step 3060, the system may adjust the user's strategy score.

In particular embodiments, in response to input received at Step 3010, at Step 3060 the system may conditionally adjust the user's strategy score based on one or more criteria. For example, if the user indicates that the user will begin to use a particular strategy associated with a strategy category, the system may increase (e.g., add a maximum value to) the user's strategy score at Step 3060 if the system also determines that the user's current, or most recent, strategy score is below a threshold (e.g., is less than 80%). If the system determines that the user's current, or most recent, strategy score meets or exceeds a threshold (e.g., is greater than or equal to 80%), the system may increase (e.g., add an incremental value less than a maximum value to) the user's strategy score at Step 3060 in response to the user indicating that the user will begin to use a particular strategy associated with a strategy category. In such embodiments, if the user indicates that the user already uses the particular strategy associated with the strategy category, the system may somewhat increase (e.g., add an incremental value less than a maximum value to) the user's strategy score at Step 3060 if the system also determines that the user's current, or most recent, strategy score is at or above a threshold (e.g., is greater than or equal to 80%). If the system determines that the user's current, or most recent, strategy score is below a threshold (e.g., is less than 80%), the system may fully decrease (e.g., reduce by a maximum value) the user's strategy score at Step 3060 in response to the user indicating that the user already uses the particular strategy associated with the strategy category.

At Step 3020, the system may periodically (e.g., daily, weekly, monthly, etc.) prompt the user to provide input regarding one or more executive function habits (e.g., to monitor personal progress). For example, the system may present a particular executive function habit to the user and prompt the user to indicate whether the user engages in that particular habit. If the user indicates that user does engage in that particular habit, the system may increase (e.g., add a maximum value to) the user's strategy score at Step 3060. If the user indicates that the user does not (or does not yet) engage in that particular habit, the system may leave the user's strategy score unchanged.

At Step 3030, the system may periodically (e.g., daily, weekly, monthly, etc.) prompt the user to provide input regarding a user-created video capturing the user's intended or hoped-for results of the training (e.g., a "Dear Future Me" video). Based on this input, the system may adjust the user's strategy score at Step 3060. For example, if the user reviews the user's "Dear Future Me" video and indicates that the video was a very helpful aid (e.g., the user rates the video three stars—"this is a great reminded"), the system may fully increase (e.g., add a maximum possible value to) the user's strategy score at Step 3060. If the user reviews the user's "Dear Future Me" video and indicates that the video was a somewhat helpful aid (e.g., the user rates the video two stars—"this is a good reminder"), the system may somewhat increase (e.g., add an incremental value less than a maximum possible value to) the user's strategy score at Step 3060. If the user reviews the user's "Dear Future Me" video and indicates that the video was not a helpful aid (e.g., the user rates the video one star—"this does not help me"), the system may decrease the user's strategy score at Step 3060.

At Step 3040, the system may periodically (e.g., daily, weekly, monthly, etc.) prompt the user to provide input regarding the user's profile and/or one or more of the user's goals. Such a profile and goals may have been generated by the system and may or may not be based on user input. The system may then adjust the user's strategy score based on the user's input regarding the profile and goals. For example, if the user provides feedback that the review of the profile and goals was very helpful (e.g., the user rates the helpfulness of the review three stars—"this is a great reminded"), the system may fully increase (e.g., add a maximum value to) the user's strategy score at Step 3060. If the user provides feedback that the review of the profile and goals was somewhat helpful (e.g., the user rates the helpfulness of the review two stars—"this is a good reminder"), the system may somewhat increase (e.g., add an incremental value less than a maximum value to) the user's strategy score at Step 3060. If the user provides feedback that the review of the profile and goals was not helpful aid (e.g., the user rates the helpfulness of the review one star—"this does not help me"), the system may decrease the user's strategy score at Step 3060.

At Step 3050, the system may periodically (e.g., daily, weekly, monthly, etc.) prompt the user to provide input regarding one or more user-created videos summarizing the user's training experience thus far (e.g., META summary videos). The system may then adjust the user's strategy score based on the user's input at Step 3060. For example, if the user provides feedback that the review of a particular previously created summary video was very helpful aid (e.g., the user rates the video three stars—"I am learning a lot from myself!"), the system may fully increase (e.g., add a maximum value to) the user's strategy score at Step 3060. If the user provides feedback that the review of the particular previously created summary video was somewhat helpful (e.g., the user rates the video two stars—"I am learning a little from myself!"), the system may somewhat increase (e.g., add an incremental value less than a maximum value to) the user's strategy score at Step 3060. If the user provides feedback that the review of a particular previously created summary video was not helpful (e.g., the user rates the video one star—"I am not learning anything from myself!"), the system may decrease the user's strategy score at Step 3060.

Figure 31:
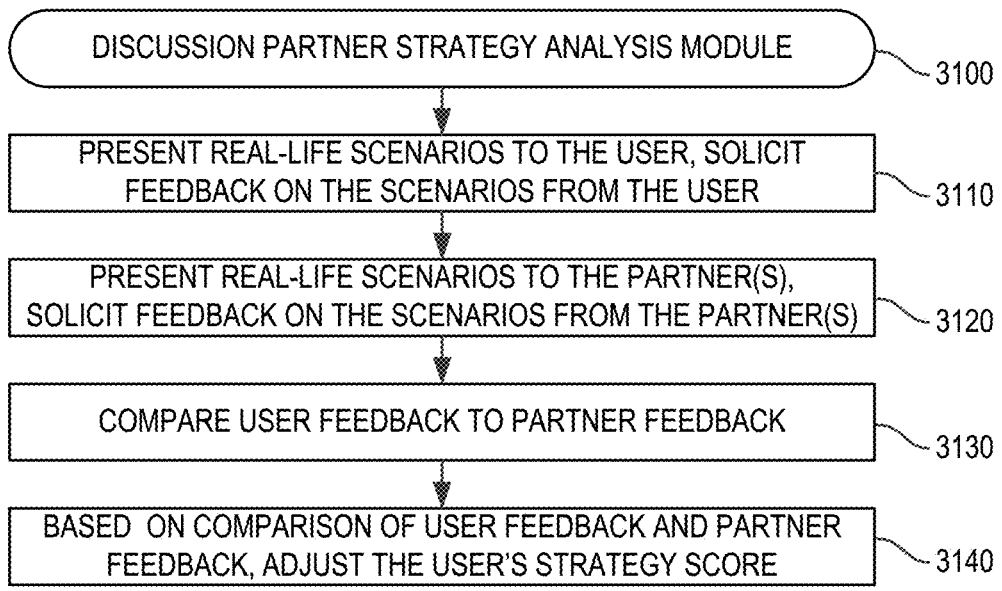
FIG. 31 is a flowchart showing an example of a processes performed by the Discussion Partner Strategy Analysis Module according to particular embodiments.

FIG. 31 illustrates an exemplary process for performing discussion partner strategy analysis. The Discussion Partner Strategy Analysis Module 3100, which may be executed by the one or more computing devices of the system 100, may perform this process. At Step 3110, the system may present to the user one or more real-life scenarios and solicit feedback from the user regarding such scenarios (e.g., reasons why such scenarios happen or do not happen to the user). At Step 3120, the system may present the same one or more scenarios to one or more discussion partners associated with the user (e.g., parents, teachers, peers, etc.) and solicit feedback from such partners regarding such scenarios (e.g., reasons why such scenarios happen or do not happen to the user). In particular embodiments, the system may allow the user to select or designate one or more discussion partners. The system may solicit these partner selections from the user at any point before or during the training process.

After receiving responses from the user and the partner(s), at Step 3130 the system may compare the feedback received from the user to the feedback received from the discussion partner(s) and use the results of the comparison to adjust the user's strategy score at Step 3140. For example, if the user feedback for a particular scenario matches the discussion partner feedback for that particular scenario, the system may fully increase (e.g., add a maximum value to) the user's strategy score at Step 3140. If the user feedback for a particular scenario does not match the discussion partner feedback for that particular scenario, the system may only somewhat increase the user's strategy score at Step 3140 or may not increase the user's strategy score.

Figure 32:
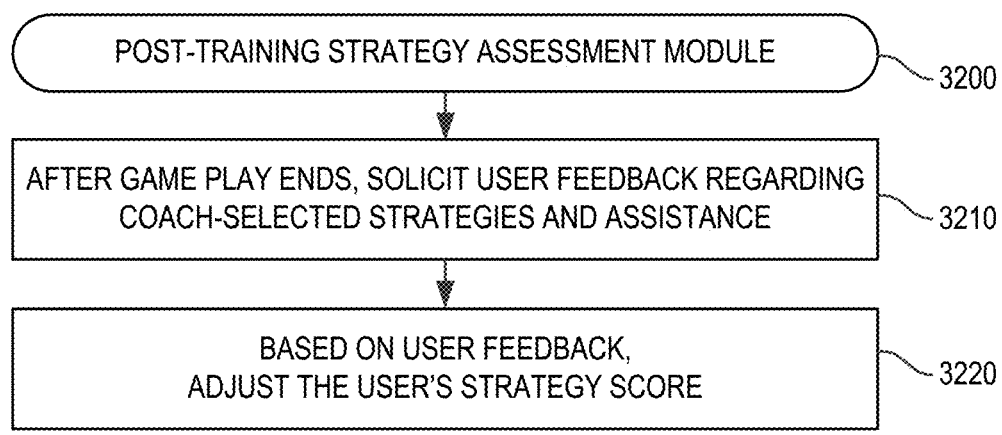
FIG. 32 is a flowchart showing an example of a processes performed by the Post-Training Strategy Assessment Module according to particular embodiments.

FIG. 32 illustrates an exemplary process for performing post-training strategy assessment. The Post-Training Strategy Assessment Module 3200, which may be executed by the one or more computing devices of the system 100, may perform this process. During a training activity or training period, the system may facilitate the coach providing feedback to the user regarding the user's performance, use of in-training assistance, and/or strategies for that training period or activity. At Step 3210, after completion of the training period or activity, or periodically during the training (e.g., at the end of each week, each day, etc.), the system may prompt the user to provide feedback regarding the coach's assistance and proposed strategies. Based on this feedback, the system may adjust the user's strategy score at Step 3220. For example, if the user provides feedback regarding a particular assistance from a coach indicating that the assistance was very helpful aid (e.g., the user rates the assistance as thumbs up—"This is so helpful!"), the system may fully increase (e.g., add a maximum value to) the user's strategy score at Step 3220. If the user provides feedback regarding the particular assistance from the coach indicating that the assistance was not helpful (e.g., the user rates the feedback as thumbs down—"This doesn't help"), the system may decrease the user's strategy score at Step 3220.

Figure 33:
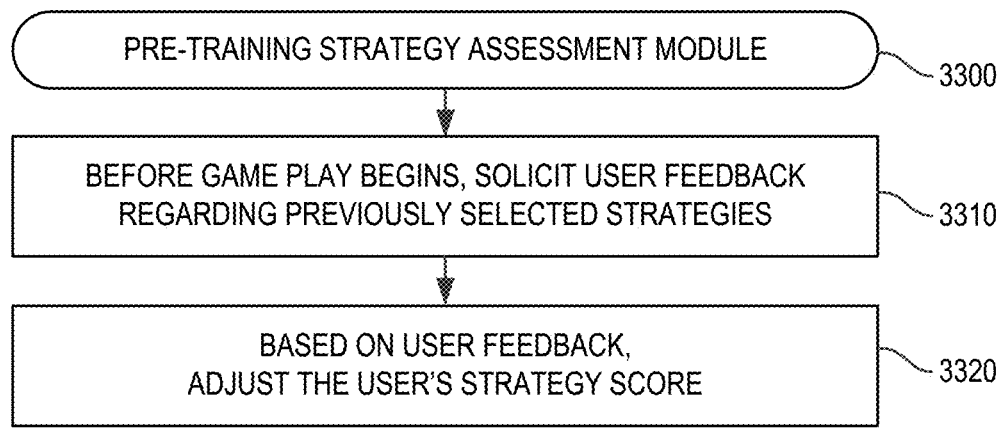
FIG. 33 is a flowchart showing an example of a processes performed by the Pre-Training Strategy Assessment Module according to particular embodiments.

FIG. 33 illustrates an exemplary process for performing pre-training strategy assessment. The Pre-Training Strategy Assessment Module 3300, which may be executed by the one or more computing devices of the system 100, may perform this process. Prior to beginning a training activity or training period, the system may facilitate the coach providing the user with one or more strategies that the user may have previously indicated that the user intends to use in the future. At Step 3310, the system may solicit feedback from the user regarding each of such one or more intended strategies and adjust the user's strategy score based at Step 3320 based on the feedback. For example, if the user provides feedback indicating that the user intends to use a particular strategy during an activity or period that is about to begin (e.g., the user rates the strategy with three stars—"I will use this strategy!"), the system may fully increase (e.g., add a maximum value to) the user's strategy score at Step 3320. If the user provides feedback indicating that the user may use the particular strategy during the activity or period that is about to begin (e.g., the user rates the strategy with two stars—"I might use this strategy"), the system may somewhat increase (e.g., add an incremental value less than a maximum value to) the user's strategy score at Step 3320. If the user provides feedback indicating that the user will not use the particular strategy during the activity or period that is about to begin (e.g., the user rates the strategy with one star—"I will not use this strategy"), the system may decrease the user's strategy score at Step 3320.

Improving User Coaching Skills with Virtual Training Partners

As part of an executive functions training process, the system may use virtual training partners to allow a user to improve the user's perspective-taking, coaching, and mentoring abilities. In various embodiments, the system may generate one or more virtual training partners and one or more scenarios and/or behaviors that the system will associate with a respective virtual training partner of the one or more virtual training partners. The system may then select a virtual training partner and present one or more of the scenarios and/or behaviors associated with the selected training partner to the user. Once the user has had the opportunity to evaluate the presented scenarios and/or behaviors, the system then solicits responses, actions, and/or coaching feedback from the user for the virtual training partner regarding the presented scenario and/or behaviors. The system assesses the user's responses, actions, and/or coaching feedback and may provide additional training and/or feedback to the user based on this assessment of the interaction to help the user improve the user's coaching skills.

In various embodiments, the system may select and present a virtual training partner and associated scenarios/behaviors to a user during the course of the user's participation in an executive functions training process (e.g., during any of executive training process embodiments and/or other embodiments set forth herein). In particular embodiments, the system may generate or otherwise have access to a plurality of virtual training partners and associated scenarios and/or behaviors. In such embodiments, the system may present one of these virtual training partners and its associated scenarios/behaviors to a user at certain times during the user's participation in the training process. For example, the system may periodically present one of these virtual training partners and its associated scenarios/behaviors to the user or may present one of these virtual training partners and its associated scenarios/behaviors to the user at predetermined points of the training process. The system may be configured to select a particular virtual training partner in a sequential or "round robin" manner so that the user may be exposed to each virtual training partner in a particular order. Alternatively, the system may select training partners randomly or using any other methodology. Virtual training partners and their associated scenarios/behaviors may be generated at any time and added to and/or removed from a pool of available virtual training partners as needed or based on any other criteria.

The system may generate one or more behaviors and/or scenarios for a virtual training partner based on various criteria. In various embodiments, the system may generate scenarios/behaviors based on known characteristics (e.g., habits, mindsets, approaches, actions, etc.) that are commonly found in real people in the real world. The system may select one or more of such characteristics from a general pool of characteristics and generate a virtual training partner and associated scenarios/behaviors based on the selected characteristics, independent of any consideration of a particular user to whom the virtual training partner may be presented. Alternatively, the system may select one or more of such characteristics based on known characteristics of a particular user and generate a virtual training partner and associated scenarios/behaviors based on those selected characteristics. The characteristics used as a basis for virtual training partner scenarios and/or behaviors may include positive characteristics (e.g., associated with good habits, growth mindsets, productive behaviors, effective plans, etc.) and/or negative characteristics (e.g., associated with bad habits, fixed mindsets, counterproductive behaviors, ineffective plans, etc.).

In various embodiments, the system may present the virtual training partner scenarios and/or behaviors (e.g., as work product associated with the virtual training partner, images, audio, video, etc.). For example, the system may present an image (e.g., drawing, picture) of a virtual training partner with text and/or audio describing the virtual training partner scenarios and/or behaviors. In particular embodiments, the system may present samples of the virtual partner's schoolwork or other work product produced by or associated with the virtual partner. The system may present preliminary information to frame the virtual training partner scenarios and/or behaviors, such as presenting a video of actors representing teachers describing purposes of learning, classroom expectations, effective learning strategies, and ways that students can be successful or unsuccessful in that class (e.g., behaviors that lead to or prevent success in the class, etc.). For example, the system may present video of an actor representing a teacher of the virtual training partner discussing various learning scenarios and/or behaviors important for academic and life success. Then the system may present the virtual training partner scenarios and/or behaviors and solicit responses, actions, and/or coaching feedback from the user for the virtual training partner.

In various embodiments, the system may assess the user's responses, actions, and/or coaching feedback and determine a coaching score, for example, feedback based on certain criteria. The system may adjust this coaching score over time, for example, based on one or more of the user's subsequent virtual training partner interactions and/or based on any other assessments that may be performed during an executive functions training process (e.g., as described herein).

After assessment, the system may present follow-up instruction to the user, for example, based on the presented virtual training partner scenarios and/or behaviors and the results of the assessment thereof. In particular embodiments, the system may present a video of a counselor (e.g., middle school counselor, high school counselor, guidance counselor, etc.) providing instruction on ways to cooperate, collaborate, interact with other students (e.g., virtual students in the class scenario) and further build and strengthen essential study strategies, soft skills, and life skills. The system may include additional input from the virtual training partner in this follow-up instruction content.

As noted above, following the presentation of virtual training partner scenarios and/or behaviors, receipt of responses, actions, and/or coaching feedback and assessment of the feedback, and the presentation of follow-up instruction content, the system may then present a subsequent virtual training partner and associated scenarios and/or behaviors (e.g., immediately or after other training is provided). Alternatively, the system may determine that there are no further virtual training partners to present to the user and/or that the coaching skills training using virtual training partners is otherwise complete.

Figure 34:
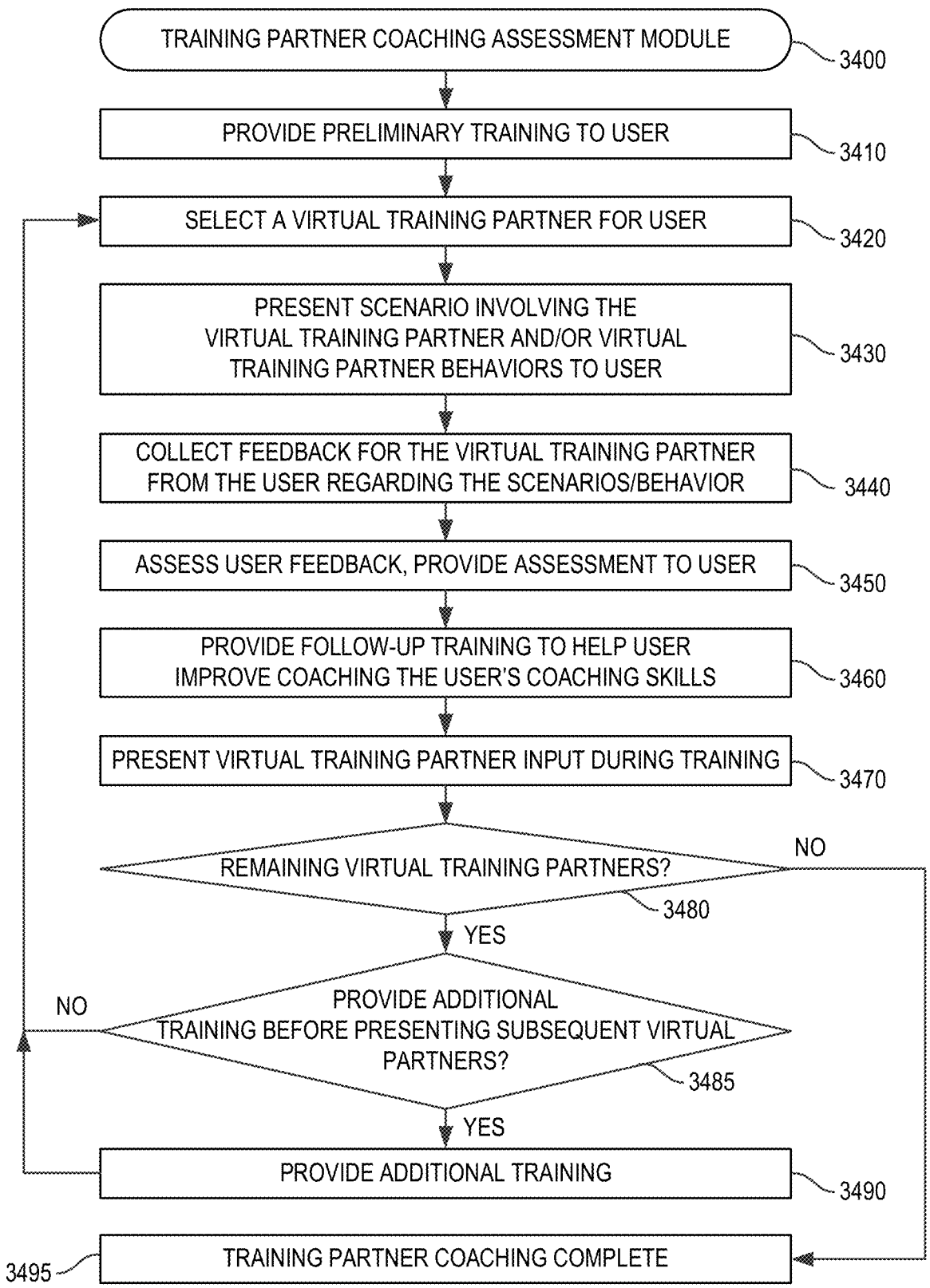
FIG. 34 is a flowchart showing an example of a process performed by the Training Partner Coaching Assessment Module according to particular embodiments.

FIG. 34 illustrates an exemplary process for performing coaching skills training and assessment. The Training Partner Coaching Assessment Module 3400, which may be executed by the one or more computing devices of the system 100, may perform this process. At Step 3410, the system may provide preliminary training to a user. This preliminary training may include an explanation of the videos and/or other content that will be presented to a user, an explanation of the tasks that the user will be asked to complete, and/or an explanation of any assessments and follow-up training that may be provided. In particular embodiments, the system may present preliminary content that can provide context for the virtual training partner scenarios and/or behaviors that will be presented. For example, the system may present a video of teachers describing classroom expectations and ways that can improve and/or impede student success (e.g., best and worst practices for participants in a particular scenario). The subsequently presented virtual training partner scenarios and/or behaviors may relate to the virtual training partner's behavior in the introduced classroom scenario.

In particular embodiments, the system may provide coaching skills training and assessment during an executive functions training process (e.g., as described herein). Any portion of the training provided during such an executive functions training process may also, or instead, serve as preliminary training for the coaching skills training and assessment using virtual training partners as described herein. In particular embodiments, coaching skills training and assessment processes may be integrated into an executive functions training process and provided periodically and/or at different points during the executive functions training process. Alternatively, or in addition, the disclosed coaching skills training and assessment using virtual training partners embodiment may be provided to users as a separate and/or independent training module.

At Step 3420, the system may select a virtual training partner (or scenario and/or behavior) for a particular user. As described above, the system may generate or otherwise be configured with one or more virtual training partners and associated scenarios and/or behaviors. At Step 3420, the system may select one of these virtual training partners and it associated scenarios and/or behaviors using any suitable method. For example, the system may first determine which of a plurality of virtual training partners have been presented to the particular user and select a particular virtual training partner that has not yet been presented to the particular user. Alternatively, or in addition, the system may first determine which of a plurality of scenarios and/or behaviors have been presented to the particular user and select a particular scenarios or behaviors that has not yet been presented to the particular user.

The selection from the available (e.g., yet to be presented to the user) partners or scenarios/behaviors may be random or based upon certain criteria. For example, the system may be configured to select virtual training partners in a sequential or "round robin" fashion, selecting one after another in a predetermined order. Alternatively, the system may be configured to select a virtual training partner based on the user's performance, scores, assessments, competed training, etc., in an ongoing executive functions training process.

In particular embodiments, the system may select a virtual training partner or scenario/behavior for a particular user from a pool of virtual training partners and/or scenarios/behaviors without considering the virtual training partners and/or scenarios/behaviors that have been presented to the user already during an ongoing executive functions training process.

The system may modify a pool of available virtual training partners and/or scenarios/behaviors at any time based on any suitable criteria. For example, the system may update a pool of available virtual training partners and/or scenarios/behaviors for a particular user based on the user's past performance in an ongoing executive functions training process. Alternatively, or in addition, the system may periodically update a pool of virtual training partners and/or scenarios/behaviors or may update the pool as new virtual training partners and/or scenarios/behaviors are developed and/or as existing virtual training partners and/or scenarios/behaviors are retired.

At Step 3430, the system may present a video and/or other content (e.g., images and/or audio) representing the selected virtual partner and/or a scenario and/or behavior associated with the selected virtual partner. For example, the content presented at Step 3430 may be samples of the virtual partner's schoolwork or other work product produced by or associated with the virtual partner. In another example, the content presented at Step 3430 may show the virtual partner engaging in productive, positive behaviors in a classroom environment introduced at Step 3410 and/or in disruptive, negative behaviors in such a classroom environment. The content associated with a particular virtual training partner may be based on one or more behavioral profiles that are commonly associated with actual types of users (e.g., students). Each such profile may contain a variety of positive and negative behaviors and attributes.

At Step 3440, the system may solicit the user for coaching feedback regarding the content provided at Step 3430. As a way to encourage self-reflection and strategic thinking, the system provides the user with options to view "best practices" of those virtual training partners who have met or exceeded expectations. The system may prompt the user to determine the gap between excellent performance and performance requiring improvement. The system may receive, as input from the user, feedback that the user intends for those training partners whose performance needs improvement, for example in a form of sharing personalized tips from the user's collection, written suggestions, and/or a video message. The system may collect this feedback in any suitable manner. For example, the system may provide the user with an interface in which the user may enter feedback as text. Alternatively, or in addition, the system may allow the user to provide audio and/or video coaching feedback. In particular embodiments, the system may allow the user the select options from a list of a plurality of options to provide qualitative feedback (e.g., "select a rating for your training partner's behavior: excellent, good, fair, poor") and/or quantitative feedback (e.g., "select a star rating for your training partner's behavior: *, , *"). The system may employ any other suitable means of collecting coaching feedback from a user.

At Step 3450, the system may assess the user's responses, actions, and/or coaching feedback and provide the results of that assessment to the user. Such an assessment may be similar to other assessments described herein, for example in regard an executive functions training process. The assessment of Step 3450 may be performed automatically, for example by the one or more computing devices of the system 100, or may involve (e.g., limited) human intervention. The assessment may include one or more numerical scores, letter grades, etc. The assessment may also, or instead, include more detailed feedback about the user's coaching feedback (e.g., written, audio, and/or video feedback).

At Step 3460, the system may present follow-up training to the user. This follow-up training may be focused on improving the user's coaching skills. The follow-up training may be generated and/or selected based on the user's responses, actions, and/or coaching feedback and/or the assessment of the user's responses, actions, and/or coaching feedback. Alternatively, or in addition the follow-up training may be based on the particular virtual training partner and/or associated scenarios/behaviors that were presented previously to the user (e.g., at Step 3430). Alternatively, the follow-up training may be more of a more general nature.

The system may present follow-up training content in a format similar to that of the preliminary training. For example, continuing with the particular exemplary embodiment of classroom behavior, the follow-up training may be a video taken in a classroom setting of a guidance counselor (e.g., an actor portraying a guidance counselor) describing ways students may cooperate, collaborate, interact with other students (e.g., virtual students in the classroom scenario), and/or further build and strengthen essential study strategies, soft skills, and/or life skills The system may allow for user interaction in the follow-up content. For example, rather than simply a video, the follow-up content may be interactive content that accepts user input during presentation and that system may dynamically adjust based on such user input (e.g., using artificial intelligence and/or machine learning technologies).

At Step 3470, the system may integrate content associated with one or more of the virtual training partners into the follow-up training content. For example, the system may include generated virtual participation content associated with the virtual training partner recently coached by the user into the classroom discussion portrayed in the follow-up content. This virtual training partner content may be predetermined and included, for example, in video content. Alternatively, this virtual training partner may be generated based on user participation in interactive follow-up training content.

At Step 3480, the system may determine whether there are any remaining virtual training partners and/or any remaining scenarios and/or behaviors that may be presented to the user. For example, where a plurality of virtual training partners and/or scenarios/behaviors are available for a particular user, and where the system is configured to present them all to the user (e.g., in a particular order, based on some criteria, randomly, etc.), the system may determine whether there are any of these remaining that have not been presented to the user. If not, the system may terminate the training partner coaching process at Step 3495.

If there are virtual training partners and/or scenarios/behaviors available that may be presented to the user, at Step 3485 the system may determine whether additional training is to be provided or other functions are to be performed before any of the remaining virtual training partners and/or scenarios/behaviors are to be presented to the user. For example, where the system is facilitating the user's participation in an executive functions training process, the system may determine at Step 3485 that there is intermediary executive functions training that is to be provided to the user before any additional virtual training partners and/or scenarios/behaviors are to be presented to the user.

If there are additional functions to be performed and/or training to be provided, the system executes such functions and/or training at Step 3490. The actions taken at Step 3490 may be any of the aspects of the various embodiments described herein (e.g., an executive functions training process as described herein).

In response to completing the tasks associated with Step 3490, if system determines at Step 3485 that there are no tasks to be completed before presentation of additional virtual training partner content, and/or in response to determining to provide additional virtual training partner content, the system returns to Step 3420 to select another virtual training partner and/or scenario/behavior for presentation to the user.

CONCLUSION

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. A computer-implemented data processing method for electronically providing training partner coaching assessment related to an executive functions development training activity, the method comprising:
   providing, by one or more computer processors on a video display unit, a first graphical user interface for performing a partner coaching training activity;
   presenting, by one or more computer processors on the first graphical user interface, preliminary training content to a user before execution of the partner coaching training activity;
   selecting, by one or more computer processors, a first virtual training partner from a plurality of virtual training partners, wherein each virtual training partner of the plurality of virtual training partners is associated with one or more respective behaviors;

determining, by one or more computer processors, the one or more respective behaviors associated with the first virtual training partner;

generating, by one or more computer processors, scenario content based at least in part on the first virtual training partner and the one or more respective behaviors associated with the first virtual training partner; and executing the partner coaching training activity by:
presenting, by one or more computer processors on the first graphical user interface, the scenario content to the user;
prompting, by one or more computer processors, the user to provide training partner responses, actions, or coaching feedback;
receiving, by one or more computer processors via the first graphical user interface, the training partner responses, actions, or coaching feedback from the user;
assessing, by one or more computer processors, the training partner responses, actions, or coaching feedback;
generating, by one or more computer processors, assessment information based at least in part on the assessment of the training partner responses, actions, or coaching feedback; and
presenting, by one or more computer processors on the first graphical user interface, the assessment information to the user.

2. The computer-implemented data processing method of claim 1, further comprising:
generating, by one or more computer processors, follow-up content based at least in part on the training partner responses, actions, or coaching feedback; and
presenting, by one or more computer processors on the first graphical user interface, the follow-up content to the user.

3. The computer-implemented data processing method of claim 2, wherein the follow-up content is generated further based at least in part on the first virtual training partner.

4. The computer-implemented data processing method of claim 1, wherein the preliminary training content comprises video content.

5. The computer-implemented data processing method of claim 1, wherein the scenario content comprises video content.

6. The computer-implemented data processing method of claim 1, wherein the follow-up content comprises interactive content.

7. The computer-implemented data processing method of claim 1, further comprising generating, by one or more computer processors, each of the plurality of virtual training partners based at least in part on a respective behavioral profile associated with each respective virtual training partner of the plurality of virtual training partners.

8. The computer-implemented data processing method of claim 1, further comprising, at least partially in response to detecting completion of the partner coaching training activity, selecting, by one or more computer processors, a second virtual training partner from the plurality of virtual training partners, wherein the second virtual training partner is different than the first virtual training partner.

9. The computer-implemented data processing method of claim 8, further comprising executing, by one or more computer processors, a subsequent partner coaching training activity using the second virtual training partner.

10. The computer-implemented data processing method of claim 8, wherein selecting the second virtual training partner from the plurality of virtual training partners comprises randomly selecting, by one or more processors, the second virtual training partner from the plurality of virtual training partners.

11. A data processing system for processing data regarding training partner coaching assessment for use in the development of a user's executive functions, the data processing system comprising:
at least one computer processor; and
memory operatively coupled to the at least one computer processors, wherein the at least one computer processor is adapted for:
providing, on a video display unit, a first graphical user interface for performing a partner coaching training activity;
presenting, on the first graphical user interface, preliminary training content to a user before execution of the partner coaching training activity;
selecting a first virtual training partner from a plurality of virtual training partners, wherein each virtual training partner of the plurality of virtual training partners is associated with one or more respective behaviors;
determining the one or more respective behaviors associated with the first virtual training partner;
generating scenario content based at least in part on the first virtual training partner and the one or more respective behaviors associated with the first virtual training partner; and
executing the partner coaching training activity by:
presenting, on the first graphical user interface, the scenario content to the user;
following the presentation of the scenario content to the user, generating, on the first graphical user interface, a user input soliciting training partner responses, actions, or coaching feedback from the user;
receiving, via the user input on the first graphical user interface, the training partner responses, actions, or coaching feedback from the user;
assessing the training partner responses, actions, or coaching feedback;
generating assessment information based at least in part on the assessment of the training partner responses, actions, or coaching feedback; and
presenting, on the first graphical user interface, the assessment information to the user.

12. The data processing system of claim 11, further comprising:
generating follow-up content based at least in part on the first virtual training partner; and
presenting, on the first graphical user interface, the follow-up content to the user.

13. The data processing system of claim 11, wherein the follow-up content comprises one or more executive functions development training activities.

14. The data processing system of claim 11, wherein generating the assessment information comprises calculating a numerical assessment score based at least in part on the assessment of the training partner responses, actions, or coaching feedback.

15. The data processing system of claim 11, wherein the scenario content comprises content associated with a classroom environment.

16. The data processing system of claim 15, wherein the first virtual training partner represents a student.

17. The data processing system of claim 11, wherein the preliminary content comprises one or more executive functions development training activities.

18. The data processing system of claim 11, further comprising, at least partially in response to detecting completion of the partner coaching training activity, selecting a second virtual training partner from the plurality of virtual training partners.

19. The data processing system of claim 18, further comprising executing a subsequent partner coaching training activity using the second virtual training partner.

20. The data processing system of claim 18, wherein selecting the second virtual training partner from the plurality of virtual training partners comprises sequentially selecting the second virtual training partner from the plurality of virtual training partners.

* * * * *